(12) United States Patent
Schrunk

(10) Patent No.: US 8,454,871 B2
(45) Date of Patent: Jun. 4, 2013

(54) APPARATUS AND METHOD FOR PRODUCING LIGHT-RESPONSIVE SURFACES ON OPAQUE MATERIALS

(76) Inventor: Thomas R. Schrunk, Minneapolis, MN (US)

(*) Notice: Subject to any disclaimer, the term of this patent is extended or adjusted under 35 U.S.C. 154(b) by 668 days.

(21) Appl. No.: 11/490,847

(22) Filed: Jul. 21, 2006

(65) Prior Publication Data

US 2007/0019271 A1    Jan. 25, 2007

Related U.S. Application Data

(60) Provisional application No. 60/701,856, filed on Jul. 21, 2005.

(51) Int. Cl.
*B32B 33/00* (2006.01)
(52) U.S. Cl.
USPC ............. 264/139; 425/175; 425/298; 703/2
(58) Field of Classification Search
USPC ............ 249/142; 700/159, 117, 95; 52/105; 264/139; 703/2
See application file for complete search history.

(56) References Cited

U.S. PATENT DOCUMENTS

| 299,382 | A | 5/1884 | Hale |
| 867,637 | A | 10/1907 | Bennett |
| 1,133,604 | A | 3/1915 | Alcan |
| 1,622,104 | A | 3/1927 | Fulton |
| 1,651,248 | A | 11/1927 | Bouin |
| 1,877,481 | A | 9/1932 | Prouty |
| 1,996,539 | A | 4/1935 | Dufay |
| 2,054,015 | A | 9/1936 | Bruce |
| 2,162,777 | A | 6/1939 | Hagopian |
| 2,256,104 | A | 9/1941 | Ringle |

(Continued)

FOREIGN PATENT DOCUMENTS

| DE | 2129053 | 12/1972 |
| DE | 19740778 C1 | * 3/1999 |

(Continued)

OTHER PUBLICATIONS http://www.bls.gov/oco/cg/cgs003.htm retrieved Aug. 21, 2009.*

(Continued)

*Primary Examiner* — Yogendra Gupta
*Assistant Examiner* — John P Robitaille
(74) *Attorney, Agent, or Firm* — Charles A. Lemaire; Johnathan M. Rixen; Lemaire Patent Law Firm, P.L.L.C.

(57) ABSTRACT

The present invention provides for a method of creating a lustrous surface in opaque materials using ridge angles, and valleys of varying depths cut, imprinted or pressed into the opaque material. The combination of the light reflecting ridges, angles to reflect more or less light, and a shadow effect arising from a combination of the valley depths and the angle of the ridges allows one to use light and shadow to create a pattern or series of patterns in the opaque materials. These patterns are created using a process whereby a design is first created, then cut into a master blank using some type of manual or computer-aided method. Next, this pattern is inlaid, pressed, or imprinted into a blank panel composed of the opaque material. In some embodiments, this opaque material is allowed to set, thus creating a finished article of manufacture in the form of a panel.

46 Claims, 24 Drawing Sheets

U.S. PATENT DOCUMENTS

| | | | |
|---|---|---|---|
| 2,651,820 A | 9/1953 | Hirsch | |
| 2,714,816 A | 8/1955 | Pennell | |
| 2,875,543 A | 3/1959 | Sylvester et al. | |
| 3,068,956 A | 12/1962 | Cooley | |
| 3,087,577 A | 4/1963 | Prestia | |
| 3,245,187 A | 4/1966 | May | |
| 3,338,730 A | 8/1967 | Slade et al. | |
| 3,384,982 A | 5/1968 | Herbert et al. | |
| 3,608,261 A | 9/1971 | French et al. | |
| 3,617,336 A | 11/1971 | Gilard et al. | |
| 3,665,617 A | 5/1972 | Gilbert | |
| 4,223,499 A | 9/1980 | Schrunk | |
| 4,323,423 A | 4/1982 | Schrunk | |
| 4,722,158 A | 2/1988 | Urdaneta | |
| 4,738,059 A | 4/1988 | Dean, Jr. | |
| 4,761,931 A | 8/1988 | Schrunk | |
| 4,814,218 A | 3/1989 | Shane | |
| 4,877,405 A | 10/1989 | Stewart | |
| 5,032,003 A * | 7/1991 | Antes | 359/567 |
| 5,117,366 A | 5/1992 | Stong | |
| 5,332,191 A | 7/1994 | Nolan | |
| 5,713,166 A | 2/1998 | Couture | |
| 5,987,831 A | 11/1999 | Lamberts-Van Assche | |
| 6,226,007 B1 * | 5/2001 | Brown | 345/426 |
| 6,248,271 B1 | 6/2001 | Graham et al. | |
| 6,253,512 B1 | 7/2001 | Thompson et al. | |
| 6,296,281 B1 * | 10/2001 | Stone | 283/93 |
| 6,606,834 B2 | 8/2003 | Martensson et al. | |
| 6,820,383 B2 | 11/2004 | Vos | |
| 6,873,942 B1 | 3/2005 | Suga | |
| 6,898,909 B2 | 5/2005 | Prat | |
| 2002/0138238 A1 * | 9/2002 | Kubota et al. | 703/1 |
| 2004/0050269 A1 * | 3/2004 | Adamczyk et al. | 101/150 |
| 2004/0200164 A1 | 10/2004 | Schrunk | |
| 2005/0005550 A1 | 1/2005 | Schrunk | |

FOREIGN PATENT DOCUMENTS

| | | |
|---|---|---|
| DE | 10309761 A1 * | 9/2004 |
| EP | 0 358 495 A1 | 3/1990 |
| EP | 06788133 | 4/2010 |
| FR | 2557512 | 12/1983 |

OTHER PUBLICATIONS

Web page http://en.wikipedia.org/wiki/Lookup_table Retrieved Nov. 21, 2009.*

Espacenet Translation of DE10309761A1 retrieved Nov. 21, 2009.*

Espacenet Translation of DE19740778C1 retrieved Nov. 21, 2009.*

"Appeal Brief in related U.S. Appl. No. 10/900,831, discussing U.S. 3087577 (Prestia), U.S. 4722158 (Urdaneta), EP 0358495 (Daly)", Jun. 4, 2009.

"Reply Brief in related U.S. Appl. No. 10/900,831, discussing U.S. 3087577 (Prestia), U.S. 4722158 (Urdaneta), EP 0358495 (Daly)", Sep. 18, 2009.

* cited by examiner

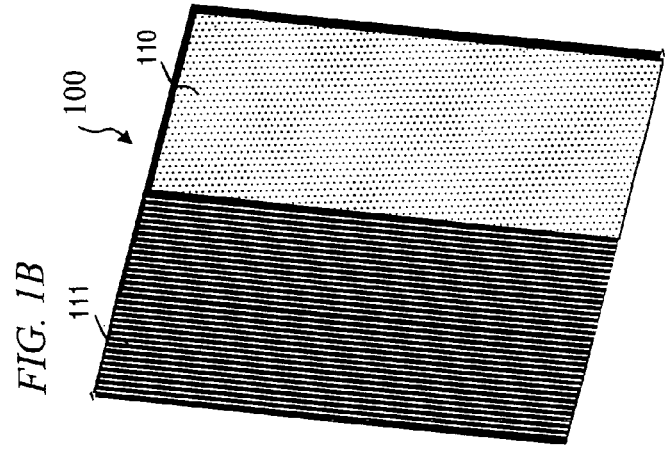
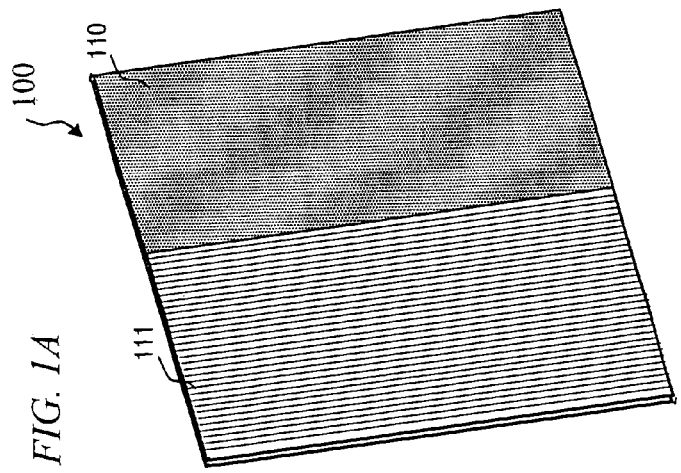
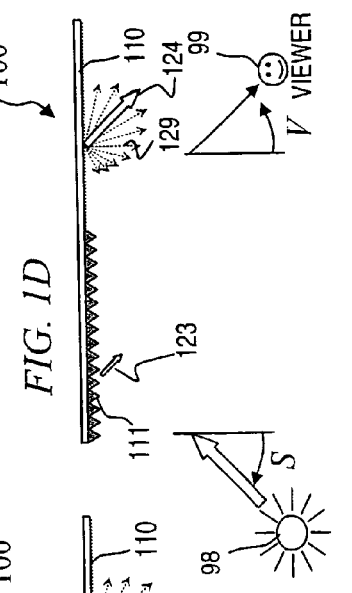
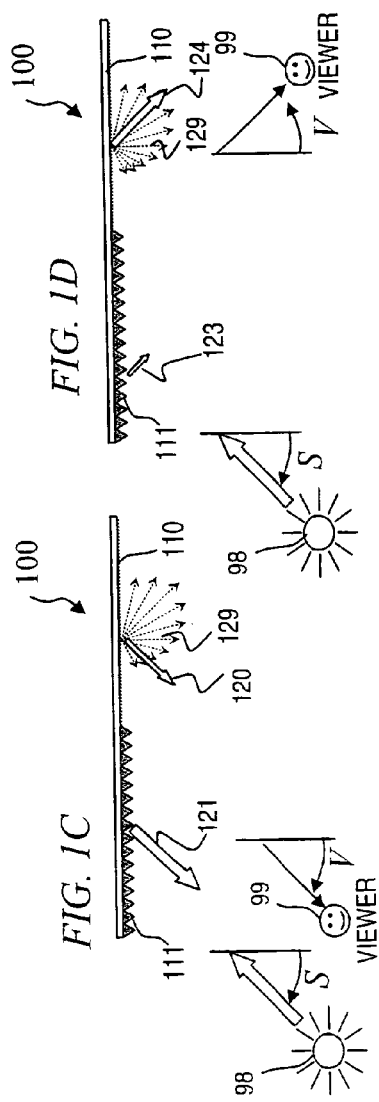

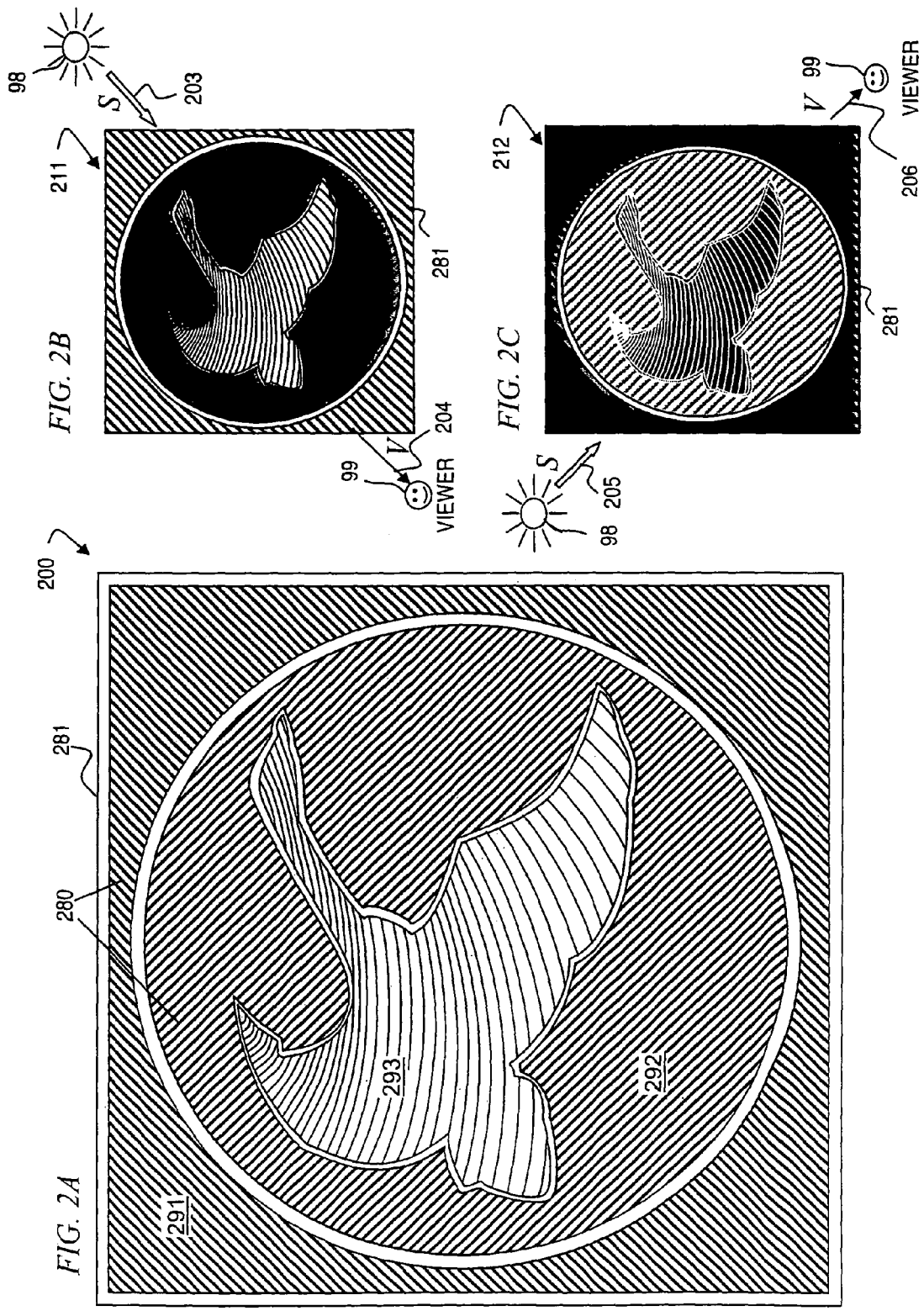

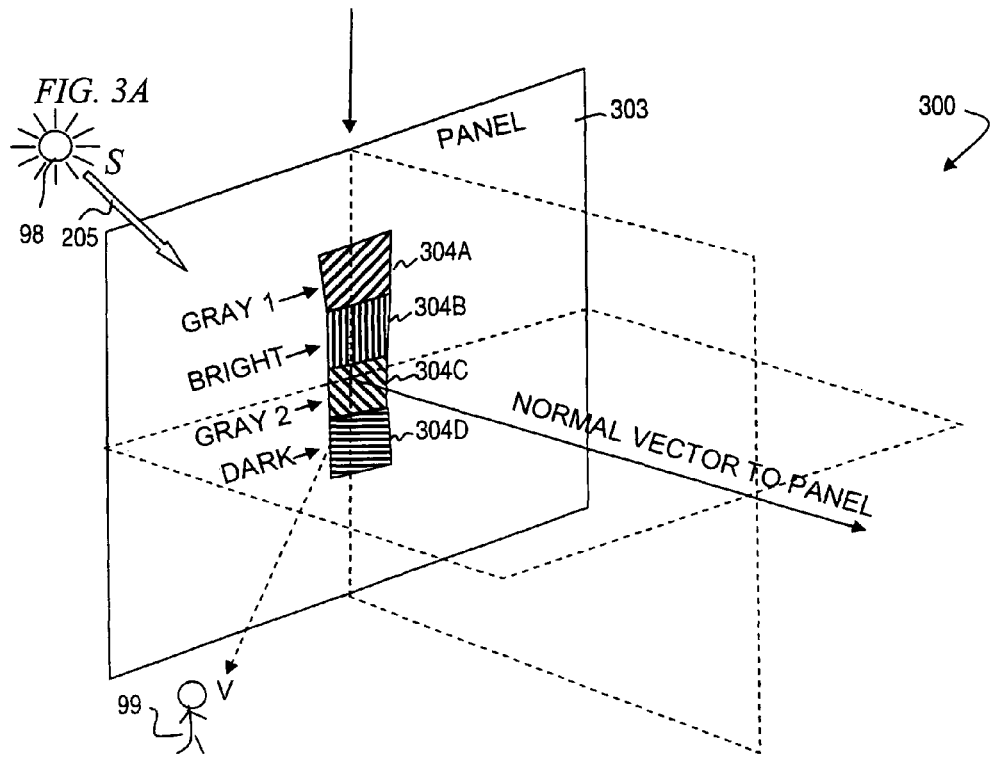
FIG. 3A
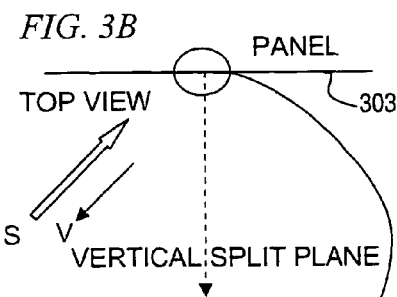
FIG. 3B
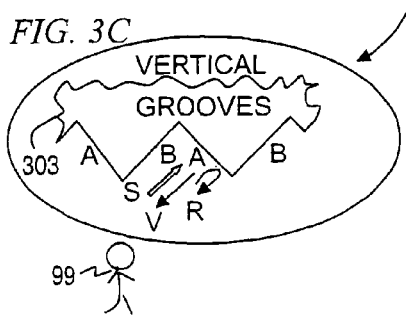
FIG. 3C
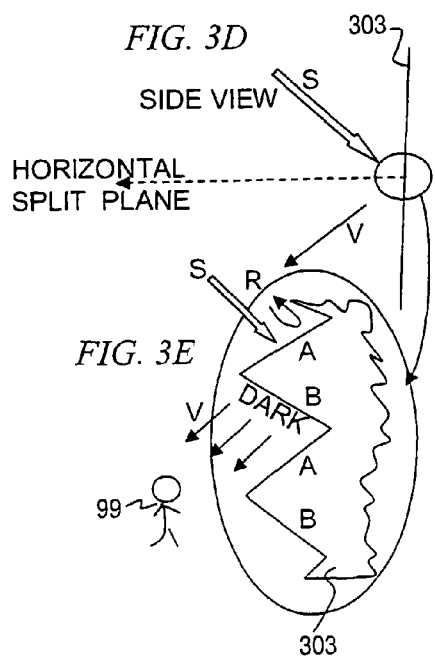
FIG. 3D
FIG. 3E

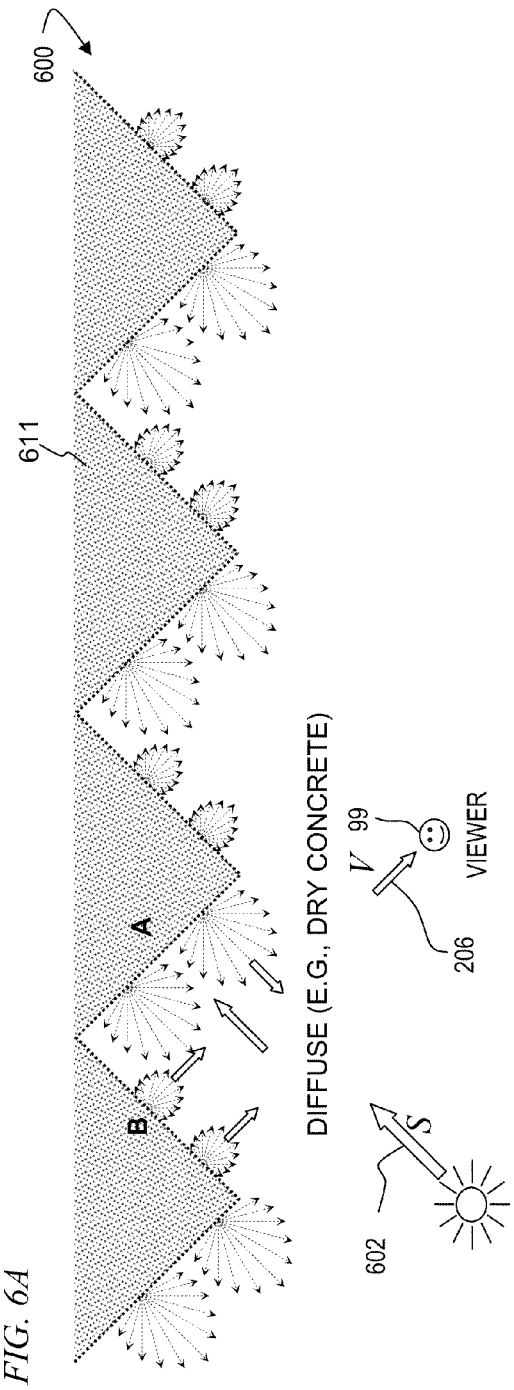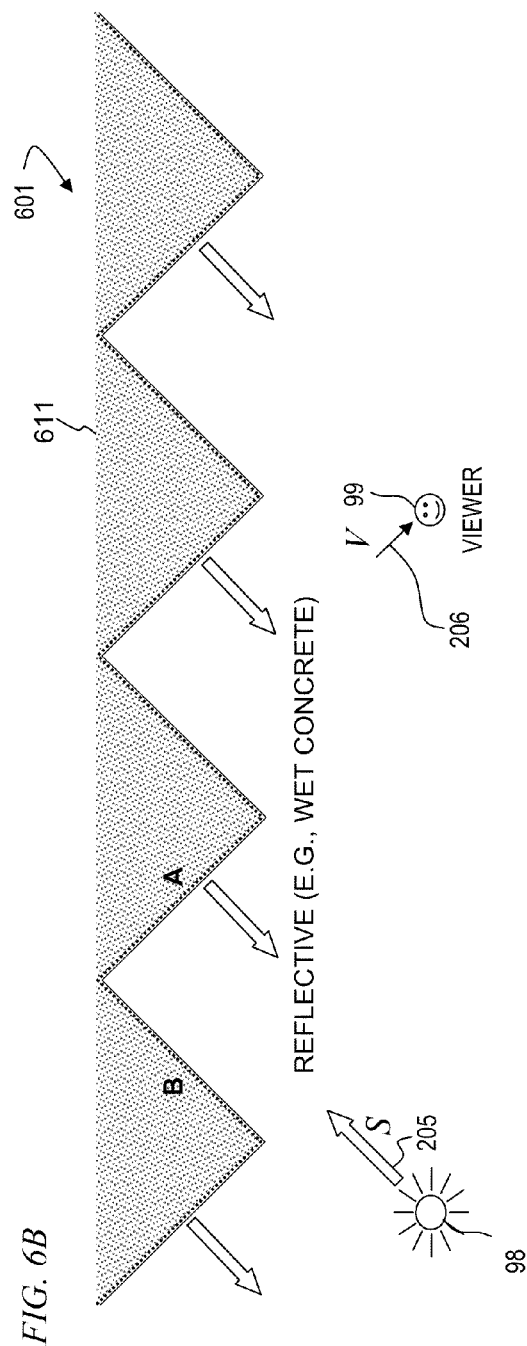

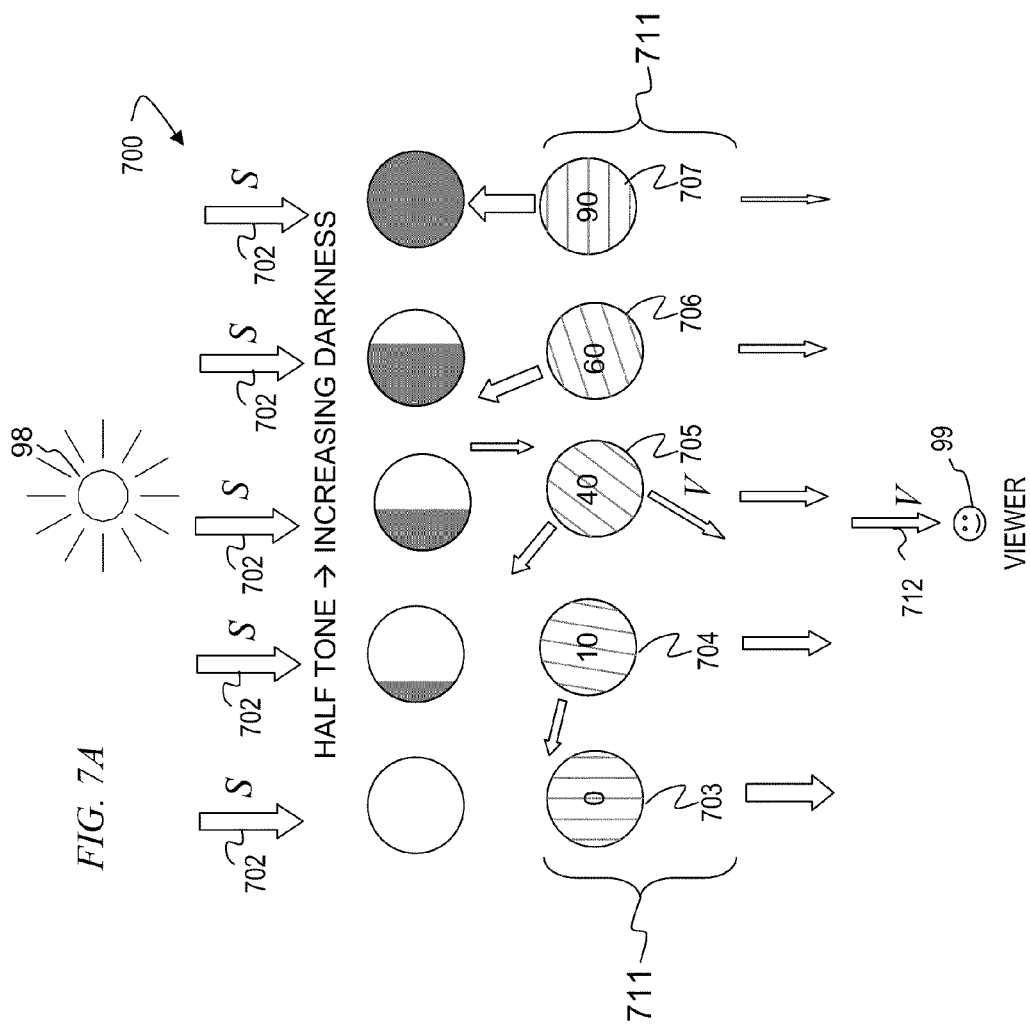

FINISHED EDIFACE

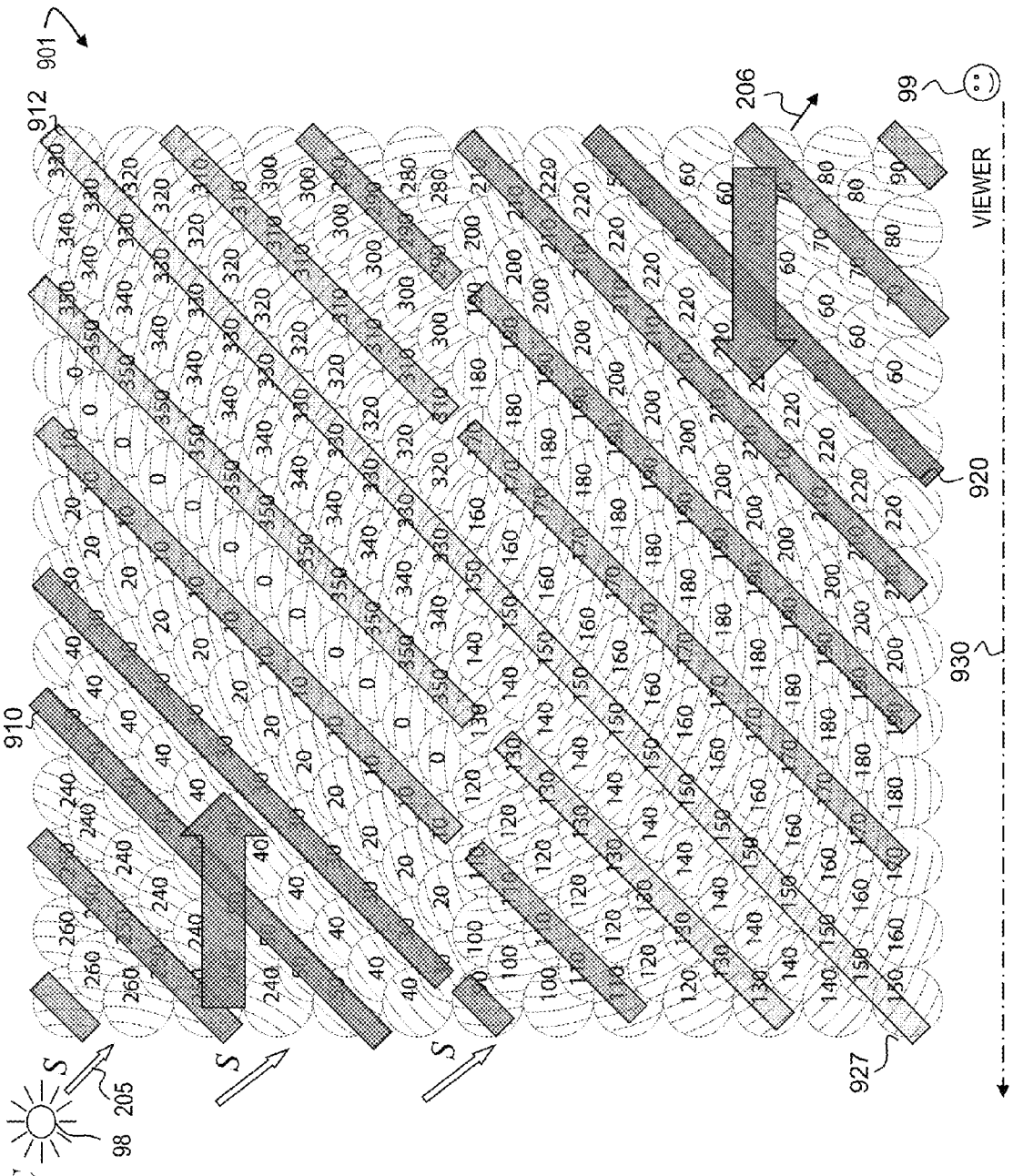

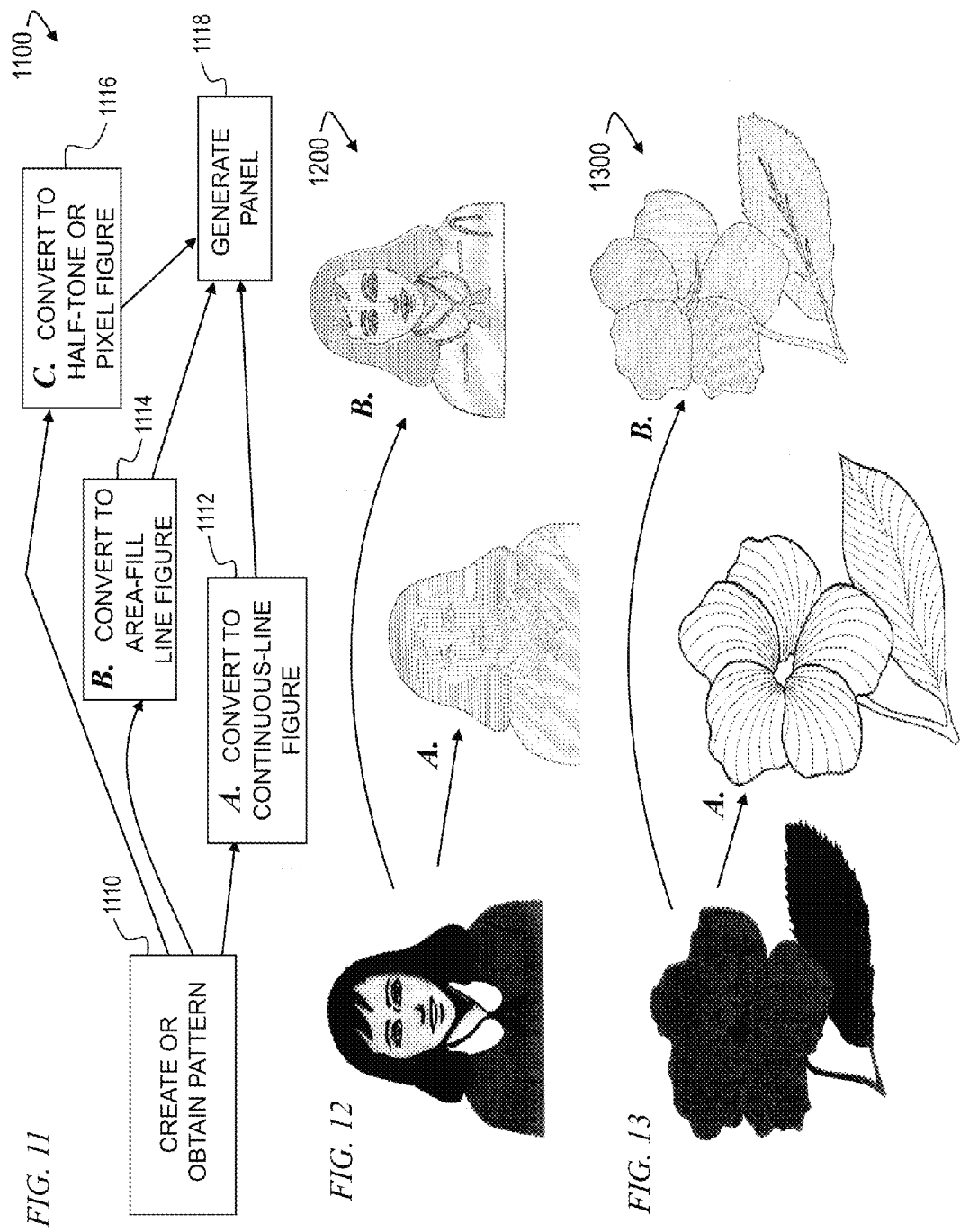

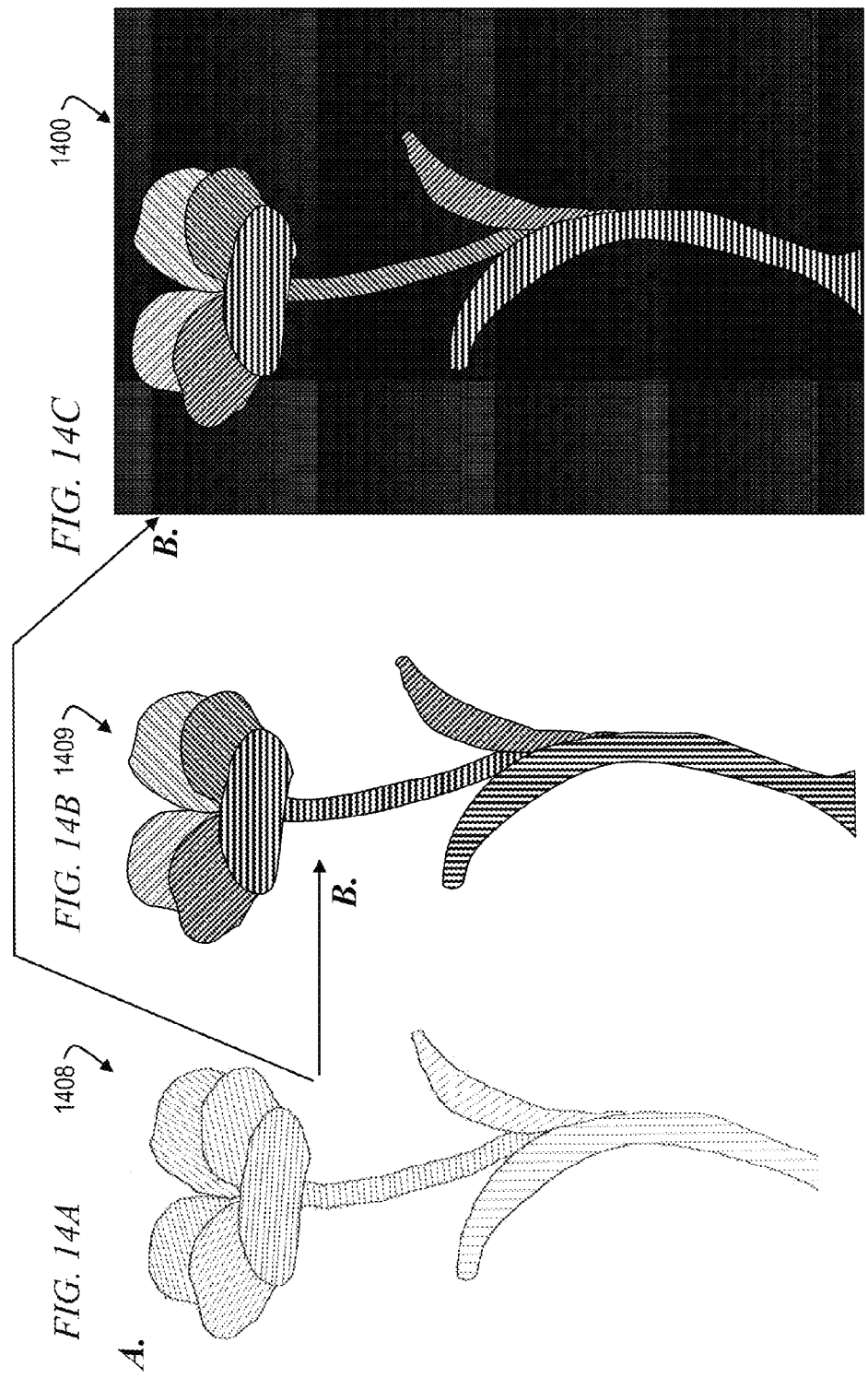

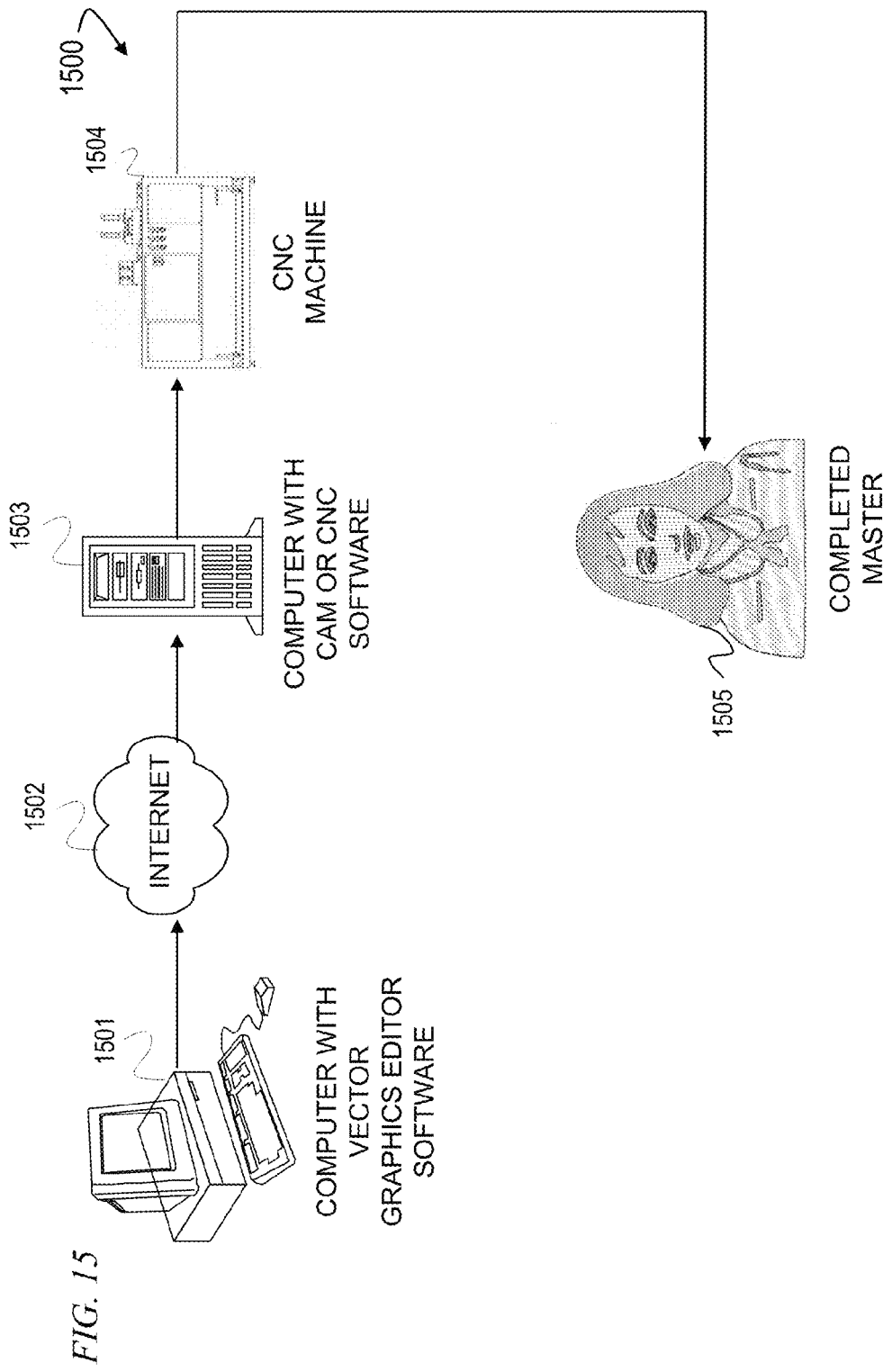

APPARATUS AND METHOD FOR PRODUCING LIGHT-RESPONSIVE SURFACES ON OPAQUE MATERIALS

CROSS REFERENCE TO RELATED APPLICATIONS

This application claims priority under 35 USC §119(e) to U.S. Provisional Patent Application No. 60/701,856 filed Jul. 21, 2005 and which is incorporated by reference in its entirety herein. Additionally, this application is related to U.S. patent application Ser. Nos. 10/900,831, filed Jul. 28, 2004 (now U.S. Pat. 8,365,491 on Feb. 5, 2013), and 10/410,060, filed Apr. 9, 2003 (now abandoned), both of which are titled "PARQUET PANEL COVERING", and both of which are incorporated by reference in their entirety herein.

FIELD OF THE INVENTIONS

This invention relates to the field of an apparatus, method, and article of manufacture for embedding a lustrous, light-reflecting (having varying amounts of illumination to the viewer) pattern into an opaque material using ridges set at a plurality of different angles, and/or valleys of differing depths or side-wall slopes, optionally set into a master and operable for forming a molded product using this master.

BACKGROUND OF THE INVENTION

Opaque materials have been used for creating imagery throughout history. When applied to wall settings, we have seen high-relief surfaces (e.g., bas relief), that are sculpted close to the subject's three-dimensional reality, giving bright highlights and casting shadow through their three-dimensional shape. Shallow relief on walls gives similar light and shade, but achieves it with less relief. Bas relief achieves a light/dark effect through the same realistic rendering of the image as shallow relief but does it at a level below the normal surface of the wall rather than protruding from it. All these types rely on a changing height of the image based on or simulating the shape being depicted.

Grooves and ridges have been used as a method of articulating surfaces in walls and flooring. Grooves and ridges have been used to articulate various parts of buildings, normally in straight lines and/or parallel/equidistant lines, and normally to highlight architectural features. They have been used as component parts of statuary and other representational artwork, and in the case of abstracted art forms, particularly in the Art Deco period, to form abstract decorative motifs. Such grooves or ridges normally have a flat frontal surface which causes the shadow portions generated to be a minor component of the design, and this type of ridge is unsuitable for producing anything but the simplest motifs. Current practice is to place vertical ridges, with flat frontal surfaces between them, on exterior walls as a means of decoration. In cases where ridges are used without the flat frontal surface, it is to produce chevrons and similar decorative motifs. When used with flooring, ridges may be seen to be arranged uni-directionally, or in squares and these may be arranged with the ridges alternating between "vertical" and "horizontal" in a checkerboard effect. Other materials, such as plaster, may have random shallow grooving as a way to mask unevenness in troweling on the material. In these usages, the purpose is for a general overall uniform effect, as opposed to producing a dynamic image produced by differences in light and shade.

Grooves or ridges have long been used in sculpture to reproduce the shapes found in nature, as in the depiction of clothing or drapery. Grooves and ridges are also found in decorative panels as portions of the panel that differ in texture from surrounding areas, such as in the egg and dart pattern and others found in architectural decoration. In these decorative uses, the grooves or ridges are part of the composition, and do not serve to produce a complete image by differences in light and shade.

SUMMARY OF THE INVENTION

In some embodiments, the present invention uses grooves and ridges that come to a point to give definition between light and shade and produce the desired imagery solely from light and shade produced by the specific angles of the grooves and ridges on an overall surface relative to the angle of illumination to a source of light, such as the sun, and the angle of viewing to a viewer. Unlike previous grooved surfaces, the surfaces of the present invention use the givens (independent variables) of illumination angle and viewing angle along with the desired relative brightness for each one of a plurality of areas on a surface to calculate or determine the directions of the ridges that cover each respective area. The resulting ridge-direction specifications that are calculated are used to create a surface (e.g., a map that can be used to manually carve the ridge pattern in a block of architectural foam, or that can be used to direct a CNC machine to move a router that mills the parallel grooves to form the ridge pattern in a sheet of medium-density fiberboard (MDF), aluminum, or other suitable material). The resulting surface can be used directly as the surface to be viewed, or can be used as a negative mold on which to cast a plurality of positive replica surfaces to be viewed, or as a positive master on which to cast a plurality of negative mold surfaces, which are then each used to cast a plurality of positive replica surfaces to be viewed. In some embodiments, the surfaces to be viewed are of an opaque material and have a dull or diffusing surface. Because the relative brightnesses (of each area having different ridge-direction angles) change differently as the illumination angle and/or viewing angle changes (i.e., some areas can become relatively brighter to the viewer, while other areas simultaneously become darker), the surfaces being viewed appear lustrous, particularly as viewed from afar while illumination angle and/or viewing angle changes relatively quickly.

When the illumination angle is from any angle except directly perpendicular to the overall surface and/or the viewing angle is from any angle except directly perpendicular to the overall surface, the light will be separated, with one side of the groove being brighter and the other less bright or in shade. Some embodiments use grooves on some areas of the surface, with a flat frontal surface on other areas, in order to direct or focus the viewer's attention to the grooved portions (which will appear lustrous, with light/dark patterns that change as viewing angle changes). The use of pointed ridges alone, even on a flat surface, arranged in angular sequence (i.e., where the directions of the lines formed by the ridges change over different areas of the surface), can be used to produce changing areas of light and shade normally seen in only in three-dimensional objects or in much more complex surface structures (such as well varnished wood veneers). Additionally, these arranged grooves will give selective (and predetermined) change in brightness, causing areas of the image to change in a manner emulating what is normally considered a lustrous or shiny surface even in totally opaque surfaces, such as carved stone or cast concrete. When viewed frontally (i.e., perpendicular to the overall surface), with frontal lighting (i.e., illumination also perpendicular to the overall surface, or with very diffuse light such as outdoors on a cloudy day), no shadows are produced and all the grooves and ridges are fully illuminated and observed, creating no image since all areas reflect substantially the same amount of light. When the lighting changes to become increasingly angled, shadows begin to appear (even when viewed frontally), and the lighting on different sides of the groove begins to differentiate (the side of the ridge towards the light becoming brighter and the side away from the light becoming darker), causing the image to emerge. When viewed at angles moving away from perpendicular, some of the grooves begin to be partially obscured, and in this manner the contrast of image can increase or decrease. The greater the angle of lighting relative to the vector perpendicular to the surface, or the more acute the viewing angle, the higher the contrast or clearer the image. In some embodiments, the size of the ridge or width and depth of the groove is relatively unimportant in this process, and may be made small enough that, when viewed from the typical viewing distance, the ridge is unseen, and only the various levels of light and shade are perceived. In some embodiments, the different ridge-direction angles are used to create half-tone images (similar to traditional newspaper images, wherein each pixel includes a black spot on a white background, and varying the size of the black spot (i.e., changing the ratio of black to white in each pixel) produces a gray-scale level for each of the pixels that, when viewed from a distance, provides a pleasing gray-scale image.

In some embodiments, the present invention provides a method for forming a lustrous, light-reflecting design or pattern composed of ridges and valleys, where on different areas of the surface, different ridge-direction angles produce eerily changing light patterns into a uniformly-colored opaque material. This pattern will create the appearance based on the perspective of the viewer, the position of the light source, the different ridge-direction angles, and sidewall angle and depth of the grooves of a design created from light and shadows on the illuminated grooves.

BRIEF DESCRIPTION OF THE DRAWINGS

FIG. 1A is a perspective view of a partially grooved concrete panel 100 when viewed from an angle not perpendicular to the surface and illuminated from the same side of the vertical-split plane as the viewer.

FIG. 1B is a perspective view of partially grooved concrete panel 100 when viewed from an angle not perpendicular to the surface and illuminated from the opposite side of the vertical-split plane as the viewer.

FIG. 1C is a top-edge view of partially grooved concrete panel 100 when viewed from an angle not perpendicular to the surface and illuminated from the same side of the vertical-split plane as the viewer.

FIG. 1D is a top-edge view of partially grooved concrete panel 100 when viewed from an angle not perpendicular to the surface and illuminated from the opposite side of the vertical-split plane as the viewer.

FIG. 2A is a front view 200 of a panel 281 showing lines 280 defining ridge-direction angles.

FIG. 2B is a front view 211 of panel 281 showing light, dark, and gradient shading as viewed from a first viewing direction by a viewer opposite an illumination source providing a first illumination direction.

FIG. 2C is a front view 212 of panel 281 showing light, dark, and gradient shading as viewed from a second viewing direction by a viewer opposite an illumination source providing a second illumination direction.

FIG. 2D is a front view 213 of panel 281 showing light, dark, and gradient shading as viewed from the first viewing direction by a viewer on the same side as the illumination source providing the second illumination direction.

FIG. 2E is a front view 214 of panel 281 showing light, dark, and gradient shading as viewed from the first viewing direction by a viewer on the same side as the illumination source providing the second illumination direction.

FIG. 2F is a front view 215 of a different panel 283 showing light, dark, and gradient shading as viewed from the second viewing direction by a viewer on the same side as the illumination source providing the first illumination direction.

FIG. 2G is a front view 216 of panel 283 showing light, dark, and gradient shading as viewed from the second viewing direction by a viewer on the same side as the illumination source providing the first illumination direction.

FIG. 2H is a front view 217 of panel 283 showing light, dark, and gradient shading as viewed from the first viewing direction by a viewer on the opposite side as the illumination source providing the first illumination direction.

FIG. 3A is a perspective view 300 of a portion of a grooved panel 303 when viewed from an angle not perpendicular to the surface and illuminated from the same near side of the vertical-split plane as the viewer.

FIG. 3B is a top-edge view 301 of a portion of panel 303 showing illumination angle and viewing angle with an enlarged view showing vertical grooves.

FIG. 3C is a side-edge view 302 of a portion of panel 303 showing illumination angle and viewing angle with an enlarged view showing horizontal grooves.

FIG. 3D is a side-edge view 305 of a portion of panel 303 showing illumination angle and viewing angle on different sides of the HSP.

FIG. 3E is an enlarged top-edge view 306 of a portion of panel 303 showing illumination angle and viewing angle with an enlarged view showing horizontal grooves.

FIG. 6A is a top-edge view 600 of a portion of a dull-finish panel 611 (e.g., a dry panel having a diffuse or dull-finish surface, such as concrete) showing an enlarged view of vertical grooves, and showing illumination angle and viewing angle.

FIG. 6B is a top-edge view 601 of a portion of a shiny-finish panel 611 (e.g., a wet panel having an underlying diffuse or dull-finish surface, such as concrete) showing an enlarged view of vertical grooves, and showing illumination angle and viewing angle.

FIG. 7A is a front view 700 of a portion of a panel 711 (e.g., five single pixels) showing generation of half-tone shades of gray by orienting the ridge-direction angles of each pixel relative to the illumination angle and viewing angle.

FIG. 9C is a front view of a panel design 901 formed using a plurality of the grooved shell-shaped pixels, each pixel having a set of equal-spaced curved lines, showing the angle of rotation for each pixel. The pattern of lighter and darker shaded stripes is shown as seen by a viewer 99 in the lower right. As viewer 99 moves right to left, the diagonal stripes on the bottom half of the image (e.g., dark stripe 920 and light stripe 927) have an apparently smooth movement to the left, while the diagonal stripes on the top half of the image (e.g., dark stripe 910 and light stripe 912) have an apparently smooth movement to the right.

FIG. 11 is a flow chart 1100 showing three different line-generation processes that are used, in various embodiments, to define lines for a grooved panel.

FIG. 12 is a series of images 1200 showing application of two different line-generation processes that are used, in various embodiments, to define lines for a grooved panel.

FIG. 13 is a series of images 1300 showing application of two different line-generation processes that are used, in various embodiments, to define lines for a grooved panel.

FIGS. 14A, 14B and 14C are a series of images 1400 showing application of two different line-generation processes that are used, in various embodiments, to define lines for a grooved panel.

FIG. 15 is a flow chart 1500 showing a process that is used, in various embodiments, to define lines for a grooved panel, and to automatically generate a panel 1505 using the line definitions.

DESCRIPTION OF EMBODIMENTS

Figure 4A:
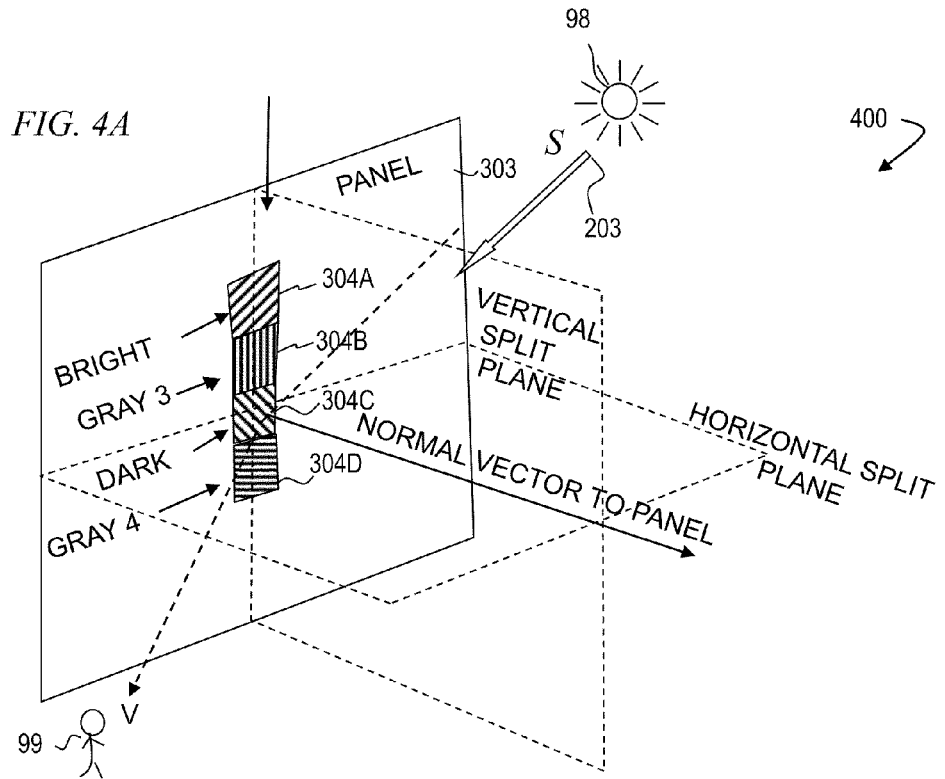
FIG. 4A is a perspective view 400 of a portion of a grooved panel 303 when viewed from an angle not perpendicular to the surface and illuminated from the opposite side of the vertical-split plane as the viewer.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple Figures. Signals and connections may be referred to by the same reference number or label, and the actual meaning will be clear from its use in the context of the description.

Examples of Various Light-Responsive, Lustrous Surfaces

In some embodiments, the present invention provides an impressive, durable lustrous surface decoration formed using grooves and ridges designed according to embodiments of the present invention and usable for thin low-cost concrete building panels, as well as concrete highway dividers, retaining walls, bridge pillars, roadway and sidewalk surfaces, patio blocks, concrete blocks for concrete-block walls, clay-based bricks, clay-based tiles and the like. In other embodiments, the surface is formed into medium-density fiberboard or solid wood. In other embodiments, the surface is formed into structural foam that is spray-coated with a thin concrete mixture. In some embodiments, the surface is formed on a cast plastic surface, such as a plug-molded boat hull. Some embodiments of the invention include one or more of the aforementioned items. Some embodiments of the invention include a building, a highway, a retaining wall, a bathroom or kitchen countertop or wall, a concrete-block wall, or other item of manufacture made using one of the aforementioned items. Some embodiments of the invention include a mold suitable for casting one of the aforementioned items.

In some embodiments, the series of straight and/or curved pointed ridges respond to directional light on horizontal panels (e.g., formed on a concrete sidewalk or roadway) or vertical panels (e.g., on thin concrete building panels attached to a structure or edifice, or concrete highway dividers such as are commonly constructed as the divider between opposite-traveling traffic on a divided highway), which give differences in the perceived surface brightness on the basis of light and shade caused by full, partial, or fully shaded illumination of the grooves or ridges from the light source.

In some embodiments, a series of straight and/or curved pointed ridges and/or grooves are arranged at different angles on the surface of a panel to give differing levels of light and shade to the various areas of the composition to produce light-responsive, lustrous images. In some embodiments, the ridges are formed having sloping walls that form a straight line from the ridge top to the groove bottom, thus forming a fairly sharp line along the ridge top and a fairly sharp groove bottom cross section. In other embodiments, the grooves are formed having a rounded bottom cross section. In some embodiments, the lustrousness of the images is dependent upon the depth of the groove bottoms or valleys relative to the above-described ridges. The panels, in some embodiments, are made of masonry, wood, stone, plastic, metal, cement, or other opaque material, or combinations of two or more such materials. In some embodiments, the groove patterns are formed on a mold face, and concrete (or similar casting materials) panels are molded using the mold face. In some embodiments, the panels evoke a desirable lustrous effect when viewed from an angle well to the side of perpendicular to the face of the panel, and when illuminated at an angle well to the side of perpendicular to the face of the panel.

FIG. 1A is a perspective view of a partially grooved lustrous concrete panel 100 (which includes a grooved section 111 and flat section 110) when viewed from an angle not perpendicular to the surface and illuminated from the same side of the vertical-split plane as the viewer. In some embodiments, section 111 contains a plurality of vertical grooves forming ridges along vertical lines, each at the same uniform ridge-direction angle, whereas section 110 contains no grooves or ridges. Section 110 will exhibit no lustrous qualities, while the lustrous qualities of the section 111 become apparent upon changing the angle S of a light source relative to the angle of the plurality of lines, and/or changing the angle V from which a viewer observes these sections.

FIG. 1C is a top-edge view of partially grooved concrete panel 100 when viewed from a viewing vector V at an angle not perpendicular to the surface and illuminated from the same side of the vertical-split plane as the viewer, who views along viewing vector V from the same side of the vertical split plane as the illumination vector S. In this FIG. 1C, the light source 98 and viewer 99 are positioned on the same side of the vertical split plane, or are oriented in a similar manner, such that the grooved section 111 appears bright, while flat section 110 is less bright. This brightness of grooved section is due, in part, to most of the light from the light source being reflected 121 directly back to the viewer 99 by the plurality of left-side groove walls that make up section 111, and being back diffused 120 from the light dispersed 129 from the flat section 110.

FIG. 1B is a perspective view of partially grooved concrete panel 100 when viewed from an angle not perpendicular to the surface and illuminated along illumination vector S from the opposite side of the vertical-split plane as the viewer, as viewed along viewing vector V. In this FIG. 1B, the perspective of the viewer 99 has changed such that the viewer 99 is observing the sections 111 and 110 from a perspective "opposite" that of the perspective in FIG. 1A and FIG. 1C. This change in perspective results in the viewer 99 seeing the section 111 as dark, since the right-hand-side groove-wall faces facing toward the viewer 99 are in shadow (or illuminated at a grazing angle) and most of the light from the light source 98 is still being reflected back towards the light source as in FIG. 1A and FIG. 1C. (Note that the groove surface configuration of section 111 is assumed to be very flat or even slightly polished, and is more similar to the wet-concrete example of FIG. 6B below than to the dry-concrete example of FIG. 6A below.)

FIG. 1D is a top-edge view of partially grooved concrete panel 100 when viewed from an angle not perpendicular to the surface and illuminated along illumination vector S from the opposite side of the vertical-split plane as the viewer 99, as shown and described above for FIG. 1B. This darkness of grooved section is due, in part, to most of the light from the light source being reflected 121 by the plurality of left-side groove walls that make up section 111, while little light 123 goes toward the viewer 99, and being forward diffused 124 toward viewer 99 from the light dispersed 129 from the flat section 110.

FIG. 2A is a front view 200 of a panel 281 showing ridge-direction lines 280 defining ridge-direction angles. In area 291, the ridge-direction lines are at a 45-degree angle to vertical, oriented from the upper right to lower left. In area 292, the ridge-direction lines are at a 45-degree angle to vertical, oriented from the upper left to lower right. In area 293, the ridge-direction lines are outlined by a sub-image (e.g., of a waterfowl) and are curved at varying angles to create a gentle gradient shading effect for that image portion.

FIG. 2B is a front view 211 of panel 281 showing light, dark, and gradient shading as viewed from a first viewing direction 204 by a viewer opposite an illumination source providing a first illumination direction 203. Note that in this configuration of viewing angle and illumination angle, image area 291 (see FIG. 2A) is relatively bright (since both side walls of each groove in area 291 are illuminated and both side walls are visible to the viewer 99), image area 292 (see FIG. 2A) is dark (since the illuminated up-facing wall of each groove in area 292 faces away and is not visible to the viewer 99, while the groove wall in shadow points toward viewer 99), and image area 293 (see FIG. 2A) is mostly varying shades of bright since the ridge angles are generally parallel to the line between viewer 99 and illumination source 98.

FIG. 2C is a front view 212 of panel 281 showing light, dark, and gradient shading is viewed from a second viewing direction 206 by a viewer opposite an illumination source providing a second illumination direction 205. Note that in this configuration of viewing angle and illumination angle, image area 291 (see FIG. 2A) is relatively dark (since the illuminated wall of each groove in area 291 faces away and is not visible to the viewer 99, while the groove wall in shadow points toward viewer 99), image area 292 (see FIG. 2A) is relatively bright (since both side walls of each groove in area 292 are now illuminated and both side walls are visible to the viewer 99), and image area 293 (see FIG. 2A) is mostly varying shades of dark (particularly dark are grooves mostly at right angles to the plane containing the illumination vector S and the viewing vector V).

FIG. 2D is a front view 213 of panel 281 showing light, dark, and gradient shading as viewed from the first viewing direction by a viewer on the same side as the illumination source providing the second illumination direction. Note that in this configuration of viewing angle and illumination angle, square image area 291 (see FIG. 2A) is a medium shade of gray (since the illuminated wall of each groove in area 291 and the groove wall in shadow are both visible to the viewer 99), circular image area 292 (see FIG. 2A) is a medium shade of gray (since both side walls of each groove in area 292 are now illuminated but only the lower side wall is visible to the viewer 99), and image area 293 (see FIG. 2A) is mostly varying shades of dark (note that FIG. 2D and FIG. 2E have the sun and viewer on the same side of the vertical split plane, and are about the same pattern of lights, darks, and grays).

FIG. 2E is a front view 214 of panel 281 showing light, dark, and gradient shading as viewed from the first viewing direction by a viewer on the same side as the illumination source providing the second illumination direction. Note that in this configuration of viewing angle and illumination angle, square image area 291 (see FIG. 2A) is a medium shade of gray (since both side walls of each groove in area 291 are now illuminated but only the lower side wall is visible to the viewer 99), circular image area 292 (see FIG. 2A) is a medium shade of gray (since the illuminated wall of each groove in area 292 and the groove wall in shadow are both visible to the viewer 99), and image area 293 (see FIG. 2A) is mostly varying shades of dark.

FIG. 2F is a front view 215 of a different panel 283 showing light, dark, and gradient shading as viewed from the second viewing direction by a viewer on the same side as the illumination source providing the first illumination direction. In some embodiments, panel 283 includes vertical lines in panel image areas 291, horizontal lines in panel image areas 292, and the same curved lines as in FIG. 2A in panel image areas 293. Note that, for the vertical-horizontal groove pattern of panel 283, and in this configuration of viewing angle and illumination angle, square image area 291 (see FIG. 2A) is a relatively bright, circular image area 292 is dark, and image area 293 is mostly varying shades of dark (note that FIG. 2F and FIG. 2G have the sun and viewer on the same side of the vertical split plane, and are about the same pattern of lights, darks, and grays).

FIG. 2G is a front view 216 of panel 283 showing light, dark, and gradient shading as viewed from the second viewing direction by a viewer on the same side as the illumination source providing the first illumination direction. Note that also in this configuration of viewing angle and illumination angle, square image area 291 (see FIG. 2A) is a relatively bright, circular image area 292 is dark, and image area 293 is mostly varying shades of dark.

FIG. 2H is a front view 217 of panel 283 showing light, dark, and gradient shading as viewed from the first viewing direction by a viewer on the opposite side as the illumination source providing the first illumination direction. Note that, for the vertical-horizontal groove pattern of panel 283, and also in this configuration of viewing angle and illumination angle, square image area 291 (see FIG. 2A) is dark, circular image area 292 is dark, and image area 293 is mostly varying shades of bright.

FIG. 3A is a perspective view 300 of a portion of a grooved panel 303 when viewed from an angle not perpendicular to the surface and illuminated from the same near side of the vertical-split plane as the viewer. In the embodiment shown, vectors V and S are at about 45 degree angles (down and up, respectively) and on the same side of the vertical split plane (VSP). Note that the various image areas (these could be considered as pixels if small enough) 304A, 304B, 304C, and 304D have ridge-direction angles at four different angles, thus producing a plurality of different bright, gray, or dark shades. By using a plurality of other intermediate ridge-direction angles, a wide range of gray shades is obtainable. While described here as pixilated areas of grooves, it is understood by those of skill in the art that continuous lines, curves, intersections, and the like (similar to a human fingerprint when viewed up close) can be used, such that no pixilation is apparent, and indeed, some computerized embodiments generate an entire image from continuous curve lines without resorting to pixels.

FIG. 3B is a top-edge view 301 of a portion of panel 303 showing illumination angle S and viewing angle V on the same side of the VSP.

FIG. 3C is an enlarged top-edge view 302 of a portion of panel 303 showing illumination angle and viewing angle with an enlarged view showing vertical grooves. Groove faces A reflect the illumination back at the viewer 99. Groove faces B get no illumination, but are not visible to the viewer 99. The viewer thus perceives a bright area for vertical grooves.

FIG. 3D is a side-edge view 305 of a portion of panel 303 showing illumination angle and viewing angle on different sides of the horizontal split plane (HSP).

FIG. 3E is an enlarged top-edge view 306 of a portion of panel 303 showing illumination angle and viewing angle with an enlarged view showing horizontal grooves. Groove faces A reflect the illumination away from the viewer 99. Groove faces B get no illumination, but are the only part of these grooves visible to the viewer 99. The viewer thus perceives a dark area for horizontal grooves.

FIG. 4A is a perspective view 400 of a portion of a grooved panel 303 when viewed from an angle not perpendicular to the surface and illuminated from the opposite side of the vertical-split plane from the viewer. In the embodiment shown, vectors V and S are at about 45 degree angles (down and up, respectively) but on opposite sides of the vertical split plane (VSP). Note that this is the same panel 303 as shown in FIG. 3A, but the darkness or brightness of the various image areas 304A, 304B, 304C, and 304D produce a different plurality of different bright, gray, or dark shades. By choosing ridge-direction angles with regard to the illumination angle and the viewing angle, a wide range of gray shades are obtainable in the illumination-viewing configuration of FIG. 3A and the alternative illumination-viewing configuration of FIG. 4A, but the various relative brightnesses of different areas change differently. The areas that are bright (e.g., 304A) in FIG. 3A become darker in FIG. 4A, while the areas (e.g., 304C) that are dark in FIG. 3A become brighter in FIG. 4A. Some of the areas that were a shade of gray (e.g., 304B) become brighter, while other areas that were the same shade of gray (e.g., 304D) become darker. These differing directions in the changes of shade provide luster.

Figure 4B:
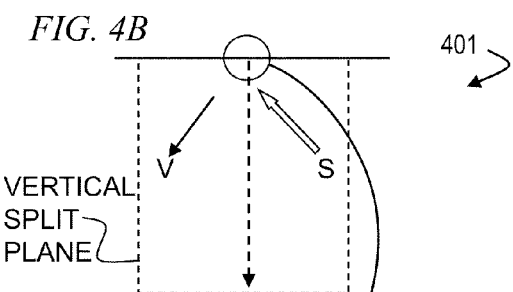
FIG. 4B is a top-edge view 401 of a portion of panel 303 showing illumination angle and viewing angle with an enlarged view showing vertical grooves.

FIG. 4B is a top-edge view 401 of a portion of panel 303 showing illumination angle S and viewing angle V on different sides of the VSP.

Figure 4C:
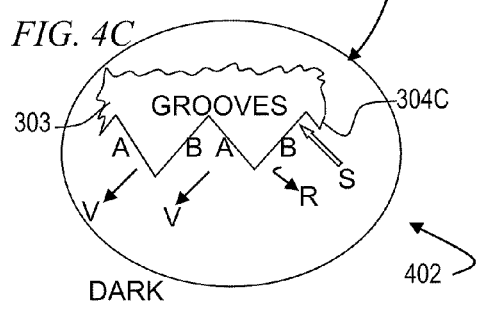
FIG. 4C is a side-edge view 402 of a portion of panel 303 showing illumination angle and viewing angle with an enlarged view showing horizontal grooves.

FIG. 4C is an enlarged top-edge view 402 of a portion of panel 303 showing illumination angle and viewing angle with an enlarged view showing vertical grooves. Groove faces B reflect the illumination away from the viewer 99. Groove faces A get no direct illumination from source S, but are visible to the viewer 99. The viewer thus perceives a dark area for vertical grooves.

Figure 4D:
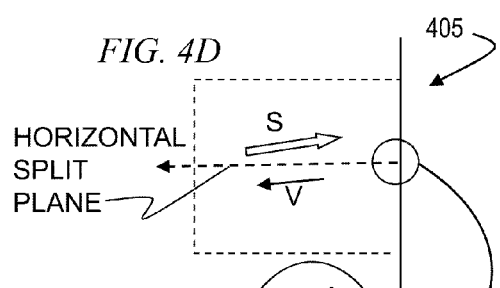
FIG. 4D is a side-edge view 405 of a portion of panel 303 showing illumination angle and viewing angle on different sides of the HSP.

FIG. 4D is a side-edge view 405 of a portion of panel 303 showing illumination angle and viewing angle on the same side of the horizontal split plane (HSP).

Figure 4E:
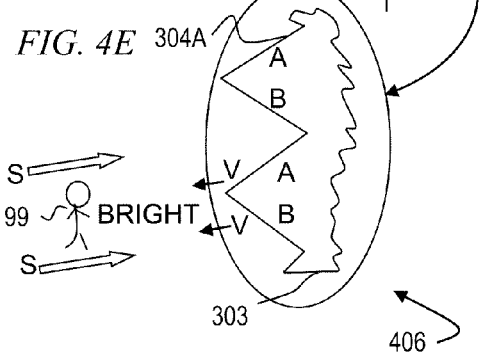
FIG. 4E is an enlarged top-edge view 406 of a portion of panel 303 showing illumination angle and viewing angle with an enlarged view showing horizontal grooves.

FIG. 4E is an enlarged top-edge view 406 of a portion of panel 303 showing illumination angle and viewing angle with an enlarged view showing horizontal grooves. Groove faces A reflect some illumination back to viewer 99, while Groove faces B reflect more illumination back to viewer 99. The viewer thus perceives a bright area for horizontal grooves.

Figure 5A:
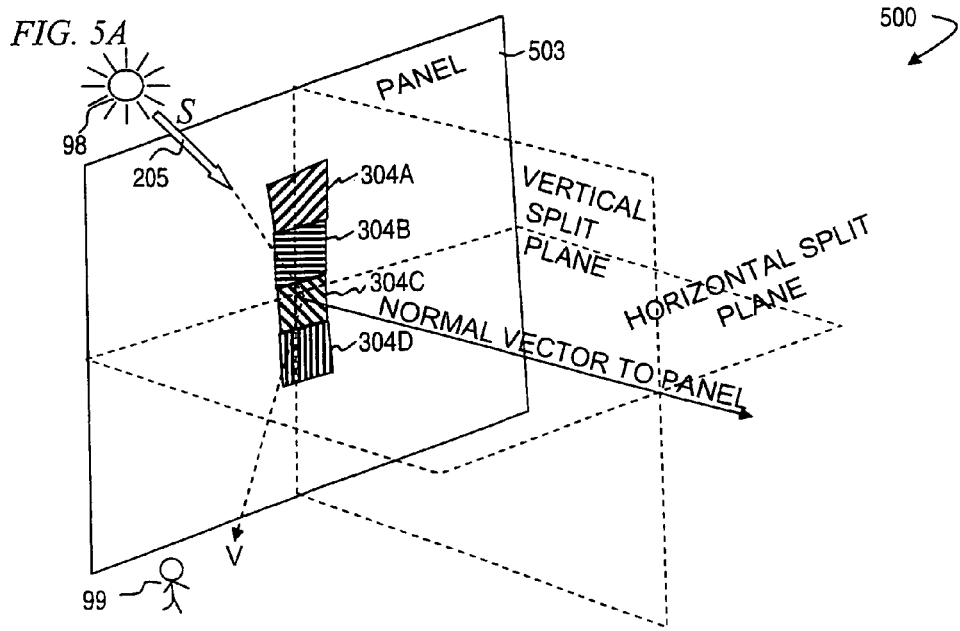
FIG. 5A is a perspective view 500 of a portion of a different grooved panel 503 having asymmetric groove wall angles when viewed from an angle not perpendicular to the surface and illuminated from the same near side of the vertical-split plane as the viewer.

FIG. 5A is a perspective view 500 of a portion of a different grooved panel 503 having asymmetric groove wall angles when viewed from an angle not perpendicular to the surface and illuminated from the same near side of the vertical-split plane as the viewer. This configuration is the same as that of FIG. 3A (i.e., the same ridge-direction angles), except that the groove walls are cut asymmetrically (one wall is steeper than the other, providing a higher contrast at high viewing and/or illumination angles that point to the steep wall, and lower contrast for high viewing and/or illumination angles of the mirror-image direction).

Figure 5B:
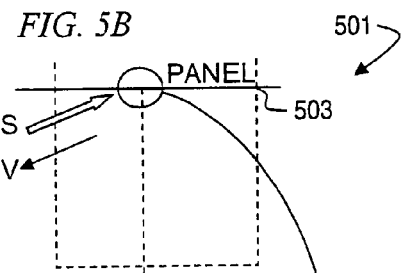
FIG. 5B is a top-edge view 501 of a portion of panel 503 showing illumination angle and viewing angle with an enlarged view showing vertical grooves having asymmetric groove wall angles.
Figure 5D:
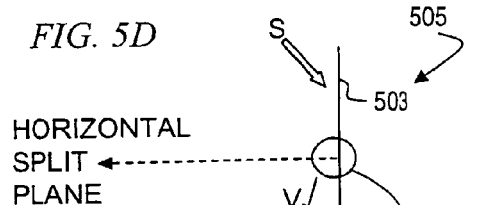
FIG. 5D is a side-edge view 505 of a portion of panel 503 showing illumination angle and viewing angle on different sides of the HSP.

FIG. 5B is a top-edge view 501 of a portion of panel 503 showing illumination angle and viewing angle with an enlarged view showing vertical grooves having asymmetric groove wall angles.

Figure 5C:
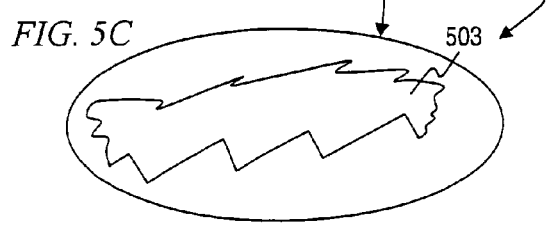
FIG. 5C is a side-edge view 502 of a portion of panel 503 showing illumination angle and viewing angle with an enlarged view showing horizontal grooves having asymmetric groove wall angles.
Figure 5E:
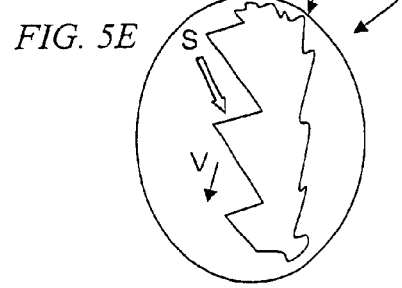
FIG. 5E is an enlarged top-edge view 506 of a portion of panel 503 showing illumination angle and viewing angle with an enlarged view showing horizontal grooves.

FIG. 5C is a side-edge view 502 of a portion of panel 503 showing illumination angle and viewing angle with an enlarged view showing horizontal grooves having asymmetric groove wall angles.

FIG. 6A is a top-edge view 600 of a portion of a dull-finish panel 611 (e.g., a dry panel having a diffuse or dull-finish surface, such as concrete) showing an enlarged view of vertical grooves, and showing illumination angle and viewing angle. When dull-finish panel 611 is dry and illuminated by illumination vector S from direction 602, each groove-wall surface scatters light somewhat in all directions (but primarily in the reflection direction), such that the groove wall A scatters some light onto groove wall B, which in turn scatters some of that light toward viewer 99 in position 206).

FIG. 6B is a top-edge view 601 of a portion of a shiny-finish panel 611 (e.g., a wet panel having an underlying diffuse or dull-finish surface, such as concrete) showing an enlarged view of vertical grooves, and showing illumination angle and viewing angle. When dull-finish panel 611 is wet (and therefore more reflective and less scattering) and illuminated by illumination vector S from direction 602, each groove-wall surface reflects light primarily in the reflection direction, such that the groove wall A scatters very little light onto groove wall B, which in turn appears much darker to viewer 99 in position 206).

FIG. 7A is a front view 700 of a portion of a panel 711 (e.g., five single pixels or groove areas) showing generation of half-tone shades of gray by orienting the ridge-direction angles of each pixel relative to the illumination angle and viewing angle. Pixel 703 has ridge-groove angles parallel (e.g., 0 degrees) to the line between illumination source 702 and viewer 99 (and viewing vector 712), and thus appears brightest to viewer 99. Pixel 704 has ridge-groove angles at a slight angle (e.g., 10 degrees) to the line between illumination source 702 and viewer 99, and thus appears light gray to viewer 99. Pixel 705 has ridge-groove angles at a slightly higher angle (e.g., 40 degrees) to the line between illumination source 702 and viewer 99, and thus appears medium gray to viewer 99. Pixel 706 has ridge-groove angles at a still higher angle (e.g., 60 degrees) to the line between illumination source 702 and viewer 99 (a viewing vector 712), and thus appears darker gray to viewer 99. Pixel 707 has ridge-groove angles at a perpendicular angle (e.g., 90 degrees) to the line between illumination source 702 and viewer 99 (a viewing vector 712), and thus appears darkest to viewer 99.

Figure 7B:
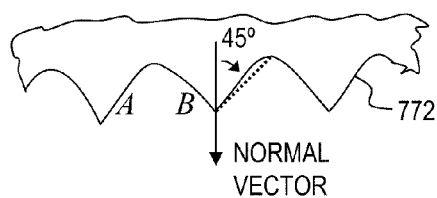
FIG. 7B is a cross-section edge view of a portion of a grooved panel 772 having symmetric groove wall angles (e.g., 45 degrees from normal vector).

FIG. 7B is a cross-section edge view of a portion of a grooved panel 772 having symmetric groove wall angles (e.g., 45 degrees from normal vector). In some embodiments, it is most important for high contrast to have sharp ridges between grooves, while the shape of the groove bottoms (e.g., slightly rounded) is less important.

Figure 7C:
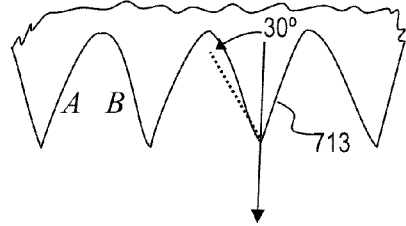
FIG. 7C is a cross-section edge view of a portion of a grooved panel 713 having steeper symmetric groove wall angles (e.g., 30-degrees from normal vector).

FIG. 7C is a cross-section edge view of a portion of a grooved panel 713 having steeper symmetric groove wall angles (e.g., 30-degrees from normal vector). In certain illumination-viewing configurations, this can produce higher-contrast images as viewed (this can be desirably in some cases).

Figure 7D:
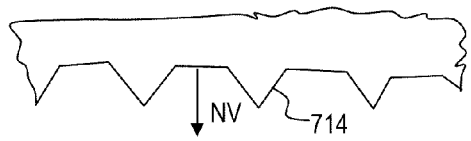
FIG. 7D is a cross-section edge view of a portion of a grooved panel 714 having symmetric groove wall angles (e.g., 45 degrees from normal vector) but with flat or shallow groove bottoms.

FIG. 7D is a cross-section edge view of a portion of a grooved panel 714 having symmetric groove wall angles (e.g., 45 degrees from normal vector) but with flat or shallow groove bottoms. In certain illumination-viewing configurations, this can produce lower-contrast images as viewed (this can be desirably in other cases). In other embodiments, flatter groove-wall sides can be used for a similar effect.

Figure 7E:
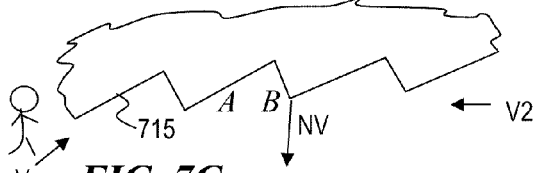
FIG. 7E is a cross-section edge view of a portion of a grooved panel 715 having asymmetric groove wall angles (e.g., 30 degrees from normal vector on one side wall and 60 degrees from normal vector on the opposite side wall).

FIG. 7E is a cross-section edge view of a portion of a grooved panel 715 having asymmetric groove wall angles (e.g., 30 degrees from normal vector on one side wall and 60 degrees from normal vector on the opposite side wall). In certain illumination-viewing configurations, this can produce higher-contrast images as viewed from the left and lower-contrast images as viewed from the right (this can be desirably in other cases).

Figure 7F:
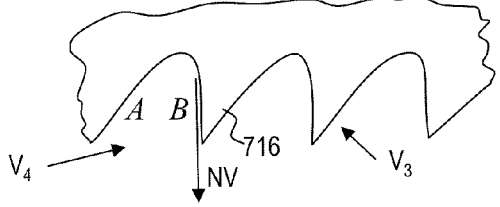
FIG. 7F is a cross-section edge view of a portion of a grooved panel 716 having asymmetric groove wall angles (e.g., 45 degrees from normal vector on one side wall and parallel to the normal vector on the opposite side wall) but with rounded groove bottoms.

FIG. 7F is a cross-section edge view of a portion of a grooved panel 716 having asymmetric groove wall angles (e.g., 45 degrees from normal vector on one side wall and parallel to the normal vector on the opposite side wall) but with rounded groove bottoms. In certain illumination-viewing configurations, this can produce much higher-contrast images as viewed from the left and slightly lower-contrast images as viewed from the right (this can be desirably in other cases).

Figure 7G:
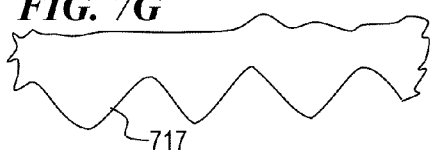
FIG. 7G is a cross-section edge view of a portion of a grooved panel 716 having rounded ridges and rounded groove bottoms, and moderate groove wall angles (e.g., 45 degrees from normal vector on one side wall and parallel to the normal vector on the opposite side wall) but with rounded groove bottoms

FIG. 7G is a cross-section edge view of a portion of a grooved panel 716 having rounded ridges and rounded groove bottoms, and moderate groove wall angles (e.g., 45 degrees from normal vector on one side wall and parallel to the normal vector on the opposite side wall) but with rounded groove bottoms. In certain illumination-viewing configurations, this can produce softer and lower-contrast images as viewed (this can be desirably in other cases).

Figure 8A:
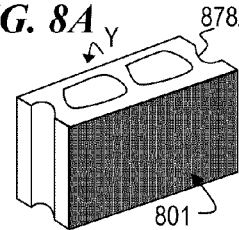
FIG. 8A is a perspective view of a grooved panel 801 (e.g., implemented as a face of a concrete block 878A) and usable as part of a kit 806 of panels (e.g., blocks), or as part of a kit 805 of panels (e.g., blocks) that includes an assembly plan.

FIG. 8A is a perspective view of a grooved panel 801 (e.g., implemented as a face of a concrete block 878A) and usable as part of a kit 806 of panels (e.g., blocks), or as part of a kit 805 of panels (e.g., blocks) that includes an assembly plan. In some embodiments, plurality of such blocks are provided, each with a different ridge-direction angle and/or different ridge curve.

Figure 8B:
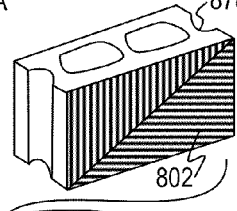
FIG. 8B is a perspective view of a grooved panel 802 (e.g., implemented as a face of a concrete block 878B) and also usable as part of a kit 806 of panels (e.g., blocks), or as part of a kit 805 of panels (e.g., blocks) that includes an assembly plan.

FIG. 8B is a perspective view of a grooved panel 802 (e.g., implemented as a face of a concrete block 878B) and also usable as part of a kit 806 of panels (e.g., blocks), or as part of a kit 805 of panels (e.g., blocks) that includes an assembly plan. In some embodiments, grooved panel 802 implements two or more sharply different ridge-direction angles on different areas of the panel. In some embodiments, a kit 805 of blocks, tiles, or panels is provided, from which an overall image can be created.

Figure 8C:
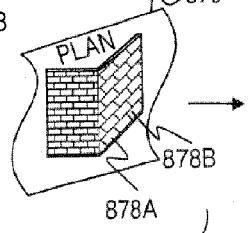
FIG. 8C is a perspective view of an assembly plan 879 showing the placement of a plurality of blocks or panels to assemble a larger image, the plan also usable as part of a kit 805 of panels (e.g., blocks) that includes the assembly plan.

FIG. 8C is a perspective view of an assembly plan 879 showing the placement of a plurality of blocks or panels to assemble a larger image, the plan also usable as part of a kit 805 of panels (e.g., blocks) that includes the assembly plan (including the locations for block 878A and 878B). In some embodiments, a kit 806 of blocks, tiles, or panels is provided, along with plan 879 from which an overall image can be created.

Figure 8D:
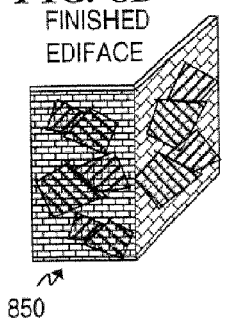
FIG. 8D is a perspective view of a finished edifice assembled from a plurality of blocks or panels to form a larger image.

FIG. 8D is a perspective view of a finished edifice 850 assembled from a plurality of blocks or panels to form a larger image.

Figure 8E:
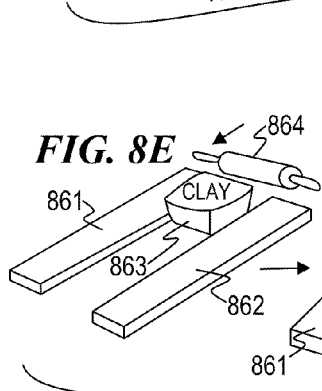
FIG. 8E is a perspective view of a configuration 860 usable to form a flat substrate of plastic material 863 (such as clay).

FIG. 8E is a perspective view of a configuration 860 usable to form a flat substrate of plastic material 863 (such as clay). In some embodiments, two boards 861 and 862 of equal thickness are provided, and clay 863 (or other suitable material) is rolled (e.g., using roller 864) to a flat even substrate.

Figure 8F:
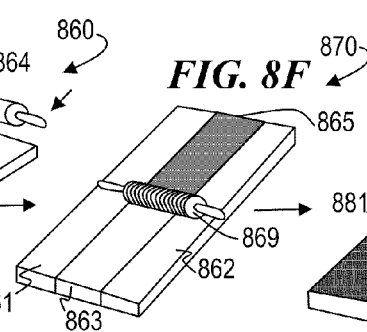
FIG. 8F is a perspective view of a configuration 870 usable to form a grooved surface on the flat substrate of plastic material 863.

FIG. 8F is a perspective view of a configuration 870 usable to form a grooved surface on the flat substrate of plastic material 863. In some embodiments, grooved roller 869 provides grooved surface 865.

Figure 8G:
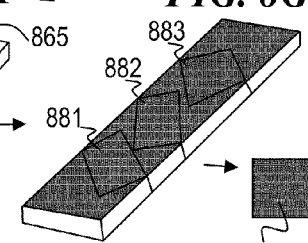
FIG. 8G is a perspective view of a configuration 880 usable to form individual tiles each having a grooved surface, where the grooves are of different given angles on the different tiles.

FIG. 8G is a perspective view of a configuration 880 usable to form individual tiles each having a grooved surface, where the grooves are of different given angles on the different tiles. In some embodiments, a plurality of tiles 881, 882, and 883 are cut from substrate 863 and different angles to the grooves.

Figure 8H:
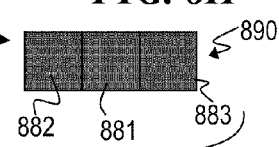
FIG. 8H is a front view of a section of an image formed using a plurality of the grooved tiles.

FIG. 8H is a front view of a section of an image formed using a plurality of the grooved tiles. In some embodiments, plurality of tiles 881, 882, and 883 are assembled as a series of contiguous blocks forming part of a bigger pattern of grooved tiles.

Figure 9A:
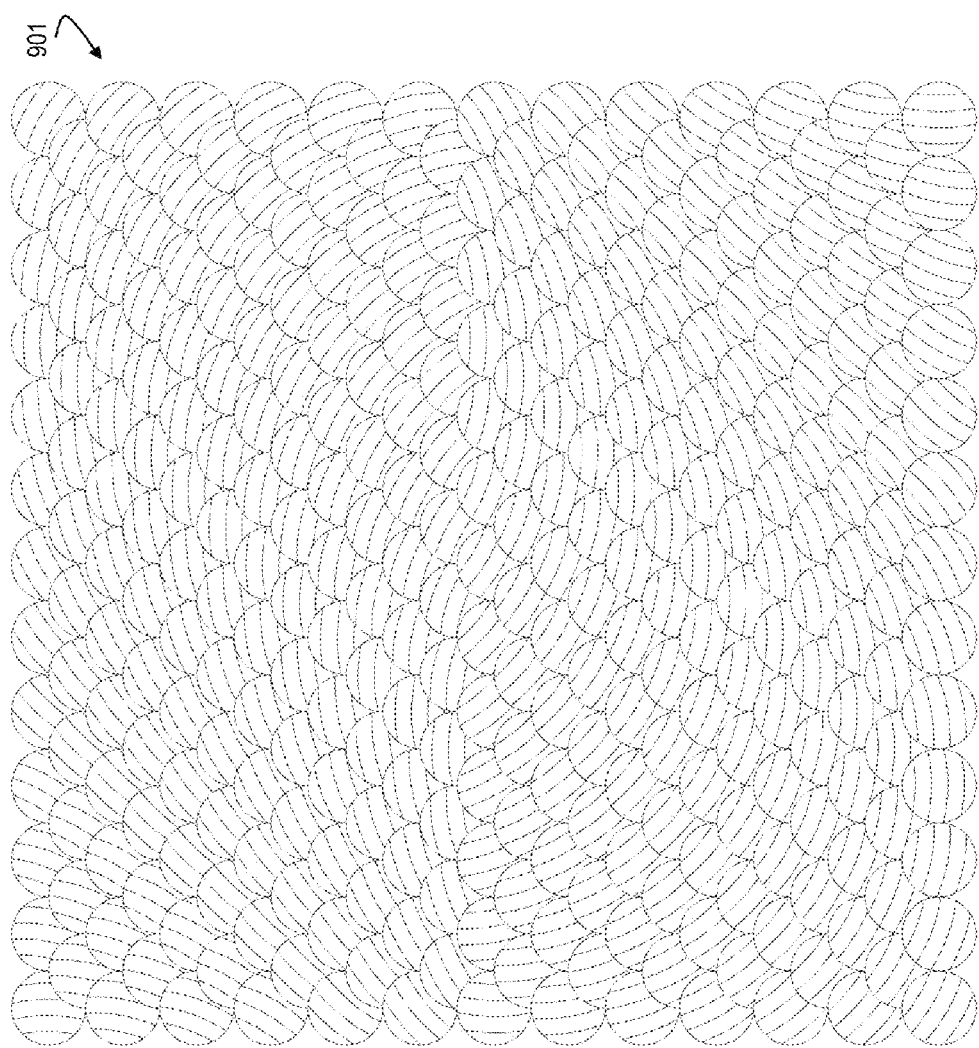
FIG. 9A is a front view of a panel design 901 formed using a plurality of the grooved shell-shaped pixels, each pixel having a set of equal-spaced curved lines.

FIG. 9A is a front view of a panel design 901 formed using a plurality of the grooved shell-shaped pixels, each pixel having a set of equal-spaced curved lines. Although the appearance of such a panel is of overall curved swirls, the pattern when viewed in a moving car or if the panel is rotates is of moving chevrons having straight sides.

Figure 9B:
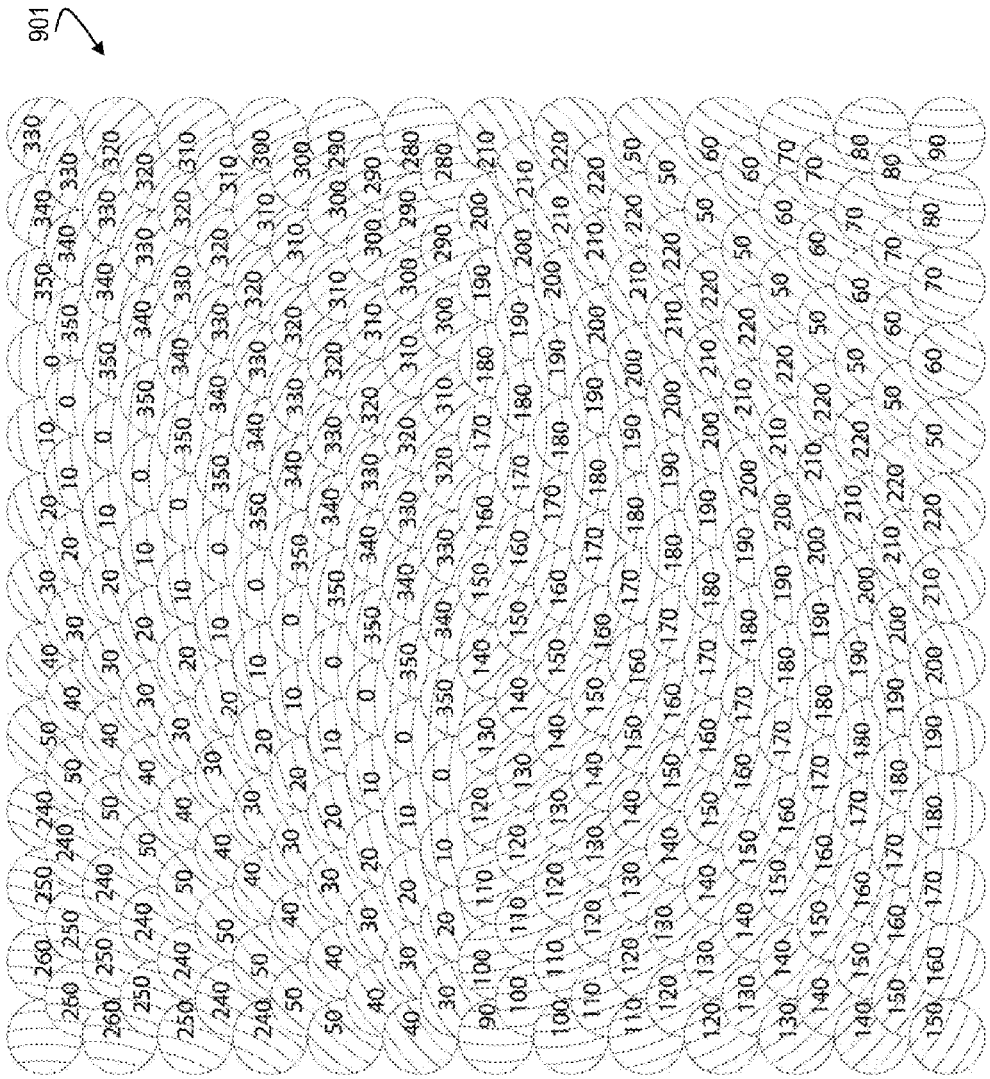
FIG. 9B is a front view of a panel design 901 formed using a plurality of the grooved shell-shaped pixels, each pixel having a set of equal-spaced curved lines, showing the angle of rotation for each pixel.

FIG. 9B is a front view of a panel design 901 formed using a plurality of the grooved shell-shaped pixels, each pixel having a set of equal-spaced curved lines, showing the angle of rotation for each pixel (the number in each pixel represents the number of degrees the ridge-direction angle is rotated).

FIG. 9C is a front view of a panel design 901 formed using a plurality of the grooved shell-shaped pixels, each pixel having a set of equal-spaced curved lines, showing the angle of rotation for each pixel. The pattern of lighter and darker shaded stripes is shown as seen by a viewer 99 in the lower right. As viewer 99 moves right to left (in direction 930), the diagonal stripes on the bottom half of the image (e.g., dark stripe 920 and light stripe 927) have an apparently smooth movement to the left, while the diagonal stripes on the top half of the image (e.g., dark stripe 910 and light stripe 912) have an apparently smooth movement to the right.

Figure 9D:
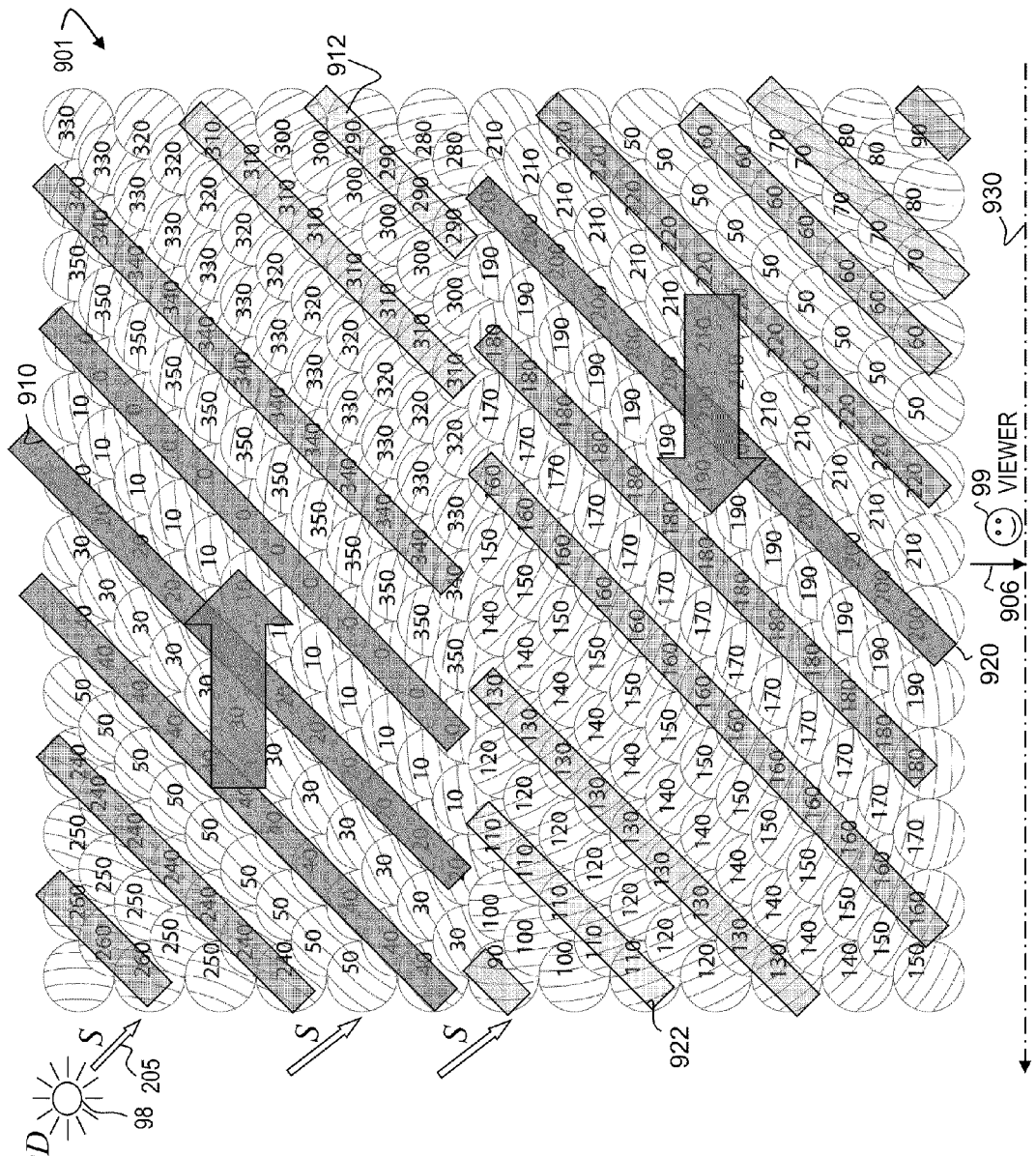
FIG. 9D is a front view of a panel design 901 formed using a plurality of the grooved shell-shaped pixels, each pixel having a set of equal-spaced curved lines, showing the angle of rotation for each pixel. The pattern of lighter and darker shaded stripes is shown as seen by a viewer 99 in the lower center.

FIG. 9D is a front view of a panel design 901 formed using a plurality of the grooved shell-shaped pixels, each pixel having a set of equal-spaced curved lines, showing the angle of rotation for each pixel. The pattern of lighter and darker shaded stripes is shown as seen by a viewer 99 in the lower center (i.e., as viewed from viewing direction 906).

Figure 9E:
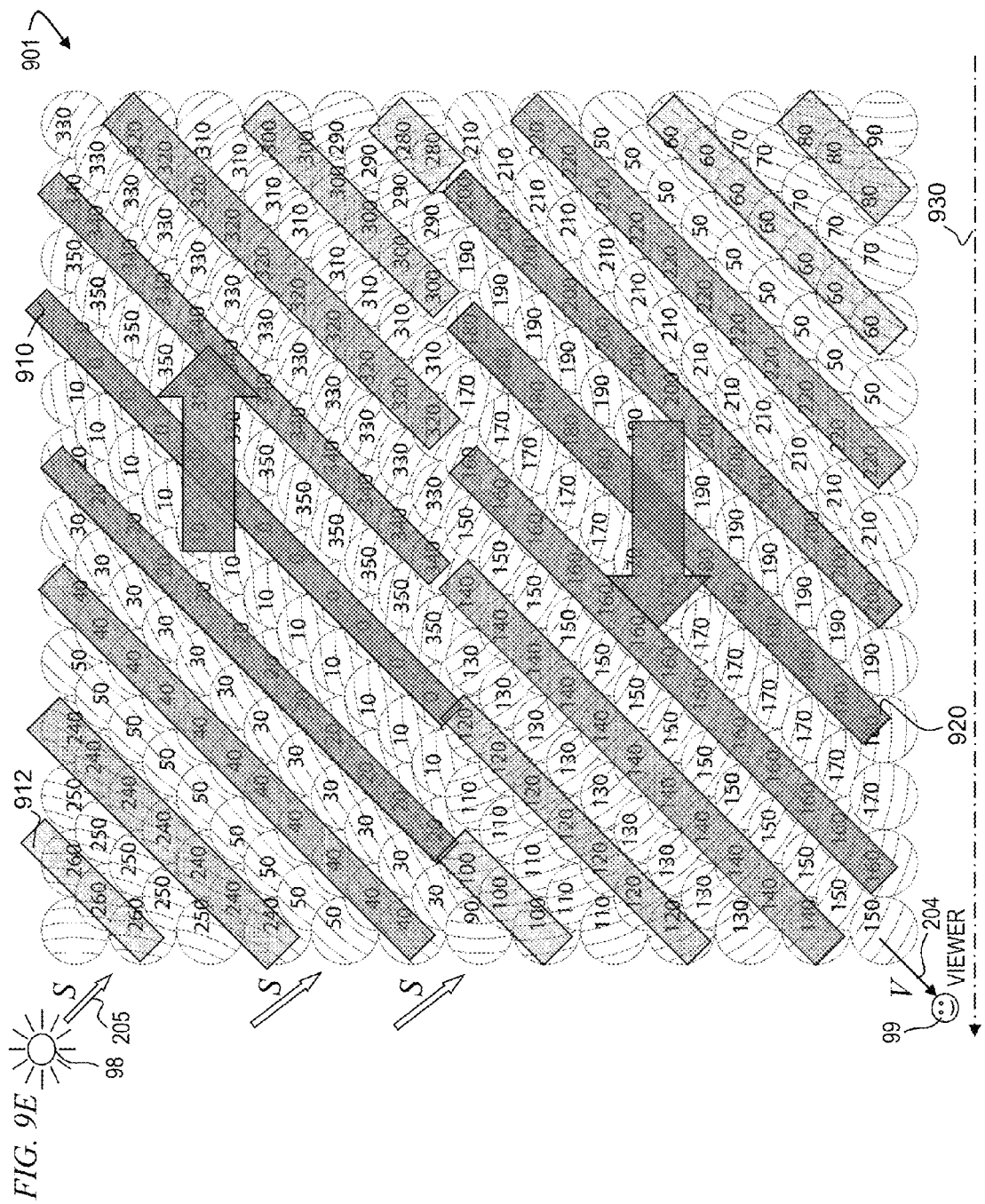
FIG. 9E is a front view of a panel design 901 formed using a plurality of the grooved shell-shaped pixels, each pixel having a set of equal-spaced curved lines, showing the angle of rotation for each pixel. The pattern of lighter and darker shaded stripes is shown as seen by a viewer 99 in the lower left. As viewer 99 moved right to left, the diagonal stripes on the bottom half of the image have an apparently smooth movement to the left, while the diagonal stripes on the top half of the image have an apparently smooth movement to the right.

FIG. 9E is a front view of a panel design 901 formed using a plurality of the grooved shell-shaped pixels, each pixel having a set of equal-spaced curved lines, showing the angle of rotation for each pixel. The pattern of lighter and darker shaded stripes is shown as seen by a viewer 99 in the lower left. As viewer 99 moved right to left, the diagonal stripes on the bottom half of the image have an apparently smooth movement to the left, while the diagonal stripes on the top half of the image have an apparently smooth movement to the right. With a larger pattern of pixels or more rotation between adjacent pixels, the pattern would move faster or farther.

Figure 10A:
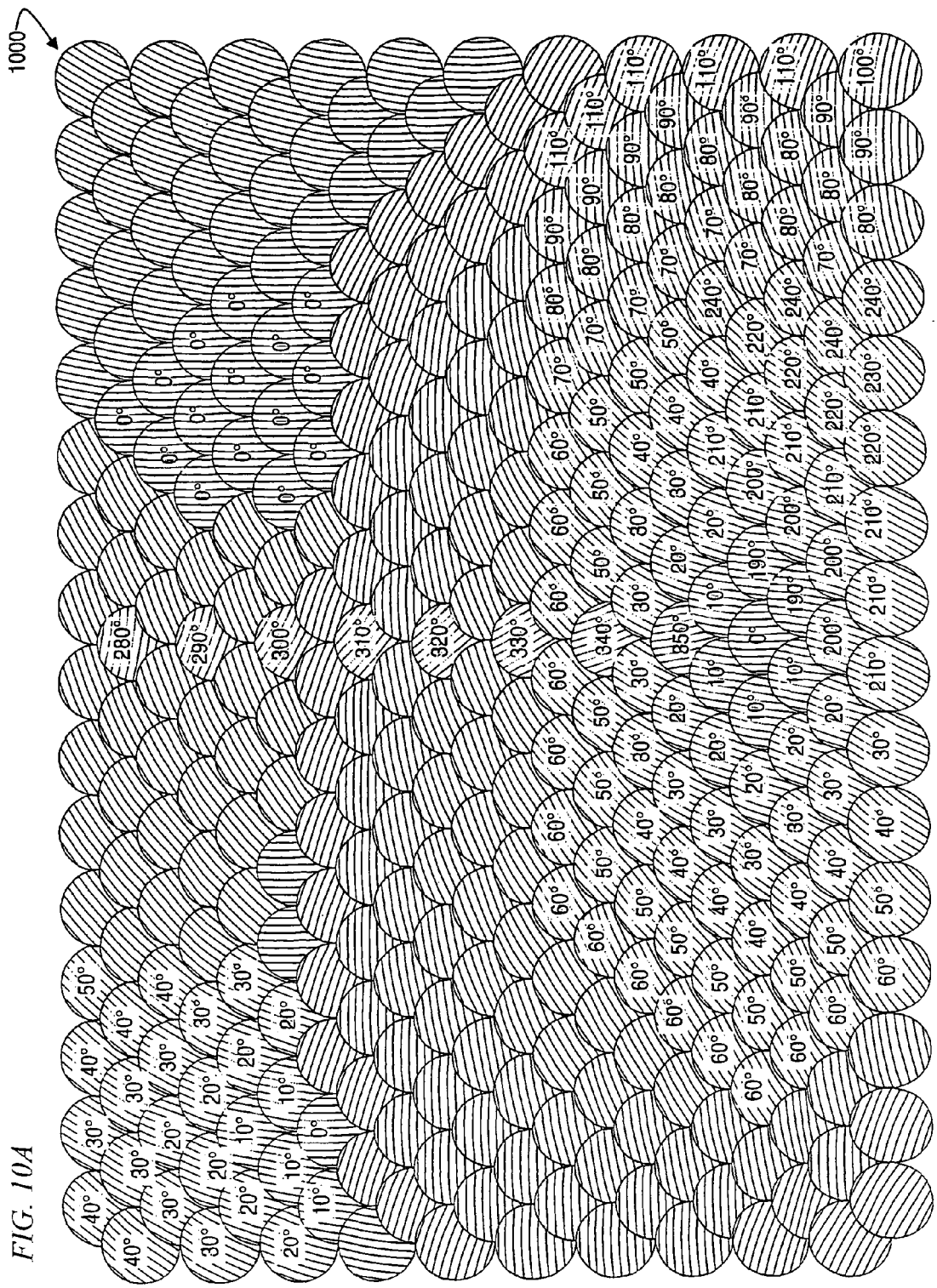
FIG. 10A is a front view of a panel design 1000 formed using a plurality of the grooved shell-shaped pixels, each pixel having a set of equal-spaced curved lines, showing the angle of rotation for each pixel. For this image, a much more complex moving pattern is generated, having an apparently smooth movement in many different directions.

FIG. 10A is a front view of a panel design 1000 formed using a plurality of the grooved shell-shaped pixels, each pixel having a set of equal-spaced curved lines, showing the angle of rotation for each pixel. For this image, a much more complex moving pattern is generated, having an apparently smooth movement in many different directions.

Figure 10B:
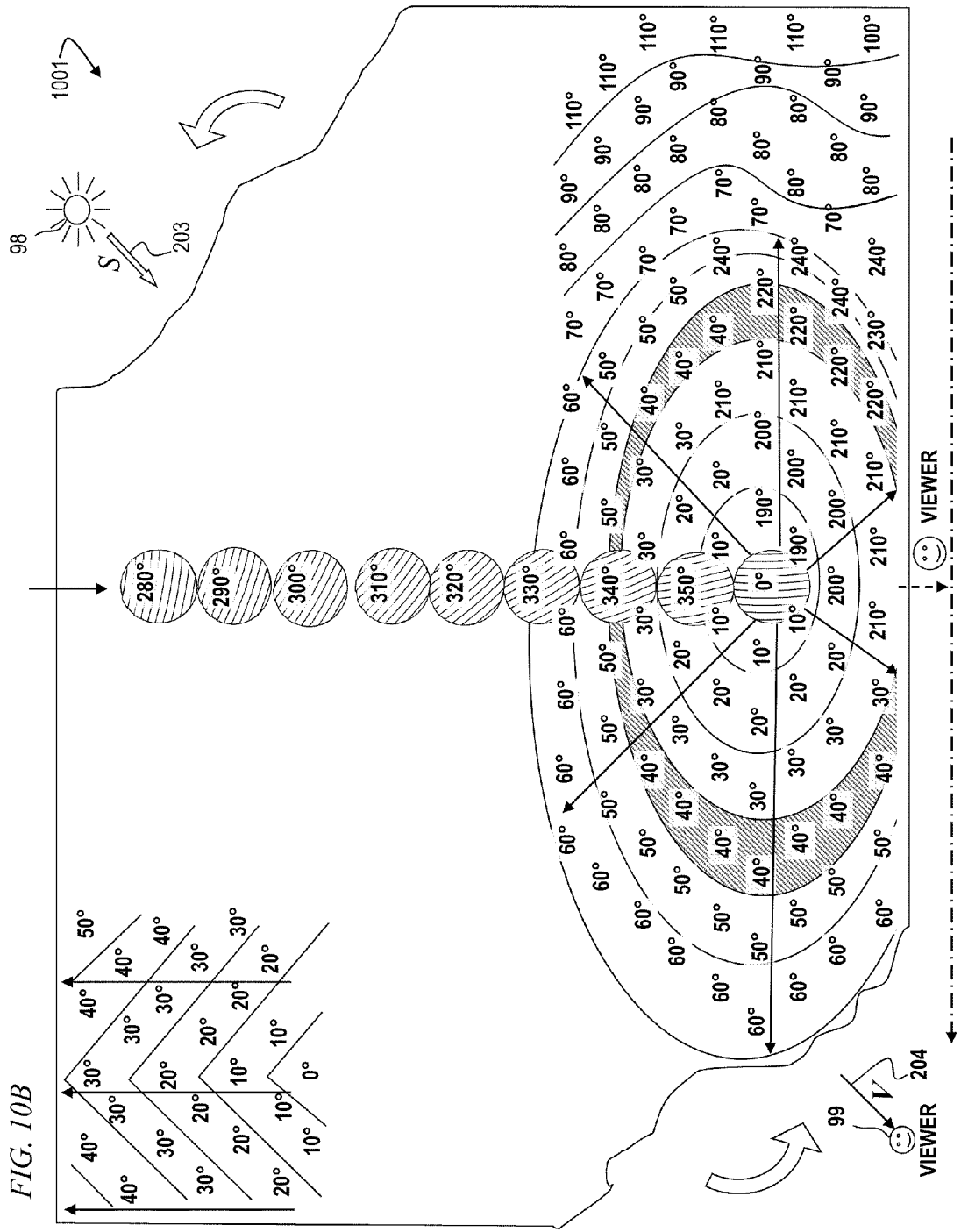
FIG. 10B is a front view of a motion design map 1001 formed using a plurality of the grooved shell-shaped pixels, each pixel having a set of equal-spaced curved lines, showing the angle of rotation for each pixel. For this image, the moving pattern is defined showing the many different directions of line movement.

FIG. 10B is a front view of a motion design map 1001 formed using a plurality of the grooved shell-shaped pixels, each pixel having a set of equal-spaced curved lines, showing the angle of rotation for each pixel. For this image, the moving pattern is defined showing the many different directions of line movement.

Figure 10C:
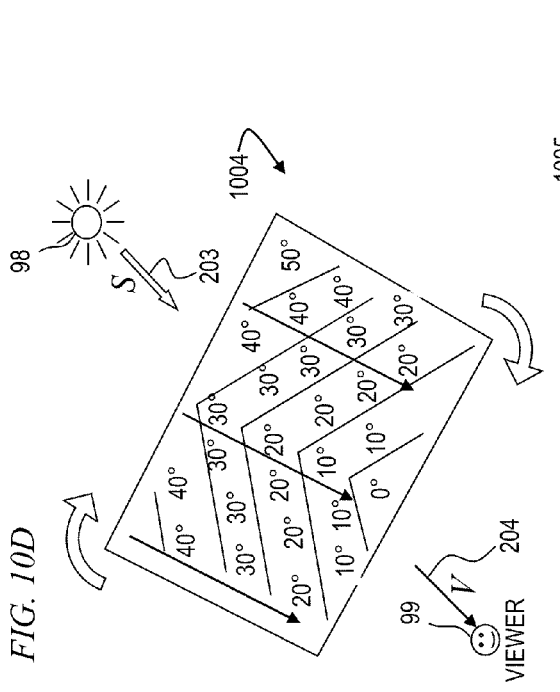
FIG. 10C is a perspective view of a moving chevron pattern 1003 formed by rotation of the panel in a counterclockwise direction between the illumination source 98 and viewer 99. For this image, the moving pattern is defined showing each chevron-shaped section of pixels having an incrementally higher angle of rotation of its ridge-direction angle, and the moving image appears to move and the light and dark pattern proceeds towards the pointy end of the chevrons as the panel rotates.

FIG. 10C is a perspective view of a moving chevron pattern 1003 formed by rotation of the panel in a counterclockwise direction between the illumination source 98 and viewer 99. For this image, the moving pattern is defined showing each chevron-shaped section of pixels having an incrementally higher angle of rotation of its ridge-direction angle, and the moving image appears to move and the light and dark pattern proceeds towards the pointy end of the chevrons as the panel rotates.

Figure 10D:
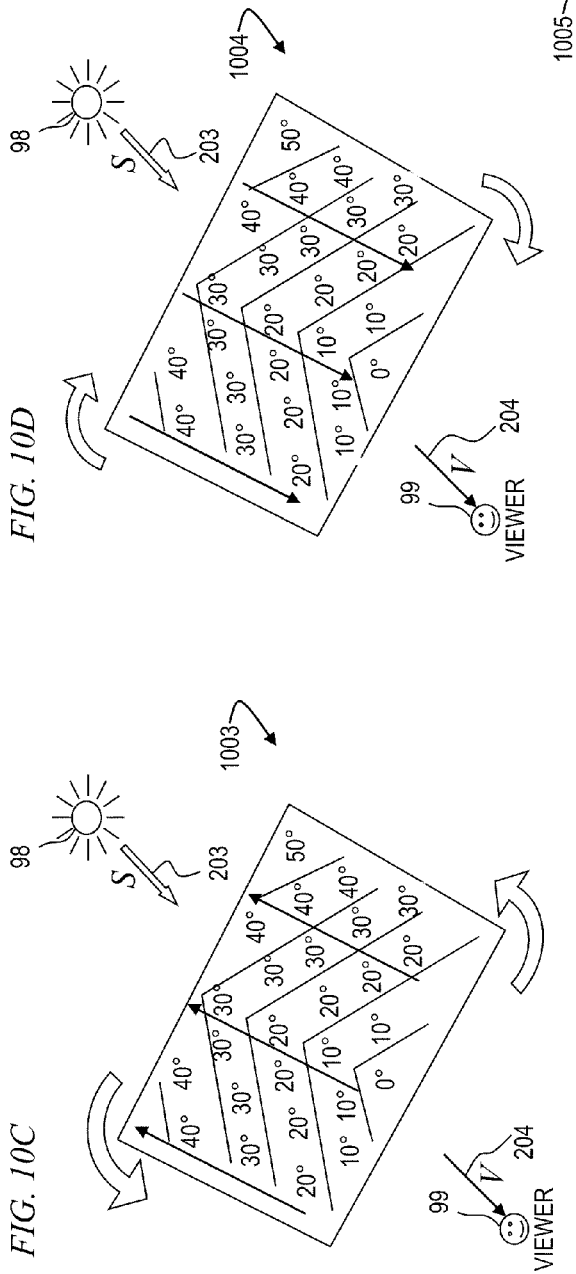
FIG. 10D is a perspective view of a moving chevron pattern 1003 formed by rotation of the panel in a clockwise direction (e.g., on a turntable) between the illumination source 98 and viewer 99. For this image, the moving pattern is defined showing each chevron-shaped section of pixels having an incrementally higher angle of rotation of its ridge-direction angle, and the moving image appears to move and the light and dark pattern proceeds away from the pointy end of the chevrons as the panel rotates.

FIG. 10D is a perspective view of a moving chevron pattern 1003 formed by rotation of the panel in a clockwise direction (e.g., on a turntable) between the illumination source 98 and viewer 99. For this image, the moving pattern is defined showing each chevron-shaped section of pixels having an incrementally higher angle of rotation of its ridge-direction angle, and the moving image appears to move and the light and dark pattern proceeds away from the pointy end of the chevrons as the panel rotates.

Figure 10E:
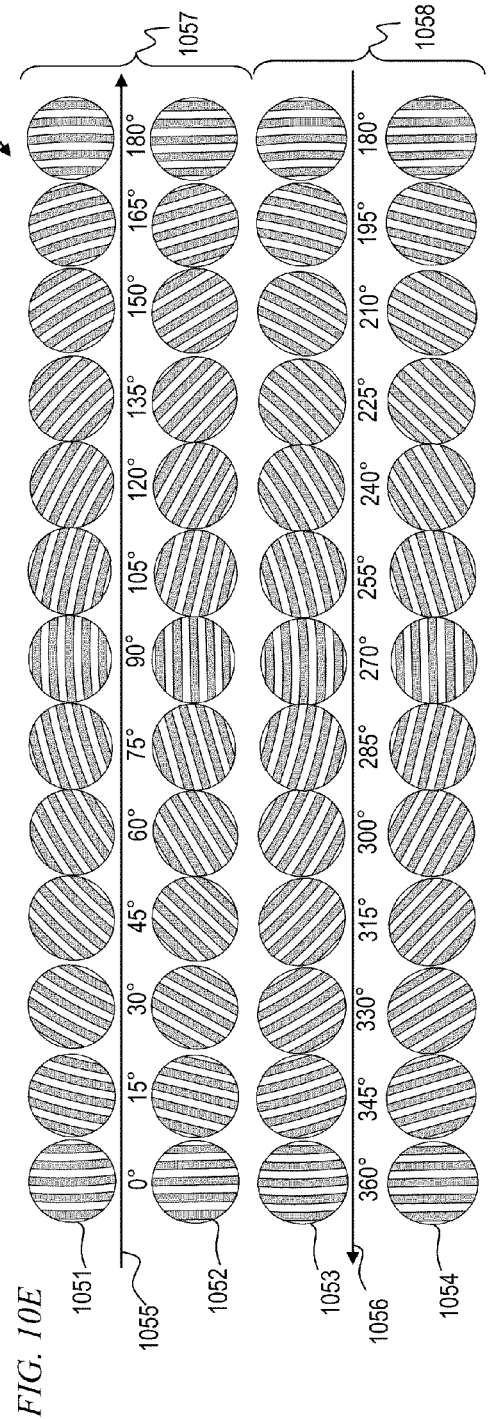
FIG. 10E is a front view of a portion of a panel design 1005 formed using a plurality of the grooved shell-shaped pixels, each pixel having a set of equal-spaced curved lines, showing the angle of rotation for each pixel. For group 1057-(lines 1051 (curved inside lines) and 1052 (straight inside lines)), the light and dark pattern moves left to right (direction 1055) with rotation of the panel in a counterclockwise direction between the illumination source 98 and viewer 99. For group 1058 (lines 1053 (curved inside lines) and 1052 (straight inside lines)), the light and dark pattern moves right to left (direction 1056), with rotation of the panel in a counterclockwise direction between the illumination source 98 and viewer 99. With panel rotation in a clockwise direction between the illumination source 98 and viewer 99, the direction of movement is in the opposite direction.

FIG. 10E is a front view of a portion of a panel design 1005 formed using a plurality of the grooved shell-shaped pixels, each pixel having a set of equal-spaced curved lines, showing the angle of rotation for each pixel. For group 1057 (lines 1051 (curved inside lines) and 1052 (straight inside lines)), the light and dark pattern moves left to right (direction 1055) with rotation of the panel in a counterclockwise direction between the illumination source 98 and viewer 99. For group 1058 (lines 1053 (curved inside lines) and 1052 (straight inside lines)), the light and dark pattern moves right to left (direction 1056), with rotation of the panel in a counterclockwise direction between the illumination source 98 and viewer 99. With panel rotation in a clockwise direction between the illumination source 98 and viewer 99, the direction of movement is in the opposite direction.

FIG. 11 is a flow chart 1100 showing three different line-generation processes (A. CONVERT TO CONTINUOUS-LINE FIGURE (block 1112), B. CONVERT TO AREA-FILL LINE FIGURE (block 1114), and C. CONVERT TO HALF-TONE OR PIXEL FIGURE (block 1116)) that are used, in various embodiments, to define lines for a grooved panel. In some embodiments, all three line-generation processes begin with a pattern being created or obtained at block 1110. In some embodiments, block 1112 refers to process A that converts the pattern from block 1110 to a continuous-line figure. In some embodiments, block 1114 refers to process B that converts the pattern from block 1110 to an area-fill line figure. In some embodiments, block 1116 refers to process C that converts the pattern from block 1110 to a halftone or pixel figure. In some embodiments, the three conversion processes 1112, 1114, and 1116 output their results to block 1118, which refers to the generation of a grooved panel.

FIG. 12 is a series of images 1200 showing application of two different line-generation processes that are used, in various embodiments, to define lines for a grooved panel.

FIG. 13 is a series of images 1300 showing application of two different line-generation processes that are used, in various embodiments, to define lines for a grooved panel.

FIGS. 14A, 14B and 14C is a series of images 1400 showing application of two different line-generation processes that are used, in various embodiments, to define lines for a grooved panel.

Note that the above configurations are descriptions of the various panels being used on a vertical surface or wall.

In other embodiments, the invention maybe used on the horizontal surfaces of walkways, patios, driveways, or streets or other uses in the horizontal context, or as a decorative and/or information-bearing treatments for interior vertical wall panels, such as building interior walls, pictorial or decorative motifs in architecture, or for construction surfaces such as retaining walls, noise walls, traffic dividers, bridge abutments, and other exposed wall components. In some embodiments, the design, directionality, and shape of the grooves provide a decorative effect. In some embodiments, the grooves provide text or other informational graphics or icons to inform a viewer (e.g., of highway features such as a curve or upcoming turn, or of travel the wrong way down a roadway). In some embodiments, the grooves have a slight slope towards one direction and a steep slope towards a different direction in order that the text or other information is clearly viewable from one direction, but not noticeable or viewable from the other direction. For example, on the face of a substantially vertical barrier around the outside of a curve, the cars approaching the curve from a first direction would see only an arrow, or other graphic, icon and/or text (e.g., composed of the groove walls that are steep facing towards traffic approaching from the left) pointing to a right turn on the face of the barrier, while traffic approaching the curve from the opposite end would see only an arrow (e.g., composed of the groove walls that have a steep face facing towards traffic approaching from the right) pointing to a left turn on the same face of the barrier, but the traffic in either direction would not see the graphic or text directed towards traffic going the other way.

In some embodiments, this invention differs from previous wall sculpture in that it produces images in light and dark through the use of pointed ridges at particular angular relationships to produce areas of light and shade, with the areas of light and dark created changing location (and, if desired, changing shape) with the change in the angle of the light source or angle of viewpoint of the observer, with the direction and speed of the movement of light and dark areas and their relative contrast controlled by the designer, with ridges which may have a consistent height or depth over the entirety of the design.

In some embodiments, angled ridges are also used to produce differences in light and shade on the surface, but does it through pointed ridges to distinctly separate light and dark sides, which curve as they move across the surface, or as discreet areas in the shape of the desired part, with ridges or grooves at an angle appropriate to the change in lightness of the adjacent areas of the image. In at least one embodiment, because the ridges are at various angles to the light source, they will be variably illuminated. In still one further embodiment, ridges parallel to an angled light source will be fully filled with light and will be the brightest areas of the composition, while ridges perpendicular to the light source will be in full shade. In some embodiments, all the angles between will give proportionate amounts of light and shade. In some embodiments, the light value of all grooves or ridges will change with a change in the angle of the light source and will also change with a change in the position of the viewer.

In some embodiments, besides the shadow generation, there will be a change in brightness on the lighted surfaces of the ridges due to their orientation to the light source. In one embodiment, surfaces that are at the optimal brightness (i.e., mirror angle) angle to the light source give the greatest illumination to the viewer, and as the angle diverges from this optimal alignment, the relative brightness diminishes. When the light source moves, new portions have the optimal angle. In some embodiments, when the observer changes location, new portions come into this optimal orientation, and when this happens, former "optimal" areas appear to darken.

In some embodiments, when the light source changes location, such as the movement of the sun, the various amounts of brightness in individual ridges changes, as formerly fully illuminated ridges now become partially shaded, fully shaded ridges now become partially illuminated, and each of the various angles between have a change in brightness, some brighter and some darker depending on their orientation to the light source. In at least one embodiment, this change may be used to approximate the changing illumination of the movement of the sun on three-dimensional objects or for special artistic effects.

In some embodiments, the angle of the viewer affects the perception of brightness of the surface. In at least one embodiment, because the surface is ridged, a person viewing from straight in front of the surface would have an unobstructed view of the illuminated peaks and valleys of ridges in alignment with the viewer's line of sight, but a change in the viewer's angle will progressively obstruct the ability to see fully into each of the ridges. In some areas, full illumination will be seen at a lower angle and the perceived brightness will decrease. Ridges that present partial illumination and partial shadow will have either increased brightness or shadow, depending on the angle of the ridge and its relationship to the light. In some embodiments, because the ridges begin to obstruct the view of the entire "valley", ridges at an angle where the shadow is clearly seen will have portions of the illuminated side proportionately less visible and these ridges will therefore appear darker. In a similar manner, partially illuminated ridges at an angle where the illuminated side is clearly seen will have portions of the shaded side proportionately less visible and these ridges will appear proportionally brighter. This change is continuous with continuous movement. For example, in some embodiments, a horizontal ridge at standing height would be fully observable from any standing position, while a vertical ridge may be fully observable only from directly in front of the composition or a given number of degrees to either side, equal to the angle of the sides of the groove. In some embodiments, when viewed at an angle greater than the angle of the ridge, portions of the valley become progressively obscured. In some embodiments, angles between horizontal and vertical have proportionate observability (and hence degree of perceived brightness) of the ridge. Further, in at least one embodiment, because a different depth is observable at any difference in angle, the amount of light change over the surface is not uniform, but varies continuously with the changes in angles. In some embodiments, by keeping the angle changes in an appropriate sequence, the brightness change can be made to approximate the changes observable in three-dimensional objects.

In some embodiments, by arranging the change in ridge-direction angles, with differing angle change-regimes in some areas of the composition relative to other areas of the composition, it is possible to cause the movement of areas of brightness to change at proportionally different rates within the composition. For example, in at least one embodiment, when using grooves or pixels (areas of grooves) of the same size, causing a change in the rate of the angular change from groove-to-groove or area-to-area (pixels or sections of grooves) will change the rate of motion of the light and dark areas change across the image (different areas have image motions at different velocities), and the motion direction and velocity can change at the discretion of the designer. For example, of the pixel-to-pixel angle change is ten degrees per pixel (side-by-side pixels have ridge direction angles that differ by 10 degrees), the movement of light in those areas of pixels will be twice as fast as areas having a pixel-to-pixel angle change of five degrees per pixel (side-by-side pixels have ridge direction angles that differ by 5 degrees). Further, the direction of image movement matches the direction of angle change (e.g., if pixels along a curving line up and to the right have a pixel-to-pixel angle change of five degrees per pixel, the light pattern will move at a fairly slow rate along that curving line, while if pixels along a straight line down and to the right have a pixel-to-pixel angle change of fifteen degrees per pixel, the light pattern will move at a fairly fast rate along that straight line).

The designer can thus have different directions of light-pattern movement and different speeds of light-pattern movement simultaneously in different portions of the same overall grooved panel.

In some embodiments, when changing the grooves by angular rotation, arranging the change in groove angles such that the angular rotation in some areas is clockwise while in other areas the angular rotation is counter-clockwise, it is possible to cause the areas of brightness or shade to move right-to-left (e.g., or diagonally, etc.) in some areas of the composition while other areas move left-to-right (e.g., or diagonally, etc.) with change in either light source or viewer position, or to have these areas of brightness move diagonally in opposing directions, or even to have circular areas appear to counter-rotate.

In at least one embodiment, the level of contrast and subsequent brightness change can be modified through varying the angle of the ridges or grooves. A ridge or groove with a shallow angle in general is brighter, as it will accept light from a lower angle and will only begin to obscure vision into the valley at this lower angle. In some embodiments, a ridge or groove with a sharp angle will in general be darker, as it will accept light from a narrower angle, and will quickly begin to obscure the observer's view of the complete groove.

For purposes of design, in some embodiments, specific areas representing individual component areas of the image might all have the same angle, or all have the same curve within the boundaries of that area, with changes in the angle or curves in the adjacent portion of the image. In some embodiments, in the image of a plant this might be separate areas for the stem, leaves, and petals. In another image of a girl, this might be separate areas for the nose, mouth, eyes, hair, blouse, etc.

In some embodiments, another method of producing the needed light and shade is to curve the lines to the orientation needed to give the appropriate brightness or shadow to describe the desired image. For example, in some embodiments, with overhead lighting, the ridge would be at a diagonal for one area of a girl's blouse, changing to another diagonal for the collar, becoming vertical where the face is brightest (e.g., chin, nose, cheekbones, forehead), and bending horizontally to depict dark hair.

One embodiment has a series of ridges or groves on a surface set at angles to the light source, which create differing levels of brightness to create an image. In some embodiments, the grooves or ridges may be contained within specific shapes which define that component of the image (e.g., leaf, stem, petal, background) and are set at an angle which will give a brightness differing from the adjacent component parts of the image, or the grooves or ridges may be curved to specific angles in the areas of the specific components to give brightness change to distinguish it from other component elements of the composition. In some embodiments, the various component areas of light and dark change location with movement of the angle of the light source or angle of the viewer. The various component areas of light and dark change location, in some embodiments, in the direction determined by the designer, and at the speed determined by the designer.

In some embodiments, there are two reasons for the change in brightness: increasing or decreasing illumination of the groove by the angle angled toward or away from the light source, and the view of the observer, seeing all or only part of the grooves.

When the groove or ridge is parallel to the light source, in some embodiments, it is fully illuminated from the peaks to the valley. The same groove, when angled, is more fully illuminated on the side opposite the light source, and the angled light falling on the side closer to the light source receives proportionately less light. In some embodiments, the further the groove gets from parallel the higher the illumination of the side opposite the light, and the lesser the light falling on the closer side, till at a point determined by the angle of the light source and the angle of the valley, the side closer to the light source comes into shadow. In some embodiments, the light this now-shadowed side now receives comes from the brightly lit face opposite it. As the angle becomes increasingly further from parallel, the illuminated side begins to be in increasing degrees of shadow, and hence gives less light to the shadowed side. In some embodiments, this quality gives the continuum of brightness available to the angling of the ridges.

In at least one embodiment, a person observing the ridges from a particular viewpoint will see the full range of light to dark ridges from where he or she is standing. The relative brightness will be caused by two factors: the brightness of the two sides of the ridge valley as described above, and the amount of the valleys that are observable from the viewer's observation point. From a given viewing angle, in some embodiments, the observer may see only half way into a ridge which is angled to the light source; when the observer moves one direction (for example, to the right) it will give a better and fuller view of the valley, while moving the other (for example, to the left) he will have a more restricted view of the valley. If the ridge in question is well lit, an angle that gives a better view will give more light to the viewer, causing that area of the image to perceivably increase in brightness, and conversely, movement in the opposite direction will cause that area of the image to appear darker.

In some embodiments, the process is applied to produce visual images for decorative (and perhaps aesthetically pleasing) placards, panels, or other artistic forms. The above embodiments are only provided to illustrate some applications of the present process and are not meant to limit the possible embodiments of the present invention.

Example Mathematical Descriptions of Light-Responsive, Lustrous Surfaces

The grooves may be straight or curved, as needed, in order to produce the effects desired by the designer. In some embodiments, continuously curved lines are formed across at least a portion of a panel. In other embodiments, small contiguous areas (pixels) are formed (e.g., equally sized pixels in a Cartesian grid), wherein each pixel is covered by equally spaced similar parallel straight grooves, but on adjacent pixels, the parallel lines are (or can be) at different angles. Because of the different angles (e.g., when viewed from one viewing angle and illuminated primarily from one illumination angle), the pixels will provide different brightnesses to the viewer, from brightest when the grooves are oriented at a first angle in order to send the most light to the viewer, to darkest when the grooves are oriented at a second angle in order to send the least light to the viewer, and at various "grey" levels between the brightest and darkest when the pixels have grooves and intermediate angles.

In some embodiments, a computer program is provided with a pixilated image or an image that can be represented by pixels of different brightnesses or grey levels. In some embodiments, the computer is provided with a given illumination angle (e.g., the angle of the sun at a certain time of day relative to the plane of the panel, or the direction of artificial illumination such as traffic headlights) and a given viewing angle (e.g., the angle of the viewer relative to the plane of the panel), and using formulas having vector cross products (e.g., the vector cross product of the illumination vector S and the viewing vector V provides a first normal vector N1 that is perpendicular to both input vectors, and the vector cross product of (V+S)/2 (a vector average of the illumination vector S and the viewing vector V) with normal vector N1 provides a second normal vector N2 that is perpendicular to both input vectors to the cross product. The plane that includes N1 and N2 is the plane providing the most reflectivity from the illumination vector S to the viewing vector V. In some embodiments, the computer then calculates a groove angle (the slope of the walls of the grooves) and a groove direction for each of a plurality of different relative brightnesses. In other embodiments, groove directions and groove angles are empirically derived by forming grooves, and measuring (or viewing) to determine the groove angle and direction of most brightness and least brightness, and these groove directions are input to the computer.

In some embodiments, for vertical panels, there is a vertical "split plane" that is perpendicular to the face of the vertical panel. In some embodiments, pixels having grooves having directions that are substantially parallel to the plane that contains vectors S and V will provide the most illumination to a viewer vector on the opposite side of the split plane as the illumination vector (assuming the illumination from above the panel and viewer below the panel, such as is typically the case for a panel on a building or other edifice wall), while pixels having grooves having directions that are substantially perpendicular to the plane that contains vectors S and V will provide the least illumination to a viewer vector on the opposite side of the split plane as the illumination vector. In some embodiments, the opposite is true when the viewer vector is on the same side of the split plane as the illumination vector. For example, a south-facing panel might be illuminated from the left in the morning but be illuminated from the right in the evening. When viewed from one side of the split plane in the morning, the image would show a bright background (e.g., the sky of an image) and a dark foreground (a bird flying in the sky), but in the evening would show a dark background (e.g., the sky) and a bright foreground (the bird flying in the sky), while showing a gradual change during the day as the illumination angle shifts.

Example Method of Making Light-Responsive Lustrous Surfaces

In some embodiments, the computer provides a visual representation of the panel as it would look installed in place on an edifice, and provides a simulation of how the image changes as viewing angles change and/or as illumination angles change. Thus, as described above, the computer takes the groove information and generates simulated images of how the panel would look in a variety of different circumstances.

In order to understand how a computer might take a design or figure such that the various areas of the image change in brightness with the change in angle of illumination and/or change in viewer position, refer again to FIG. 9C. In at least one embodiment, the various areas of light and dark (and/or intermediate grays) can be caused to move (i.e., the groove direction designed such that the various areas of light and dark change as the viewer moves relative to the panel and/or the light moves relative to the panel) in the direction and speed selected by the designer, with control of the relative contrast, using surface variations that are relatively constant over the surface of the panel. That is, in some embodiments, the grooves are all substantially the same depth, spacing, and wall-slope angle, such that the resulting panel (e.g., a concrete skin panel for a building) has a relatively constant thickness across its width and height, thus providing a light-weight panel (i.e., relatively thin) without weak areas that could crack due to weather (i.e., heating in the sun and then suddenly cooling in an incoming rain shower).

In some embodiments, a computer generates image information and the pixel groove information based upon certain shape, width, and, in some embodiments, layering information supplied by a user. In some embodiments, the data is then transmitted to a suitable mold or panel-making machine, such as a computer numeric-controlled (CNC) router or laser cutter, which then forms the specified grooves on a panel or mold face. In some embodiments, one or more panels are then formed from the mold by casting a liquid or semi-liquid material such as plaster or concrete or the like, or by embossing a semi-solid or plastic material such as a heated acrylic sheet. In some embodiments, this provides a grey-scale image when viewed from a suitable distance.

In some embodiments, a user using a vector graphics editor such as Adobe Illustrator™, Artworks™, CorelDRAW™, Synfig™, or NodeBox™ designs the pattern that will ultimately form the light responsive, lustrous surface. Such a program will require that the user provide information relating to the shape of the pattern, the width of the pattern and, in some embodiments, some way to distinguish between different features within a pattern. The ability to distinguish between certain feature within a pattern is a prerequisite to using the below described CNC or computer-aided manufacturing (CAM) software. For example, when using Adobe Illustrator™ a user will have to distinguish certain features through the use of differing colors for each feature. In some embodiments, once a pattern is designed it is saved in a format usable by some other software application. Some example file formats include EPS, PDF, WMF or SVG or some other suitable file format.

In some embodiments, the formatted file containing the pattern is passed to a second software (i.e., CNC software or CAM software) application residing on a CNC router or laser cutter. This software includes, for example, ArtCAM PrO™, Machinist ToolBox™, BobCADCAM™, SolidCAM™, or some other suitable software. In some embodiments, upon using this software a user will set the depth and sequence of cuts required for the pattern. In some embodiments, this software requires some way of distinguishing between various features of the pattern, so as to be able to cut these features into a sheet of suitable material. For example, ArtCAM Pro™ requires that features in a pattern contained in an Adobe Illustrator™ file be distinguished by different colors, such that the ArtCAM PrO™ software will treat each color as a different layer and will establish a path (i.e., a tool path) to this layer for the purpose of allocating various functionality to cut each layer or feature.

FIG. 15 is an example flow-chart/network diagram 1500 of a network with a computer 1501 containing a vector graphics editor application operatively coupled to a CNC machine 1504 containing a computer 1503 with CNC or CAM software contained thereon. The computer 1501 and computer 1503 are operative coupled via an internet 1502. In some embodiments, the result of these various systems components (e.g., Nos. 1501, 1502, 1503, 1504) working together is a competed master 1505.

Figure 16:
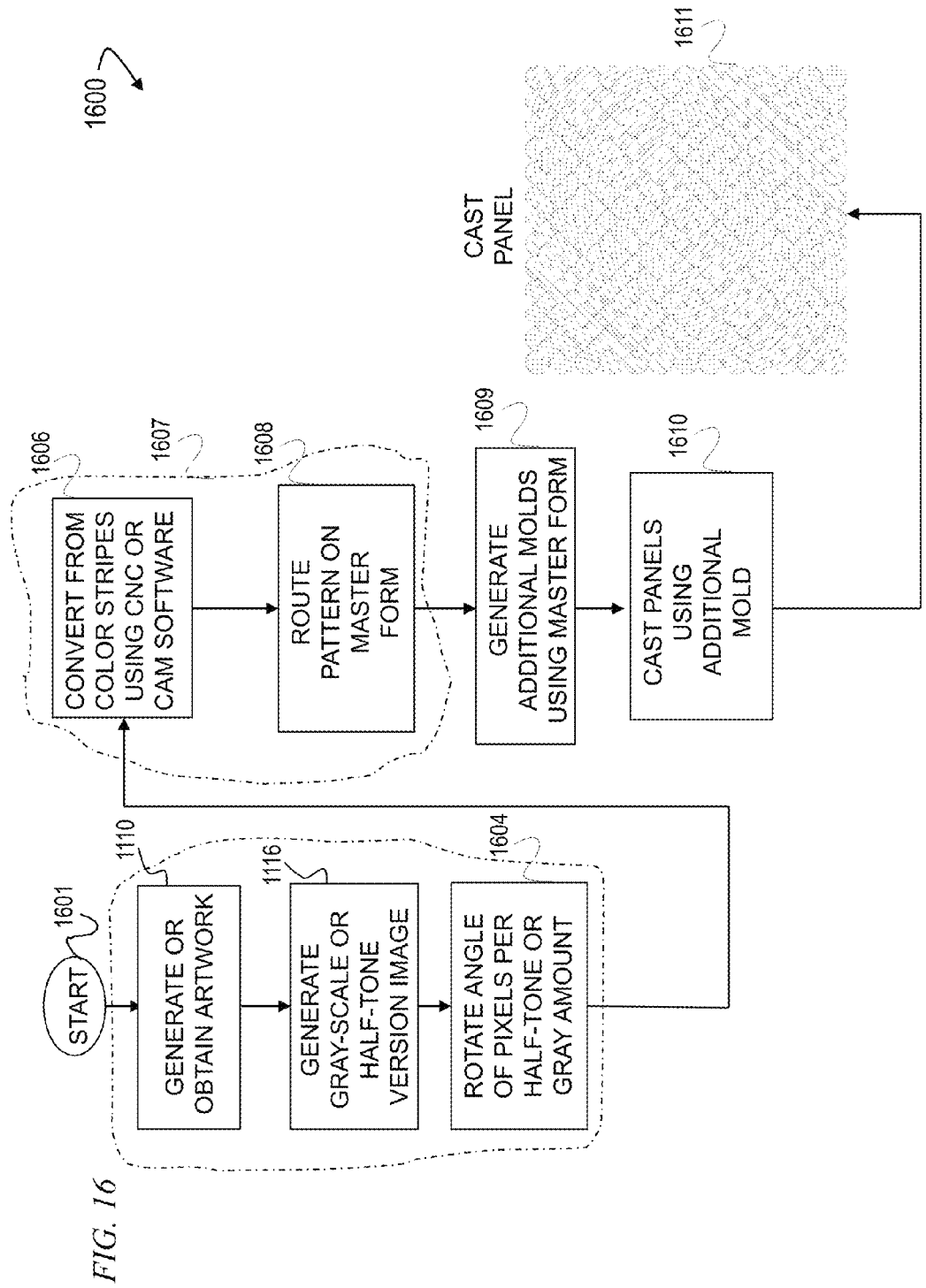
FIG. 16 is a flow chart 1600 showing a process that is used, in various embodiments, to define lines for a grooved panel, and to automatically generate a panel 1611 using the line definitions.

FIG. 16 is a flow chart of a computer method 1600. In some embodiments, method 1600 starts at block 1601 with the first step in the process being the generation or obtaining of artwork at block 1110. Next, block 1116 refers to a process that generates a gray-scale or half-tone version image. Then, the angles of various pixels are rotated 1604 based upon the gray-scale or half-tone version image generated by process 1116. Put another way, in some embodiments, using the gray-scale or half-tone version image generated by process 1116, various pixels are rotated at block 1604 so as to allow more or less light to be reflected (see below). The above-described vector graphics editor can, in some embodiments, implement these various steps 1110, 1116, and 1604 as a process 1605. In some embodiments, processes 1606 (which converts from color stripes using CNC or CAM software) and 1608 (which routes the pattern on a master form) are implemented via process 1607 such as a CNC or CAM software application. In some embodiments, once these processes 1605 and 1607 are complete, a process 1609 is implemented wherein various molds are generated from the master form. In some embodiments, a further process 1610 is implemented wherein additional panels can be cast from the molds created in process 1609. Cast panel 1611 is an example of such a panel.

Figure 17:
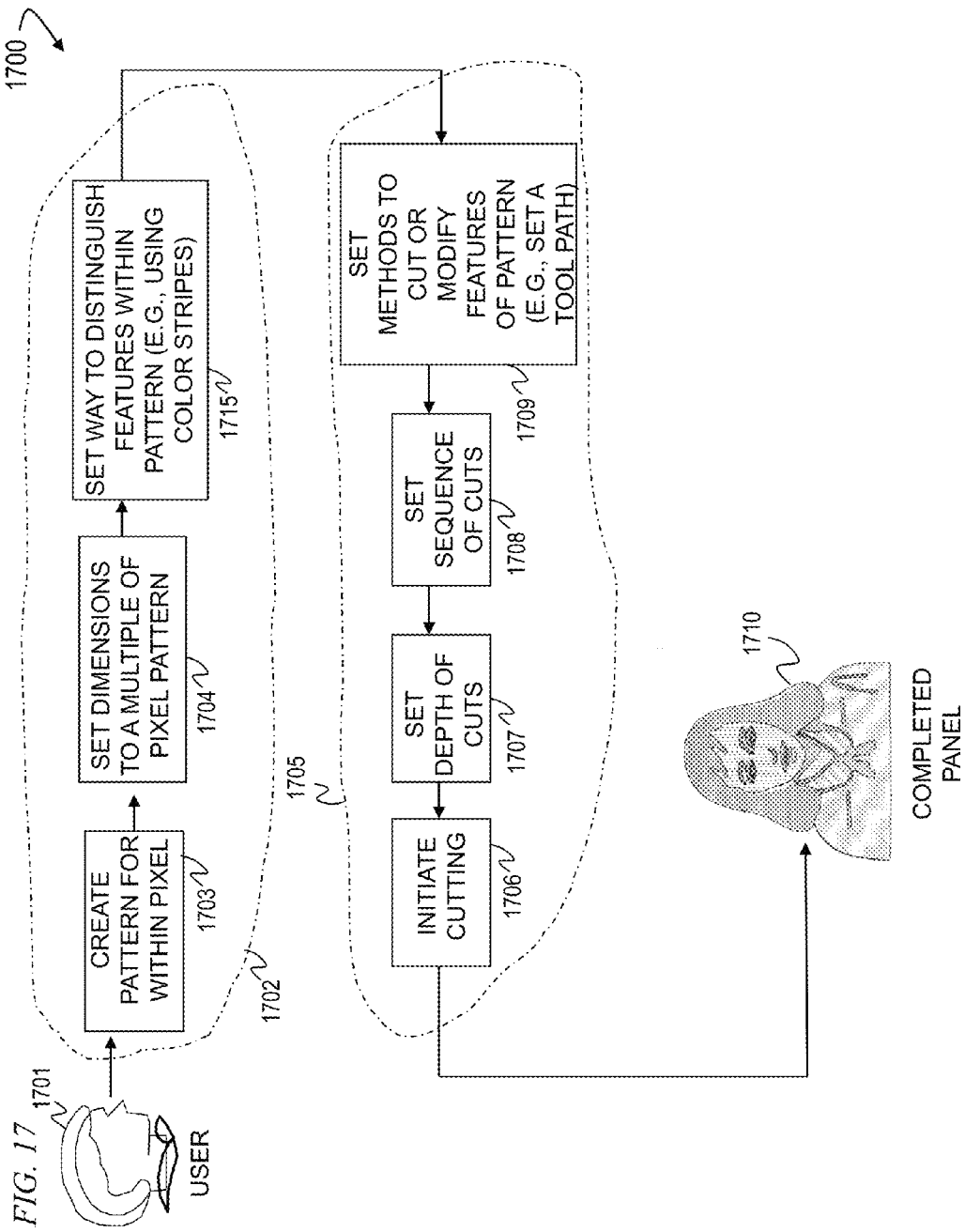
FIG. 17 is a flow chart 1700 showing a process that is used, in various embodiments, to define lines for a grooved panel, and to automatically generate a panel 1710 using the line definitions.

FIG. 17 is a flow chart 1700 of a computer based method for making a panel. In some embodiments, a user 1701 using a software application 1702 such as Adobe Illustrator™ uses a process 1703 to create a pattern within various pixels such that a further process 1704 is implemented that sets the dimensions of the pixel pattern. Next, a process 1715 is implemented wherein ways to distinguish features within the pattern are set. In some embodiments, color is used to distinguish features within a pattern. In some embodiments, numeric identifiers are used in lieu of color. Then, this pattern and associated features is saved as a vector graphics file, and passed to a process 1705 for further processing. In some embodiments, a process 1709 is initiated to set a method or a tool path for each of the features distinguished via a color. In some embodiments, a set sequence of cuts process 1708 is implemented to determine the first and last cuts, among others. Then, a process 1707 is implemented to set the depth of the cuts. In some embodiments, a process 1706 is initiated for cutting a panel with, in some embodiments, a router or laser. A completed panel 1710 is the result of the above processes.

Figure 18:
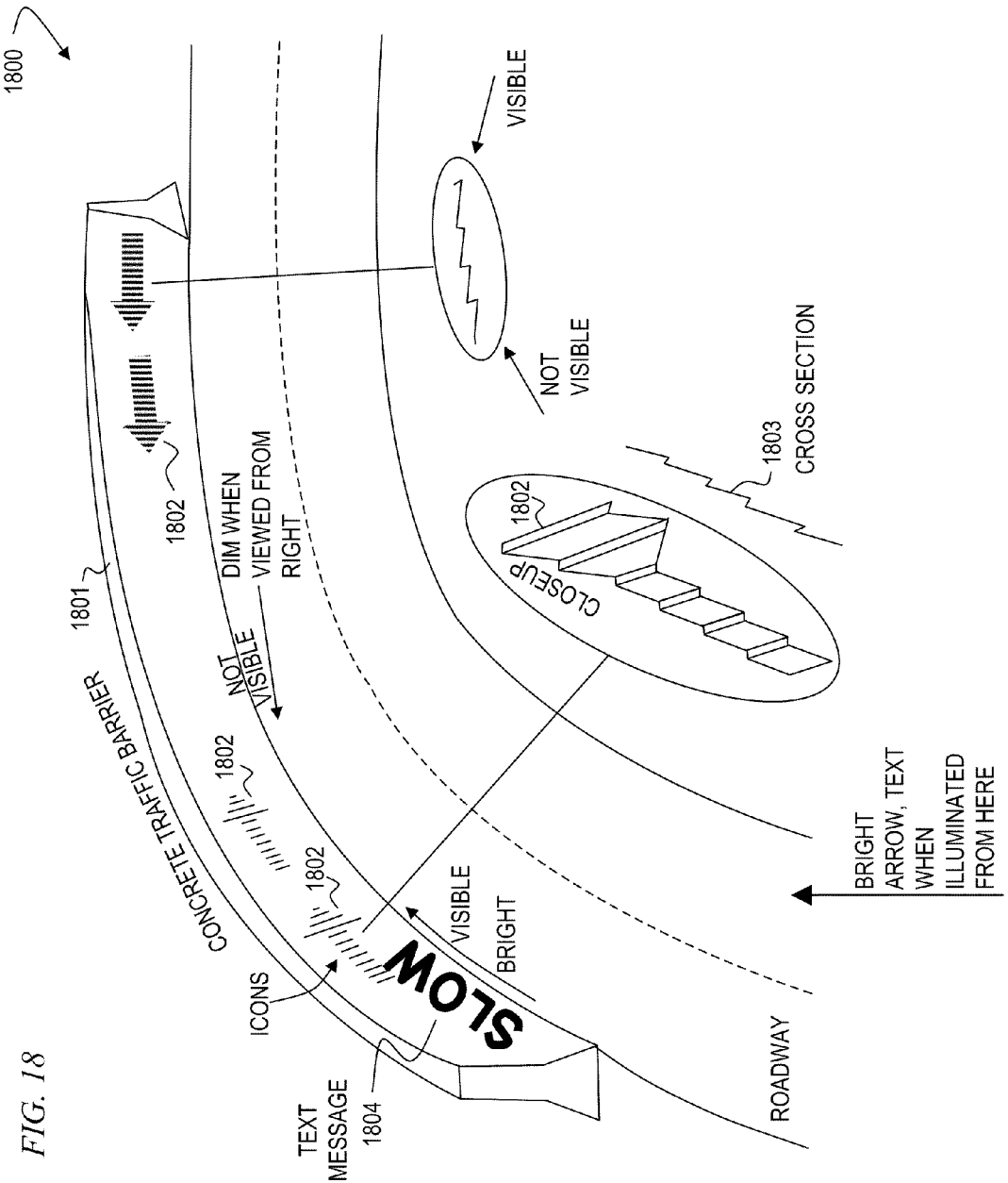
FIG. 18 is a perspective view of a curved concrete barrier 1800 having different moving and/or stationary patterns that are different for different traffic directions.

FIG. 18 is a perspective view of a curved concrete barrier 1800 having different moving and/or stationary patterns that are different for different traffic directions.

Figure 19:
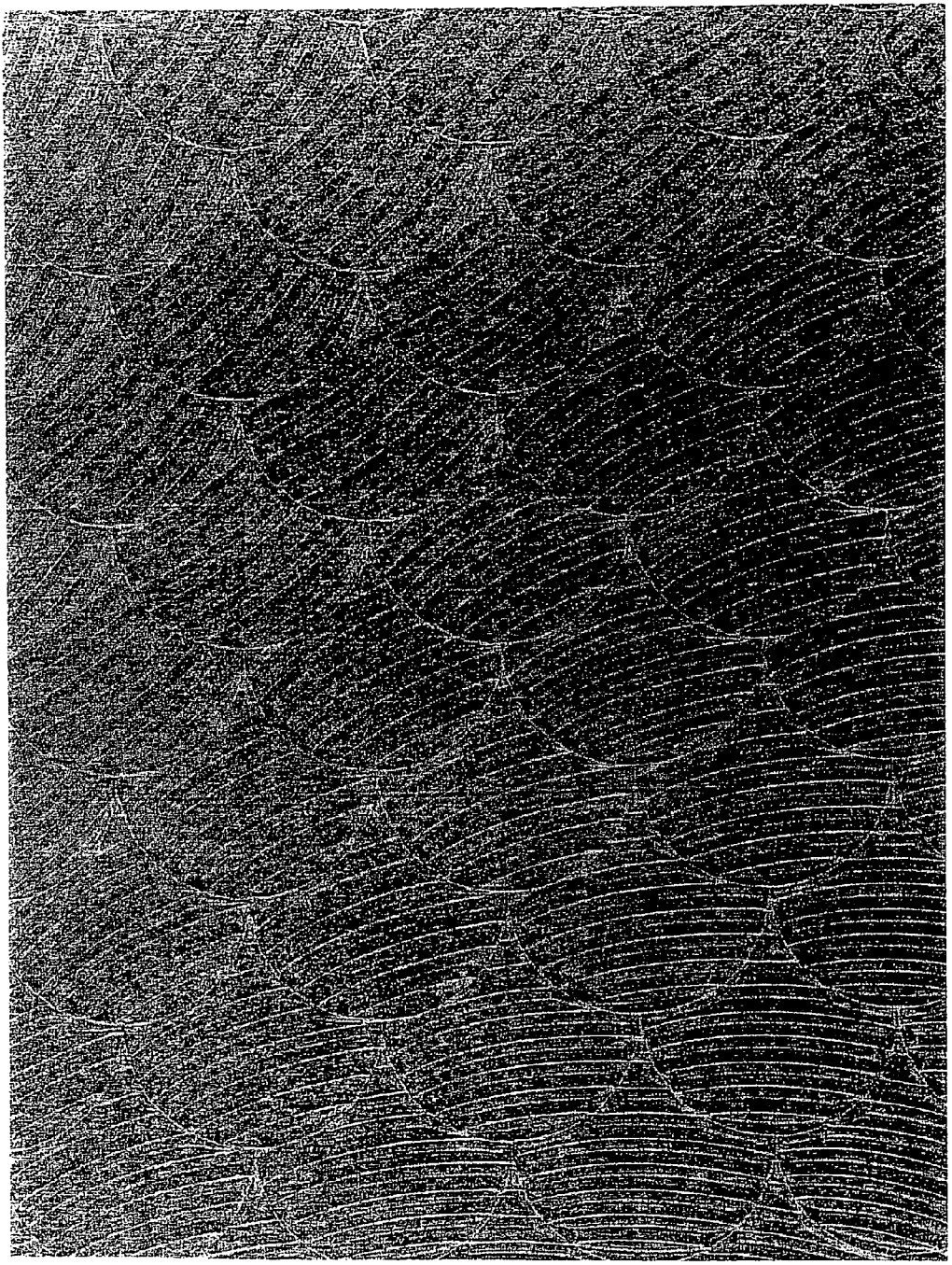
FIG. 19 is a front view of a panel that has a chevron pattern of its pixel's interior ridge-direction angles (see also FIG. 10B upper left quadrant, and FIGS. 10C and 10D for additional information).

FIG. 19 is a front view of a panel that has a chevron pattern of its pixel's interior ridge-direction angles (see also FIG. 10B upper left quadrant, and FIGS. 10C and 10D for additional information).

Example Dimensions for Light Responsive, Lustrous Surfaces

In some embodiments, the grooves are about 1 millimeter to about 13 millimeters deep (about 0.05 to 0.5 inch; e.g., in some embodiments, about 1 mm, 2 mm, 3 mm, 4 mm, 5 mm, 6 mm, 7 mm, 8 mm, 9 mm, 10 mm, 11 mm, 12 mm, or 13 mm, or within a range between any pair of the above numbers, or less than 1 mm, or more than 13 mm) and are about 1 to about 15 mm ridge-to-ridge spacing (about 0.05 to 0.5 inch; e.g., in some embodiments, about 1 mm, 2 mm, 3 mm, 4 mm, 5 mm, 6 mm, 7 mm, 8 mm, 9 mm, 10 mm, 11 mm, 12 mm, or 13 mm, or within a range between any pair of the above numbers, or less than 1 mm, or more than 13 mm). In some embodiments, the grooves have straight walls that slope about 45 degrees from the panel surface, while in other embodiments, the slope is about 15 degrees, about 30 degrees, about 60 degrees or about 75 degrees, or within a range between any pair of the above numbers. In some embodiments, the above numbers (depth, width between ridges, and angle of the groove walls) are suitable for casting materials such as concrete or plaster panels. In other embodiments, much smaller groove dimensions are used (e.g., about 1 micron deep to 1000 microns deep) and metal embossing masters are thus formed and used to emboss polymer materials (e.g., opaque plastics). In some embodiments, the angle information is graphically output (e.g., as an image showing the groove lines, spacing and directions for some or all of the image, in order that an artisan In some embodiments, the image is specified as a vector image (rather than a raster or pixel image), wherein arbitrarily shaped areas (e.g., the boundaries of hair, eyes, chin, and the like of a person's face) are input to the computer, which then provides a user interface to a graphic artist and assists in the selection of groove angles for various portions of the image in order to achieve the desired light and dark areas as viewed from a specified viewing and illumination angle. Thus, as described above, the computer takes the image information and generates the groove direction for each area of the panel. In various embodiments, this groove-direction information is either used to control automated groove-making machinery that makes the grooves in a mold or on a panel. In other embodiments, the groove information is graphically output (e.g., printed or plotted on paper), and the grooves are transferred to a suitable medium by an artisan (e.g., cut with a knife into the surface of fine artist's foam).

In at least one embodiment, the ridges are laid out at various angles in a manner to give greatest illumination to the observed portions of the grooves in areas of the composition where lightest tones are desired, and will change from this brighter orientation to various other angles as needed to create darker areas to produce the desired image. In some embodiments, grooves that are in direct alignment with the light source will have their entire surface bathed in light, from the peaks to the valleys. In some embodiments, changing the groove angle changes the brightness. A groove which is at an angle of 10 percent divergent from the light source (i.e., a 9 degree angle left or right) with the angle of the ridges greater than the angle toward the light source would have 90 percent of the illumination of the area comprising the ridge and depending on the angle of the light source, with a possibility of casting some of the ridge in shadow, while a ridge or groove 50 percent divergent (i.e., 45 degrees) would be have 50 percent illumination and 50 percent increase in shade, a groove fully divergent (i.e., perpendicular) to the light source would have the observable side of the valley in full shade. In some embodiments, all angles between these would have proportionate light and shadow. Curving lines would be infinitely variable in their relationship to the light source and would give an infinitely variable brightness to the surface.

Figure 20:
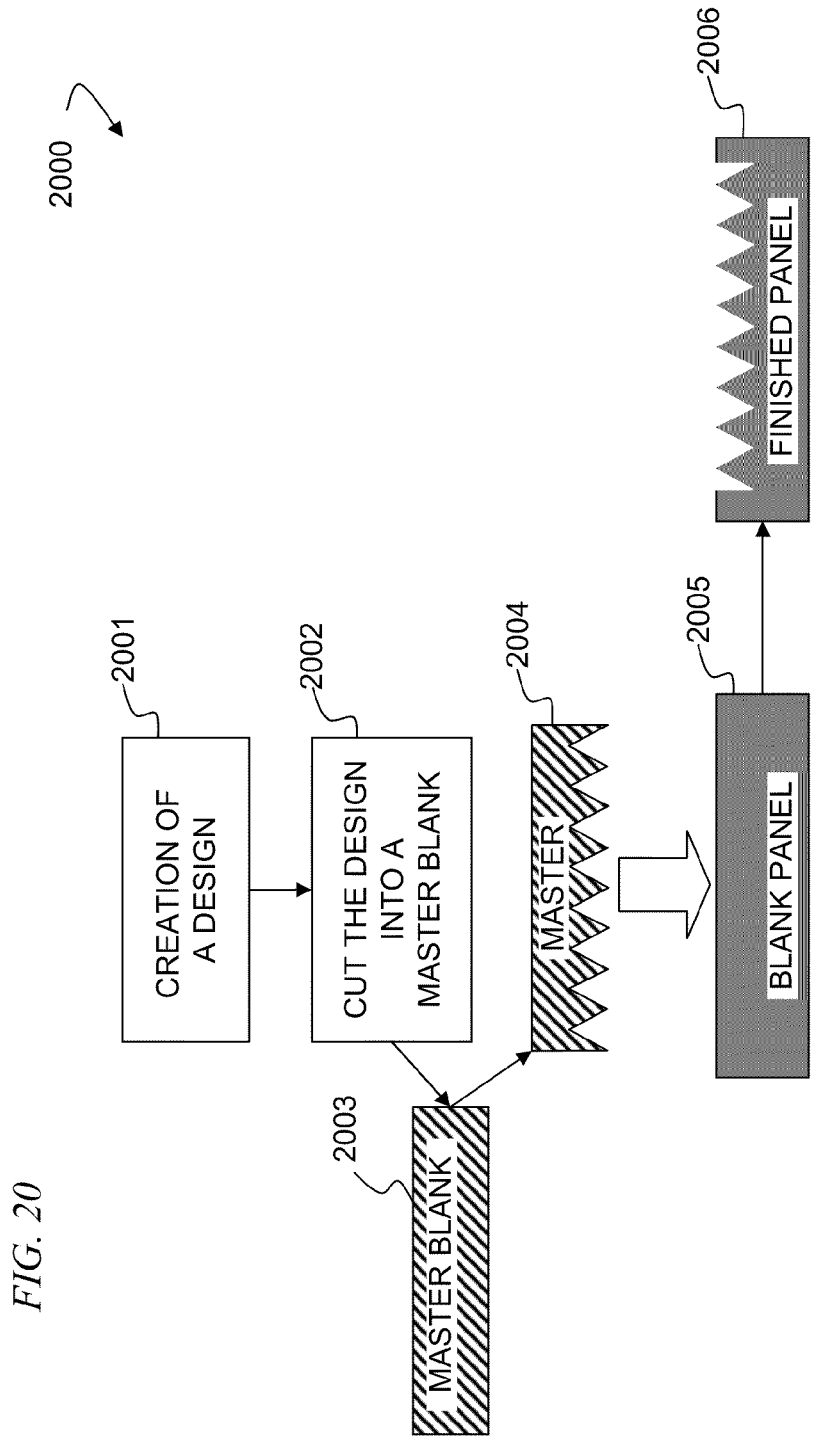
FIG. 20 depicts a process 2000 by which ridges are inlaid into a panel made from an opaque material.

FIG. 20 depicts a process 2000 by which ridges are inlaid into a panel made from an opaque material. In some embodiments, the first step in the process is the creation of a design 2001, through, for example, drawing out the design on a piece of paper of using some other means to represent the pattern to be placed on the surface of the opaque material. Next, some type of manual method 2002 is used to cut the design into, for example, a plastic mold referred to herein as a master blank 2003 yielding a master 2004. In at least one embodiment, hand tools of various types are used to cut a design into the master blank 2003. Once the master 2004 is created, it is pressed into a blank panel 2005 constructed from the opaque material. Once pressed into this blank panel 2005, the material from which the blank panel 2005 is constructed is, in the case of, for example, concrete allowed to set or harden. After setting, the finished panel 2006 will have the ridges and valleys of the original master 2004.

FIG. 15 depicts a process that executes on system 1500 wherein ridges are inlaid into a panel made from an opaque material, using a computer-numeric-controlled cutting method executed on computer 1503 with its CAM or CNC software. In using this method, a machine guided by a computer uses high-pressure water, a laser or some other cutting means to cut the previously created pattern into a master blank. This master blank is then used in the process described above to create a finished panel.

FIG. 15 includes an example of a master 1505 generated from a process (such as process 1602) that generated the design. This master 1505 will then be used to create a finished panel 306.

FIG. 16 includes an example of a finished panel 1611, created using the design 901 (see FIGS. 9A and 9B), and master, and applied using the above disclosed process.

In some embodiments, a series of pointed ridges set at angles relative to a light source are implemented so that they are fully or partially illuminated and arranged so the lighter and darker portions of the surface comprise a desired image.

In some embodiments, a series of pointed ridges are implemented set at angles to comprise an image based on illumination and shading in the grooves, those areas of illumination and shade changing brightness and/or location with a change in the angle of the light source.

In at least one embodiment, a series of pointed ridges set at angles is implemented to comprise an image based on illumination and shading of the grooves or ridges, those areas of illumination and shade changing brightness and/or location with a change in the angle of the viewer.

In some embodiments, a series of pointed ridges is implemented set at angles to comprise an image based on illumination and shading of the grooves or ridges, with steeper or shallower angles to give greater or lesser contrast to chosen areas.

In still at least one further embodiment, a series of pointed ridges is implemented set at angles to comprise an image based on illumination and shading of the grooves or ridges, arranged so the speed of change from light to dark and/or dark to light is controlled by the designer.

In some embodiments, a series of pointed ridges is implemented set at angles to comprise an image based on illumination and shading of the grooves or ridges, arranged so the direction of change of the various areas of brightness from light to dark and/or dark to light is controlled by the designer.

In at least one embodiment, a series of pointed ridges is implemented set at angles relative to the light source to create an image in light and shade, all with the same relative height and/or depth.

In some embodiments, a series of pointed ridges is implemented set at angles relative to each other which do not readily display an image when frontally lit or frontally observed, but which increasingly reveal the image with an increase in the angle of the light or the angle of the viewer.

In at least one embodiment, the grooves or ridges are cut or incised into the surface of existing materials (e.g., existing concrete roadways or retaining walls). In other embodiments, the grooves are cast or molded onto the surface of an article of manufacture during fabrication, as in the case of metals, plastics or concrete and other materials.

In some embodiments, the above described process is used to manufacture various articles possessing a lustrous surface. In one embodiment, a cement barrier (e.g., a New Jersey Median Barrier, see FIG. 18) has the above outlined process applied to its surface such that a light source shined at, for example, a 45 degree angle will produce bands of light and dark shading, wherein some of the light is reflected back to the source and some of the light is deflected away from the source. The ability to reflect some of the light and deflect other portions of the light emanating from a light source allows the cement barrier to be more visible under low light condition (e.g., night-time driving).

In still one other embodiment, the process is applied to a road surface such that various messages can be embedded into the road surface that are only visible form a specific angle or direction. For example, using the above process the words "WRONG WAY" can be embedded into a road surface and be made only visible went on is traveling in a vehicle the wrong way on a road or street.

In some embodiments, more or less angles can be provided so as to provide a more or less lustrous surface reflecting more or less light. For example, instead of placing four ridges and of equal length, angle and having valleys of a common depth between them, eight ridges could be placed together, having equal length, angle and common depth between them. By placing twice as many ridges, more light will be deflected, hence providing greater illumination. This greater concentration of ridges could be used to more greatly illuminate patterns such as the above disclosed "WRONG WAY" message.

In some embodiments, the present invention provides an apparatus that includes a mold for a panel, wherein a panel made from the mold has a plurality of areas, each area having a plurality of locally parallel grooves, including a first, second third, and fourth area, wherein the first, second third, and fourth area each have a different ridge-direction angle, and wherein: with the panel made from the mold in a first viewing-angle and illumination-angle configuration the first area appears relatively bright, the second area appears relatively dark, the third area appears an intermediate shade of gray, and the fourth area appears an intermediate shade of gray; and with the panel made from the mold in a second viewing-angle and illumination-angle configuration the first area appears an intermediate shade of gray, the second area appears an intermediate shade of gray, the third area appears relatively bright, and the fourth area appears relatively dark.

In some embodiments, the present invention provides an apparatus that includes a mold for a panel comprising a surface having a plurality of grooves in each of a plurality of areas on the surface, each or the plurality of areas having grooves in one direction selected from a plurality of different possible angles, including a first area having grooves in a first direction chosen to deliver a first illumination level to a first viewing position when the panel is illuminated from a first direction, and a second area having grooves in a second direction chosen to deliver a second illumination level to the first viewing position when the panel is illuminated from the first direction, wherein the first groove direction is different than the second groove direction, and the first illumination level is greater than the second illumination level.

In some embodiments, the mold is suitable to mold a panel that includes concrete material. In some embodiments, the present invention provides a concrete panel made using the above apparatus. In some such embodiments, the panel is suitable for a surface of a building edifice. In some embodiments, the present invention provides a building that includes the panel described above. In some embodiments, the panel is a part of or forms a concrete traffic barrier. In some embodiments, the present invention provides a concrete retaining wall comprising the panel. In some embodiments, the panel is a portion of a concrete sidewalk. In some embodiments, the panel is a portion of a concrete road surface. In some embodiments, the present invention provides a highway that includes the panel.

In some embodiments, the present invention provides an apparatus that includes a panel having a surface that includes a plurality of grooves in each of a plurality of areas on the surface, each or the plurality of areas having grooves in one direction selected from a plurality of different possible angles, including a first area having grooves in a first direction chosen to deliver a first illumination level to a first viewing position when the panel is illuminated from a first direction, and a second area having grooves in a second direction chosen to deliver a second illumination level to the first viewing position when the panel is illuminated from the first direction, wherein the first groove direction is different than the second groove direction, and the first illumination level is greater than the second illumination level. In some embodiments, the grooved surface includes wood material. In some embodiments, the grooved surface is on a panel that includes concrete material. In some embodiments, the panel is suitable for a surface of a building edifice. In some embodiments, the present invention provides a building that includes the apparatus.

In some embodiments, the panel is a concrete traffic barrier.

In some embodiments, the present invention provides a concrete retaining wall that includes the apparatus described above. In some embodiments, the panel is a portion of a concrete sidewalk. In some embodiments, the panel is a portion of a concrete road surface.

In some embodiments, the present invention provides a highway that includes the apparatus described above.

In some embodiments, the grooved surface is on a concrete highway divider.

In some embodiments, the grooved surface is on a concrete retaining wall.

In some embodiments, the grooved surface is on a concrete bridge pillar.

In some embodiments, the grooved surface is on a concrete roadway surface.

In some embodiments, the grooved surface is on a concrete sidewalk surface.

In some embodiments, the grooved surface is on a concrete block suitable for a concrete-block wall.

In some embodiments, the grooved surface is on a concrete patio block.

In some embodiments, the grooved surface is on a clay-based brick.

In some embodiments, the grooved surface is on a clay-based tile.

In some embodiments, the grooved surface is formed into medium-density fiber board.

In some embodiments, the present invention provides a computerized method that includes obtaining image information that specifies brightnesses for a plurality of areas of the image, including a first area to have a first brightness and a second area to have a second brightness; inputting illumination direction and viewing direction information; calculating groove-direction information; and outputting groove-direction information for the first areas and groove direction information for the second area.

In some embodiments, the present invention provides a computerized method that includes obtaining motion information that specifies directions of image movement for a surface image, wherein the grooved surface has a plurality of areas, including a substantially contiguous series of areas including a first, second, third, and fourth areas located along a first line, wherein an apparent motion of the image along the line is to be obtained; calculating groove-direction information based on the motion information to achieve an incremental brightness change across successive ones of the first, second, third, and fourth areas upon relative motion of the grooved surface relative to a viewing angle, to an illumination angle, or to both a viewing angle and an illumination angle; and outputting ridge-direction information for the first, second, third, and fourth areas.

Some embodiments further include generating CNC control information based on the ridge-direction information; and forming grooves in a substrate panel based on the CNC control information.

Some embodiments further include fabricating a plurality of replica panels based on the substrate panel.

Some embodiments further include mounting one or more of the replica panels to be rotated on a turntable.

Some embodiments further include rotating the one or more of the replica panels on the turntable to create a moving image visual effect.

In some embodiments, the groove-direction information is calculated using a mathematical formula that generates the groove-direction information based on the inputted illumination direction and viewing direction and the specified brightnesses for the plurality of areas.

In some embodiments, the groove-direction information is calculated using a mathematical formula includes a vector cross product of illumination vector direction and a viewing-vector direction.

In some embodiments, the groove-direction information is calculated using a table look-up that generates the groove-direction information based on the inputted illumination direction and viewing direction and the specified brightnesses for the plurality of areas.

Some embodiments further include controlling a groove-making machine using the groove-direction information.

In some embodiments, the groove-making machine is a numeric-controlled router.

In some embodiments, the groove-making machine is a numeric-controlled laser engraver.

In some embodiments, the image information includes brightness information for each of a plurality of adjacent pixels, and the groove-direction information is for substantially parallel lines to be formed for each pixel at an angle based on the pixel brightness.

In some embodiments, the present invention provides an article of manufacture made by the one or more of the methods described here. In some embodiments, the present invention provides a building made with an outer skin that includes the article of manufacture.

In some embodiments, the present invention provides a computerized method that includes obtaining groove-direction information for a surface that specifies groove directions for each of a plurality of areas of the image, including a first area and a second area; calculating brightnesses for the first area and the second area based on the groove-direction information; and displaying an image using the calculated brightnesses and simulating a surface having the grooves. In some embodiments, this provides a simulation of what a grooved panel will look like in various static and/or dynamic lighting and/or viewing configurations.

Some embodiments further include receiving user input specifying an illumination vector and a viewing vector relative to the grooved surface, wherein the calculating brightnesses for the first area and the second area is further based on the vector information.

Some embodiments further include generating a plurality of illumination vectors and viewing vectors relative to the grooved surface, wherein the calculating brightnesses for the first area and the second area is further based on the vector information, and wherein the displaying includes displaying a sequential series of images representative of lighting and viewing condition changes represented by the plurality of illumination vectors and viewing vectors.

In some embodiments, the plurality of illumination vectors is representative of sun position over a period of time in a day.

In some embodiments, the plurality of illumination vectors is representative of sun position over a plurality of seasons in a year.

In some embodiments, the plurality of illumination vectors and viewing vectors represent a relative movement of the panel relative to the source of illumination and the viewer.

In some embodiments, the plurality of viewing vectors is representative of a viewer moving relative to the grooved surface.

In some embodiments, the present invention includes an apparatus that includes a panel having a plurality of areas, each area having a plurality of locally parallel grooves, including a first, second third, and fourth area, wherein the first, second third, and fourth area each have a different ridge-direction angle, and in which in a first viewing-angle and illumination-angle configuration the first area appears relatively bright, the second area appears relatively dark, the third area appears an intermediate shade of gray, and the fourth area appears an intermediate shade of gray, and in a second viewing-angle and illumination-angle configuration the first area appears an intermediate shade of gray, the second area appears an intermediate shade of gray, the third area appears relatively bright, and the fourth area appears relatively dark.

In some such embodiments, the apparatus includes a mold that is suitable to mold a panel that includes concrete material. Some embodiments include a concrete panel made using the apparatus of the present invention. In some embodiments, the concrete panel is suitable for a surface of a building or other edifice. In some embodiments, one or more such concrete panels are part of a concrete retaining wall. In some embodiments, one or more such concrete panels are part of a highway bridge.

In some embodiments, the present invention includes an apparatus that includes a panel having a surface that includes a plurality of grooves in each of a plurality of areas on the surface, each or the plurality of areas having grooves in one direction selected from a plurality of different possible angles, including a first area having grooves in a first direction chosen to deliver a first illumination level to a first viewing position when the panel is illuminated from a first direction, and a second area having grooves in a second direction chosen to deliver a second illumination level to the first viewing position when the panel is illuminated from the first direction, wherein the first groove direction is different than the second groove direction, and the first illumination level is greater than the second illumination level.

In some such embodiments the surface includes wood material. In some such embodiments the surface is on a panel that includes concrete material. In some such embodiments the panel is suitable for a surface of a building edifice. In some embodiments a building is surfaced with one or more such panels. In some embodiments one or more panels are on, or constitute a concrete traffic barrier. In some embodiments one or more panels are on, or constitute a concrete retaining wall. In some embodiments one or more panels are on, or constitute a highway bridge. In some embodiments, the surface is on a concrete highway divider. In some embodiments the surface is on a concrete retaining wall. In some embodiments the surface is on a concrete bridge pillar. In some embodiments the surface is on a concrete roadway surface. In some embodiments the surface is on a concrete sidewalk surface. In some embodiments the surface is on a concrete block suitable for a concrete-block wall. In some embodiments wherein the surface is on a concrete patio block. In some embodiments the surface is on a clay-based brick. In some embodiments the surface is on a clay-based tile. In some embodiments the surface is formed into medium-density fiber board.

In some embodiments, the present invention includes a computerized method that includes obtaining image information that specifies brightnesses for a plurality of areas of the image, including a first area to have a first brightness and a second area to have a second brightness, inputting illumination direction and viewing direction information, calculating a groove-direction information, and outputting groove-direction information for the first areas and groove direction information for the second area.

In some embodiments, the present invention includes a computerized method that includes obtaining motion information that specifies directions of image movement for a surface image, wherein the surface has a plurality of areas, including a substantially contiguous series of areas including a first, second, third, and fourth areas located along a first line, wherein an apparent motion of the image along the line is to be obtained, calculating groove-direction information based on the motion information to achieve an incremental brightness change across successive ones of the first, second, third, and fourth areas upon relative motion of the surface relative to a viewing angle, to an illumination angle, or to both a viewing angle and an illumination angle, and outputting ridge-direction information for the first, second, third, and fourth areas.

In some embodiments, the method of the present invention further includes generating CNC control information based on the ridge-direction information, and forming grooves in a substrate panel based on the CNC control information.

In some embodiments, the method of the present invention further includes fabricating a plurality of replica panels based on the substrate panel.

In some embodiments, the method of the present invention further includes mounting one or more of the replica panels to be rotated on a turntable.

In some embodiments, the method of the present invention further includes rotating the one or more of the replica panels on the turntable to create a moving image visual effect.

In some embodiments, the method of the present invention further includes groove-direction information being calculated using a mathematical formula that generates the groove-direction information based on the inputted illumination direction and viewing direction and the specified brightnesses for the plurality of areas.

In some embodiments, the method of the present invention further includes the groove-direction information being calculated using a mathematical formula includes a vector cross product of illumination vector direction and a viewing-vector direction.

In some embodiments, the method of the present invention further includes calculating the groove-direction information using a table look-up that generates the groove-direction information based on the inputted illumination direction and viewing direction and the specified brightnesses for the plurality of areas.

In some embodiments, the method of the present invention further includes controlling a groove-making machine using the groove-direction information. In some such embodiments the groove-making machine is a numeric-controlled router. In some such embodiments the groove-making machine is a numeric-controlled laser engraver.

In some embodiments, the method of the present invention further includes the image information includes brightness information for each of a plurality of adjacent pixels, and the groove-direction information is for substantially parallel lines to be formed for each pixel at an angle based on the pixel brightness.

In some embodiments, an article of manufacture is made by the method of the present invention. In some embodiments, a building is made with an outer skin that includes the article of manufacture.

In some embodiments, the method of the present invention includes a computerized method including obtaining groove-direction information for a surface that specifies groove directions for each of a plurality of areas of the image, including a first area and a second area, calculating brightnesses for the first area and the second area based on the groove-direction information, and displaying an image using the calculated brightnesses and simulating a surface having the grooves.

In some such embodiments, the method of the present invention further includes receiving user input specifying an illumination vector and a viewing vector relative to the surface, wherein the calculating brightnesses for the first area and the second area is further based on the vector information.

In some such embodiments, the method of the present invention further includes generating a plurality of illumination vectors and viewing vectors relative to the surface, wherein the calculating brightnesses for the first area and the second area is further based on the vector information, and wherein the displaying includes displaying a sequential series of images representative of lighting and viewing condition changes represented by the plurality of illumination vectors and viewing vectors.

In some such embodiments, the plurality of illumination vectors is representative of sun position over a period of time in a day. In some such embodiments, the plurality of illumination vectors is representative of sun position over a plurality of seasons in a year.

In some embodiments, the plurality of viewing vectors is representative of a viewer moving relative to the surface.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
   a receiver configured to receive image information of an image, wherein the image information specifies different brightness values for each one of a plurality of areas of the image, including a first image area having a first specified brightness value, a second image area having a second specified brightness value, a third image area having a third specified brightness value and a fourth image area having a fourth specified brightness value;
   variables in the apparatus configured to hold a first specified illumination direction and a first specified viewing direction;
   a calculator operatively coupled to obtain the image information from the receiver and to obtain the first specified illumination direction and the first specified viewing direction from the variables and configured to calculate groove-direction information that specifies grooves to be formed into a plurality of surface portions on a grooved article, the plurality of surface portions on the grooved article including a first, a second, a third, and a fourth surface portion corresponding to the first, the second, the third, and the fourth area of the image, respectively, wherein the calculated groove-direction information is based, at least in part, on the brightness values of the image information, the first illumination direction and the first viewing direction, wherein the groove-direction information includes a plurality of groove directions including a first groove direction for the first surface portion corresponding to the first brightness value of the first image area, a second groove direction for the second surface portion corresponding to the second brightness value of the second image area, a third groove direction for the third surface portion corresponding to the third brightness value of the third image area, and a fourth groove direction for the fourth surface portion corresponding to the fourth brightness value of the fourth image area, wherein the first, second, third and fourth groove directions are all different from one another, and wherein the calculator is configured to use a groove-direction-calculation mathematical formula that includes a vector cross product of illumination vector direction and a viewing-vector direction; and
   an output module operatively coupled to the calculator and configured to output into a formatted file the groove-direction information for the first, the second, the third, and the fourth surface portion, wherein the outputted groove-direction information in the formatted file is readable by a CNC machine to control tool paths of the CNC machine used to form the grooves into the plurality of surface portions to make the grooved article.

2. The apparatus of claim 1, further comprising:
   the CNC machine configured to produce grooves; and
   a controller operatively coupled to the output module and configured to receive the outputted groove-direction information from the formatted file, and operatively coupled to the CNC machine and configured to control the CNC machine based on the received groove-direction information.

3. The apparatus of claim 2, wherein the CNC machine is configured to produce grooves of a mold based on the received groove-direction information from the formatted file.

4. The apparatus of claim 3, further comprising a panel generator operatively coupled to recieve the mold and operable to form a panel using the mold.

5. The apparatus of claim 2, wherein the CNC machine is configured to produce a intermediate workpiece, wherein the controller is configured to set a tool path that specifies cuts made to the intermediate workpiece, and wherein the intermediate workpiece is configured to be used to form grooves into the plurality of surface portions on the grooved article.

6. The apparatus of claim 5, wherein the intermediate workpiece is a mold having grooves formed therein that are negative of the grooves to be formed in the grooved article.

7. An apparatus comprising:
   a receiver configured to receive image information of an image, wherein the image information specifies different brightness values for each one of a plurality of areas of the image, including a first image area having a first specified brightness value, a second image area having a second specified brightness value, a third image area having a third specified brightness value and a fourth image area having a fourth specified brightness value;
   variables in the apparatus configured to hold a first specified illumination direction and a first specified viewing direction;
   a calculator operatively coupled to obtain the image information from the receiver and to obtain the first specified illumination direction and the first specified viewing direction from the variables and configured to calculate groove-direction information that specifies grooves to be formed into a plurality of surface portions on a grooved article, the plurality of surface portions on the grooved article including a first, a second, a third, and a fourth surface portion corresponding to the first, the second, the third, and the fourth area of the image, respectively, wherein the calculated groove-direction information is based, at least in part, on the brightness values of the image information, the first illumination direction and the first viewing direction, wherein the groove-direction information includes a plurality of groove directions including a first groove direction for the first surface portion corresponding to the first brightness value of the first image area, a second groove direction for the second surface portion corresponding to the second brightness value of the second image area, a third groove direction for the third surface portion corresponding to the third brightness value of the third image area, and a fourth groove direction for the fourth surface portion corresponding to the fourth brightness value of the fourth image area, wherein the first, second, third and fourth groove directions are all different from one another, and wherein the calculator is configured to use a groove-direction-calculation mathematical formula that includes a vector cross product of illumination vector direction and a viewing-vector direction; and
   an output module operatively coupled to the calculator and configured to output into a formatted file the groove-direction information for the first, the second, the third, and the fourth surface portion, wherein the outputted groove-direction information in the formatted file is readable by a CNC machine to control tool paths of the CNC machine used to form the grooves into the plurality of surface portions to make the grooved article;

wherein the groove-direction information is calculated such that:

the grooved article, when illuminated from the first illumination direction and viewed from the first viewing direction, exhibits a first relative brightness in the first surface portion that corresponds to the first specified brightness value of the first image area, and the grooved article, when illuminated from the first illumination direction and viewed from the first viewing direction, exhibits a second relative brightness in the second surface portion that corresponds to the second specified brightness value of the second image area the apparatus further comprising:

a variable configured to hold a second illumination direction, wherein the first illumination direction corresponds to a sun direction at a first time of day and the second illumination direction information corresponds to a sun direction at a second time of day, and wherein the second illumination direction is different than the first illumination direction, and wherein the calculator calculates the groove-direction information also based on the second illumination direction such that, when viewed from the first viewing direction:

the first relative brightness in the first surface portion is brighter when illuminated from the second illumination direction than when illuminated from the first illumination direction, and the second relative brightness in the second surface portion is darker when illuminated from the second illumination direction than when illuminated from the first illumination direction.

8. An apparatus comprising:

means for obtaining, into a computer, image information of an image that specifies different brightness values for each one of a plurality of areas of the image, including a first image area having a first specified brightness value, a second image area having a second specified brightness value, a third image area having a third specified brightness value and a fourth image area having a fourth specified brightness value;

means for specifying a first illumination direction and a first viewing direction;

means for calculating groove-direction information for specifying grooves to be formed into a plurality of surface portions on a grooved article, the plurality of surface portions on the grooved article including a first, a second, a third, and a fourth surface portion corresponding to the first, the second, the third, and the fourth area of the image, respectively, wherein the calculating of the groove-direction information is based, at least in part, on the brightness values of the image information, the first illumination direction and the first viewing direction, wherein the groove-direction information includes a plurality of groove directions including a first groove direction for the first surface portion corresponding to the first brightness value of the first image area, a second groove direction for the second surface portion corresponding to the second brightness value of the second image area, a third groove direction for the third surface portion corresponding to the third brightness value of the third image area, and a fourth groove direction for the fourth surface portion corresponding to the fourth brightness value of the fourth image area, wherein the first, second, third and fourth groove directions are all different from one another, and wherein the means for calculating the groove-direction information includes means for using a mathematical formula that includes a vector cross product of illumination vector direction and a viewing-vector direction; and means for outputting into a formatted file the groove-direction information for the first, second, third, and fourth surface portions, wherein the outputted groove-direction information in the formatted file is readable by a CNC machine to control tool paths of the CNC machine used to form the grooves into the plurality of surface portions to make the grooved article.

9. The method of claim 8, wherein forming of the grooves into the grooved article includes casting the grooved article using the intermediate workpiece as a mold.

10. The apparatus of claim 8, further comprising:

the CNC machine configured to produce grooves; and means for controlling the CNC machine based on the outputted groove-direction information from the formatted file.

11. The apparatus of claim 10, wherein the means for controlling controls the CNC machine to create a mold.

12. The apparatus of claim 10, wherein the means for controlling controls the CNC machine to cut an intermediate workpiece, and wherein the means for controlling includes means for setting a tool path that specifies cuts made to the intermediate workpiece, wherein the CNC machine further comprises means for forming grooves into the plurality of surface portions on the grooved article using the intermediate workpiece.

13. The apparatus of claim 12, further comprising means for casting the grooved article using the intermediate workpiece as a mold.

14. An apparatus comprising:

means for obtaining, into a computer, image information of an image that specifies different brightness values for each one of a plurality of areas of the image, including a first image area having a first specified brightness value, a second image area having a second specified brightness value, a third image area having a third specified brightness value and a fourth image area having a fourth specified brightness value;

means for specifying a first illumination direction and a first viewing direction;

means for calculating groove-direction information for specifying grooves to be formed into a plurality of surface portions on a grooved article, the plurality of surface portions on the grooved article including a first, a second, a third, and a fourth surface portion corresponding to the first, the second, the third, and the fourth area of the image, respectively, wherein the calculating of the groove-direction information is based, at least in part, on the brightness values of the image information, the first illumination direction and the first viewing direction, wherein the groove-direction information includes a plurality of groove directions including a first groove direction for the first surface portion corresponding to the first brightness value of the first image area, a second groove direction for the second surface portion corresponding to the second brightness value of the second image area, a third groove direction for the third surface portion corresponding to the third brightness value of the third image area, and a fourth groove direction for the fourth surface portion corresponding to the fourth brightness value of the fourth image area, wherein the first, second, third and fourth groove directions are all different from one another, and wherein the means for calculating the groove-direction information includes means for using a mathematical formula that includes a vector cross product of illumination vector direction and a viewing-vector direction; and means for outputting into a formatted file the groove-direction information for the first, second, third, and fourth surface portions, wherein the outputted groove-direction information in the formatted file is readable by a CNC machine to control tool paths of the CNC machine used to form the grooves into the plurality of surface portions to make the grooved article;

wherein the groove-direction information is calculated such that:

the grooved article, when illuminated from the first illumination direction and viewed from the first viewing direction, exhibits a first relative brightness in the first surface portion that corresponds to the first specified brightness value of the first image area, and the grooved article, when illuminated from the first illumination direction and viewed from the first viewing direction, exhibits a second relative brightness in the second surface portion that corresponds to second specified brightness value of the second image area the apparatus further comprising:

means for specifying a second illumination direction, wherein the first illumination direction corresponds to a sun direction at a first time of day and the second illumination direction corresponds to a sun direction at a second time of day, and wherein the second illumination direction is different than the first illumination direction, and wherein the means for calculating the groove-direction information is also based on the second illumination direction such that, when viewed from the first viewing direction:

the first relative brightness in the first surface portion is brighter when illuminated from the second illumination direction than when illuminated from the first illumination direction, and the second relative brightness in the second surface portion is darker when illuminated from the second illumination direction than when illuminated from the first illumination direction.

15. The apparatus of claim 1, wherein the groove-direction information is calculated such that:

for grooves of the first surface portion of the grooved article, the calculated groove-direction information is based on the image information for the first area of the image such that the grooved article, when illuminated from the first illumination direction and viewed from the first viewing direction, exhibits a first relative brightness in the first surface portion that is darker than the second surface portion and brighter than the fourth surface portion, and such that the first surface portion of the grooved article, when illuminated from a second illumination direction and viewed from the first viewing direction, is brighter than the second, third and fourth surface portions, for grooves of the second surface portion of the grooved article, the calculated groove-direction information is based on the image information for the second area of the image such that the grooved article, when illuminated from the first illumination direction and viewed from the first viewing direction, exhibits a second relative brightness in the second surface portion that is brighter than the first, third and fourth surface portions, and such that the second surface portion of the grooved article, when illuminated from the second illumination direction and viewed from the first viewing direction, is darker than the first surface portion and brighter than the third surface portion, for grooves of the third surface portion of the grooved article, the calculated groove-direction information is based on the image information for the third area of the image such that the grooved article, when illuminated from the first illumination direction and viewed from the first viewing direction, exhibits a third relative brightness in the third surface portion that is brighter than the fourth surface portion and darker than the second surface portion, and such that the third surface portion of the grooved article, when illuminated from the second illumination direction and viewed from the first viewing direction, is darker than the first, second and fourth surface portions, and for grooves of the fourth surface portion of the grooved article, the calculated groove-direction information is based on the image information for the fourth area of the image such that the grooved article, when illuminated from the first illumination direction and viewed from the first viewing direction, exhibits a fourth relative brightness in the fourth surface portion that is darker than the first, second and third surface portions, and such that the fourth surface portion of the grooved article, when illuminated from the second illumination direction and viewed from the first viewing direction, is darker than the first surface portion and brighter than the third surface portion.

16. The apparatus of claim 8, wherein the means for calculating the groove-direction information is configured such that:

for grooves of the first surface portion of the grooved article, the calculated groove-direction information is based on the image information for the first area of the image such that the grooved article, when illuminated from the first illumination direction and viewed from the first viewing direction, exhibits a first relative brightness in the first surface portion that is darker than the second surface portion and brighter than the fourth surface portion, and such that the first surface portion of the grooved article, when illuminated from a second illumination direction and viewed from the first viewing direction, is brighter than the second, third and fourth surface portions, for grooves of the second surface portion of the grooved article, the calculated groove-direction information is based on the image information for the second area of the image such that the grooved article, when illuminated from the first illumination direction and viewed from the first viewing direction, exhibits a second relative brightness in the second surface portion that is brighter than the first, third and fourth surface portions, and such that the second surface portion of the grooved article, when illuminated from the second illumination direction and viewed from the first viewing direction, is darker than the first surface portion and brighter than the third surface portion, for grooves of the third surface portion of the grooved article, the calculated groove-direction information is based on the image information for the third area of the image such that the grooved article, when illuminated from the first illumination direction and viewed from the first viewing direction, exhibits a third relative brightness in the third surface portion that is brighter than the fourth surface portion and darker than the second surface portion, and such that the third surface portion of the grooved article, when illuminated from the second illumination direction and viewed from the first viewing direction, is darker than the first, second and fourth surface portions, and for grooves of the fourth surface portion of the grooved article, the calculated groove-direction information is based on the image information for the fourth area of the image such that the grooved article, when illuminated from the first illumination direction and viewed from the first viewing direction, exhibits a fourth relative brightness in the fourth surface portion that is darker than the first, second and third surface portions, and such that the fourth surface portion of the grooved article, when illuminated from the second illumination direction and viewed from the first viewing direction, is darker than the first surface portion and brighter than the third surface portion.

17. The apparatus of claim 1, wherein the first, second, third, and fourth areas are a set of adjacent pixels arranged in a Cartesian grid.

18. The apparatus of claim 1, wherein the first, second, third, and fourth areas are a set of irregularly shaped adjacent forms.

19. An apparatus comprising:
a receiver configured to receive image information of an image, wherein the image information specifies different brightness values for each one of a plurality of areas of the image, including a first image area having a first specified brightness value, a second image area having a second specified brightness value, a third image area having a third specified brightness value and a fourth image area having a fourth specified brightness value;
variables in the apparatus configured to hold a first specified illumination direction and a first specified viewing direction;
a calculator operatively coupled to obtain the image information from the receiver and to obtain the first specified illumination direction and the first specified viewing direction from the variables and configured to calculate groove-direction information that specifies grooves to be formed into a plurality of surface portions on a grooved article, the plurality of surface portions on the grooved article including a first, a second, a third, and a fourth surface portion corresponding to the first, the second, the third, and the fourth area of the image, respectively, wherein the calculated groove-direction information is based, at least in part, on the brightness values of the image information, the first illumination direction and the first viewing direction, wherein the groove-direction information includes a plurality of groove directions including a first groove direction for the first surface portion corresponding to the first brightness value of the first image area, a second groove direction for the second surface portion corresponding to the second brightness value of the second image area, a third groove direction for the third surface portion corresponding to the third brightness value of the third image area, and a fourth groove direction for the fourth surface portion corresponding to the fourth brightness value of the fourth image area, wherein the first, second, third and fourth groove directions are all different from one another, and wherein the calculator is configured to use a table look-up to obtain groove directions; and
an output module operatively coupled to the calculator and configured to output into a formatted file the groove-direction information for the first, the second, the third, and the fourth surface portion, wherein the outputted groove-direction information in the formatted file is readable by a CNC machine to control tool paths of the CNC machine used to form the grooves into the plurality of surface portions to make the grooved article.

20. The apparatus of claim 19, further comprising:
the CNC machine configured to produce grooves; and
a controller operatively coupled to the output module and configured to receive the outputted groove-direction information, and operatively coupled to the CNC machine and configured to control the CNC machine based on the received groove-direction information.

21. The apparatus of claim 19, further comprising:
the CNC machine configured to produce grooves to produce an intermediate workpiece; and
a controller operatively coupled to the output module and configured to receive the outputted groove-direction information from the formatted file, and operatively coupled to the CNC machine and configured to control the CNC machine based on the received groove-direction information, wherein the controller is configured to set a tool path that specifies cuts made to the intermediate workpiece, and wherein the intermediate workpiece is configured to be used to form grooves into the plurality of surface portions on the grooved article.

22. The apparatus of claim 19, further comprising a variable configured to hold a second illumination direction, wherein the first illumination direction corresponds to a sun direction at a first time of day and the second illumination direction information corresponds to a sun direction at a second time of day, and wherein the second illumination direction is different than the first illumination direction, and wherein the calculator calculates the groove-direction information also based on the second illumination direction such that, when viewed from the first viewing direction:
the first relative brightness in the first surface portion is brighter when illuminated from the second illumination direction than when illuminated from the first illumination direction, and
the second relative brightness in the second surface portion is darker when illuminated from the second illumination direction than when illuminated from the first illumination direction.

23. An apparatus comprising:
means for obtaining, into a computer, image information of an image that specifies different brightness values for each one of a plurality of areas of the image, including a first image area having a first specified brightness value, a second image area having a second specified brightness value, a third image area having a third specified brightness value and a fourth image area having a fourth specified brightness value;
means for specifying a first illumination direction and a first viewing direction;
means for calculating groove-direction information for specifying grooves to be formed into a plurality of surface portions on a grooved article, the plurality of surface portions on the grooved article including a first, a second, a third, and a fourth surface portion corresponding to the first, the second, the third, and the fourth area of the image, respectively, wherein the calculating of the groove-direction information is based, at least in part, on the brightness values of the image information, the first illumination direction and the first viewing direction, wherein the groove-direction information includes a plurality of groove directions including a first groove direction for the first surface portion corresponding to the first brightness value of the first image area, a second groove direction for the second surface portion corresponding to the second brightness value of the second image area, a third groove direction for the third surface portion corresponding to the third brightness value of the third image area, and a fourth groove direction for the fourth surface portion corresponding to the fourth brightness value of the fourth image area, wherein the first, second, third and fourth groove directions are all different from one another, and wherein the means for calculating the groove-direction information includes means for using a table look-up; and means for outputting into a formatted file the groove-direction information for the first, second, third, and fourth surface portions, wherein the outputted groove-direction information in the formatted file is readable by a CNC machine to control tool paths of the CNC machine used to form the grooves into the plurality of surface portions to make the grooved article.

24. The apparatus of claim 23, further comprising:
the CNC machine configured to produce grooves; and
means for controlling the CNC machine based on the outputted groove-direction information.

25. The apparatus of claim 23, further comprising:
the CNC machine configured to produce grooves;
means for controlling the CNC machine, based on the outputted groove-direction information from the formatted file, to cut an intermediate workpiece, wherein the means for controlling includes means for setting a tool path that specifies cuts made to the intermediate workpiece; and means for forming grooves into the plurality of surface portions on the grooved article using the intermediate workpiece.

26. The apparatus of claim 23, wherein the means for specifying further includes means for specifying a second illumination direction, wherein the first illumination direction corresponds to a sun direction at a first time of day and the second illumination direction corresponds to a sun direction at a second time of day, and wherein the second illumination direction is different than the first illumination direction, and wherein the means for calculating the groove-direction information is also based on the second illumination direction such that, when viewed from the first viewing direction:

the first relative brightness in the first surface portion is brighter when illuminated from the second illumination direction than when illuminated from the first illumination direction, and the second relative brightness in the second surface portion is darker when illuminated from the second illumination direction than when illuminated from the first illumination direction.

27. The apparatus of claim 7, further comprising:
the CNC machine configured to produce grooves; and
a controller operatively coupled to the output module and configured to receive the outputted groove-direction information from the formatted file, and operatively coupled to the CNC machine and configured to control the CNC machine based on the received groove-direction information.

28. The apparatus of claim 7, further comprising:
the CNC machine configured to produce grooves; and
a controller operatively coupled to the output module and configured to receive the outputted groove-direction information from the formatted file, and operatively coupled to the CNC machine and configured to control the CNC machine based on the received groove- direction information, wherein the CNC machine is configured to produce grooves of a mold based on the received groove-direction information.

29. The apparatus of claim 7, further comprising:
the CNC machine configured to produce grooves;
a controller operatively coupled to the output module and configured to receive the outputted groove-direction information from the formatted file, and operatively coupled to the CNC machine and configured to control the CNC machine based on the received groove- direction information, wherein the CNC machine is configured to produce grooves of a mold based on the received groove-direction information; and
a panel generator operatively coupled to receive the mold and operable to form a panel using the mold.

30. The apparatus of claim 7, further comprising:
the CNC machine configured to produce grooves; and
a controller operatively coupled to the output module and configured to receive the outputted groove-direction information from the formatted file, and operatively coupled to the CNC machine and configured to control the CNC machine based on the received groove- direction information, wherein the CNC machine is configured to produce a intermediate workpiece, wherein the controller is configured to set a tool path that specifies cuts made to the intermediate workpiece, and wherein the intermediate workpiece is configured to be used to form grooves into the plurality of surface portions on the grooved article.

31. The apparatus of claim 7, further comprising:
the CNC machine configured to produce grooves; and
a controller operatively coupled to the output module and configured to receive the outputted groove-direction information from the formatted file, and operatively coupled to the CNC machine and configured to control the CNC machine based on the received groove- direction information, wherein the CNC machine is configured to produce a intermediate workpiece, wherein the controller is configured to set a tool path that specifies cuts made to the intermediate workpiece, wherein the intermediate workpiece is configured to be used to form grooves into the plurality of surface portions on the grooved article, and wherein the intermediate workpiece is a mold having grooves formed therein that are the negative of the grooves to be formed in the grooved article.

32. The apparatus of claim 14, further comprising:
the CNC machine configured to produce grooves; and
means for controlling the CNC machine based on the outputted groove-direction information from the formatted file.

33. The apparatus of claim 14, further comprising:
the CNC machine configured to produce grooves; and
means for controlling the CNC machine, based on the outputted groove-direction information from the formatted file, to create a mold.

34. The apparatus of claim 14, further comprising:
the CNC machine configured to produce grooves;
means for controlling the CNC machine, based on the outputted groove-direction information from the formatted file, to create a mold; and
means for generating a panel using the mold.

35. The apparatus of claim 14, further comprising:
the CNC machine configured to produce grooves;
means for controlling the CNC machine, based on the outputted groove-direction information from the formatted file, to cut an intermediate workpiece, wherein the means for controlling includes means for setting a tool path that specifies cuts made to the intermediate workpiece; and means for forming grooves into the plurality of surface portions on the grooved article using the intermediate workpiece.

36. The apparatus of claim 14, further comprising:

the CNC machine configured to produce grooves;

means for controlling the CNC machine, based on the outputted groove-direction information from the formatted file, to cut an intermediate workpiece, wherein the means for controlling includes means for setting a tool path that specifies cuts made to the intermediate workpiece; and means for forming grooves into the plurality of surface portions on the grooved article using the intermediate workpiece, wherein the means for forming the grooves into the grooved article includes means for casting the grooved article using the intermediate workpiece as a mold.

37. An apparatus comprising:

a receiver configured to receive image information of an image, wherein the image information specifies different brightness values for each one of a plurality of areas of the image, including a first image area having a first specified brightness value, a second image area having a second specified brightness value, a third image area having a third specified brightness value and a fourth image area having a fourth specified brightness value;

variables in the apparatus configured to hold a first specified illumination direction and a first specified viewing direction;

a calculator operatively coupled to obtain the image information from the receiver and to obtain the first specified illumination direction and the first specified viewing direction from the variables and configured to calculate groove-direction information that specifies grooves to be formed into a plurality of surface portions on a grooved article, the plurality of surface portions on the grooved article including a first, a second, a third, and a fourth surface portion corresponding to the first, the second, the third, and the fourth area of the image, respectively, wherein the calculated groove-direction information is based, at least in part, on the brightness values of the image information, the first illumination direction and the first viewing direction, wherein the groove-direction information includes a plurality of groove directions including a first groove direction for the first surface portion corresponding to the first brightness value of the first image area, a second groove direction for the second surface portion corresponding to the second brightness value of the second image area, a third groove direction for the third surface portion corresponding to the third brightness value of the third image area, and a fourth groove direction for the fourth surface portion corresponding to the fourth brightness value of the fourth image area, wherein the first, second, third and fourth groove directions are all different from one another, and wherein the calculator is configured to use a groove-direction-calculation mathematical formula that includes a vector cross product of illumination vector direction and a viewing-vector direction; and an output module operatively coupled to the calculator and configured to output into a formatted file the groove-direction information for the first, the second, the third, and the fourth surface portion, wherein the outputted groove-direction information in the formatted file is readable by a CNC machine to control tool paths of the CNC machine used to form the grooves into the plurality of surface portions to make the grooved article;

wherein the groove-direction information is calculated such that:
the grooved article, when illuminated from the first illumination direction and viewed from the first viewing direction, exhibits a first relative brightness in the first surface portion that corresponds to the first specified brightness value of the first image area, and
the grooved article, when illuminated from the first illumination direction and viewed from the first viewing direction, exhibits a second relative brightness in the second surface portion that corresponds to the second specified brightness value of the second image area;

the apparatus further comprising:

a variable configured to hold a second illumination direction, wherein the second illumination direction is different than the first illumination direction, and wherein the calculator calculates the groove-direction information also based on the second illumination direction such that, when viewed from the first viewing direction:
the first relative brightness in the first surface portion is brighter when illuminated from the second illumination direction than when illuminated from the first illumination direction, and
the second relative brightness in the second surface portion is darker when illuminated from the second illumination direction than when illuminated from the first illumination direction.

38. The apparatus of claim 37, further comprising:

the CNC machine configured to produce grooves; and a controller operatively coupled to the output module and configured to receive the outputted groove-direction information from the formatted file, and operatively coupled to the CNC machine and configured to control the CNC machine based on the received groove- direction information.

39. The apparatus of claim 37, further comprising:

the CNC machine configured to produce grooves; and a controller operatively coupled to the output module and configured to receive the outputted groove-direction information from the formatted file, and operatively coupled to the CNC machine and configured to control the CNC machine based on the received groove- direction information, wherein the CNC machine is configured to produce grooves of a mold based on the received groove-direction information.

40. The apparatus of claim 37, further comprising:

the CNC machine configured to produce grooves;

a controller operatively coupled to the output module and configured to receive the outputted groove-direction information from the formatted file, and operatively coupled to the CNC machine and configured to control the CNC machine based on the received groove- direction information, wherein the CNC machine is configured to produce grooves of a mold based on the received groove-direction information; and a panel generator operatively coupled to receive the mold and operable to form a panel using the mold.

41. The apparatus of claim 37, further comprising:

the CNC machine configured to produce grooves; and a controller operatively coupled to the output module and configured to receive the outputted groove-direction information from the formatted file, and operatively coupled to the CNC machine and configured to control the CNC machine based on the received groove- direction information, wherein the CNC machine is configured to produce a intermediate workpiece, wherein the controller is configured to set a tool path that specifies cuts made to the intermediate workpiece, and wherein the intermediate workpiece is configured to be used to form grooves into the plurality of surface portions on the grooved article.

42. An apparatus comprising:

means for obtaining, into a computer, image information of an image that specifies different brightness values for each one of a plurality of areas of the image, including a first image area having a first specified brightness value, a second image area having a second specified brightness value, a third image area having a third specified brightness value and a fourth image area having a fourth specified brightness value;

means for specifying a first illumination direction and a first viewing direction;

means for calculating groove-direction information for specifying grooves to be formed into a plurality of surface portions on a grooved article, the plurality of surface portions on the grooved article including a first, a second, a third, and a fourth surface portion corresponding to the first, the second, the third, and the fourth area of the image, respectively, wherein the calculating of the groove-direction information is based, at least in part, on the brightness values of the image information, the first illumination direction and the first viewing direction, wherein the groove-direction information includes a plurality of groove directions including a first groove direction for the first surface portion corresponding to the first brightness value of the first image area, a second groove direction for the second surface portion corresponding to the second brightness value of the second image area, a third groove direction for the third surface portion corresponding to the third brightness value of the third image area, and a fourth groove direction for the fourth surface portion corresponding to the fourth brightness value of the fourth image area, wherein the first, second, third and fourth groove directions are all different from one another, and wherein the means for calculating the groove-direction information includes means for using a mathematical formula that includes a vector cross product of illumination vector direction and a viewing-vector direction; and means for outputting into a formatted file the groove-direction information for the first, second, third, and fourth surface portions, wherein the outputted groove-direction information in the formatted file is readable by a CNC machine to control tool paths of the CNC machine used to form the grooves into the plurality of surface portions to make the grooved article;

wherein the groove-direction information is calculated such that:

the grooved article, when illuminated from the first illumination direction and viewed from the first viewing direction, exhibits a first relative brightness in the first surface portion that corresponds to the first specified brightness value of the first image area, and the grooved article, when illuminated from the first illumination direction and viewed from the first viewing direction, exhibits a second relative brightness in the second surface portion that corresponds to second specified brightness value of the second image area;

the apparatus further comprising:

means for specifying a second illumination direction, wherein the second illumination direction is different than the first illumination direction, and wherein the means for calculating the groove-direction information is also based on the second illumination direction such that, when viewed from the first viewing direction:

the first relative brightness in the first surface portion is brighter when illuminated from the second illumination direction than when illuminated from the first illumination direction, and the second relative brightness in the second surface portion is darker when illuminated from the second illumination direction than when illuminated from the first illumination direction.

43. The apparatus of claim 42, further comprising:
the CNC machine configured to produce grooves; and
means for controlling the CNC machine based on the outputted groove-direction information from the formatted file.

44. The apparatus of claim 42, further comprising:
the CNC machine configured to produce grooves; and
means for controlling the CNC machine, based on the outputted groove-direction information from the formatted file, to create a mold.

45. The apparatus of claim 42, further comprising:
the CNC machine configured to produce grooves;
means for controlling the CNC machine, based on the outputted groove-direction information from the formatted file, to create a mold; and
means for generating a panel using the mold.

46. The apparatus of claim 42, further comprising:
the CNC machine configured to produce grooves;
means for controlling the CNC machine, based on the outputted groove-direction information from the formatted file, to cut an intermediate workpiece, wherein the means for controlling includes means for setting a tool path that specifies cuts made to the intermediate workpiece; and
means for forming grooves into the plurality of surface portions on the grooved article using the intermediate workpiece.

* * * * *